United States Patent
Bethlehem et al.

(10) Patent No.: US 8,732,182 B2
(45) Date of Patent: May 20, 2014

(54) SYSTEM AND METHOD FOR LAUNCHING A RESOURCE IN A NETWORK

(75) Inventors: Alexander Bethlehem, Calgary (CA); (Tony) Dong Li Liu, Richmond Hill (CA); Glen Liu, Calgary (CA); Yan Chen, Calgary (CA); Laura Armstrong, Calgary (CA); Zhenwu Li, Calgary (CA); Paul Zhiyong Zhou, Calgary (CA); Garrett Serack, Calgary (CA)

(73) Assignee: Desktopsites Inc., Calgary, Alberta (CA)

( * ) Notice: Subject to any disclaimer, the term of this patent is extended or adjusted under 35 U.S.C. 154(b) by 221 days.

(21) Appl. No.: 13/046,505

(22) Filed: Mar. 11, 2011

(65) Prior Publication Data

US 2011/0251992 A1    Oct. 13, 2011

Related U.S. Application Data

(63) Continuation-in-part of application No. 11/291,913, filed on Dec. 2, 2005, now Pat. No. 7,912,822, which is a continuation-in-part of application No. 11/001,127, filed on Dec. 2, 2004, now abandoned.

(51) Int. Cl.
   *G06F 7/00* (2006.01)
   *G06F 17/00* (2006.01)
   *G06F 17/30* (2006.01)

(52) U.S. Cl.
   USPC ........... 707/758; 707/694; 707/706; 707/781; 707/999.003

(58) Field of Classification Search
   None
   See application file for complete search history.

(56) References Cited

U.S. PATENT DOCUMENTS

| | | | |
|---|---|---|---|
| 6,009,175 | A | 12/1999 | Schanze |
| 6,041,360 | A | 3/2000 | Himmel et al. |
| 6,052,710 | A | 4/2000 | Saliba et al. |
| 6,058,423 | A | 5/2000 | Factor |
| 6,091,409 | A | 7/2000 | Dickman et al. |

(Continued)

FOREIGN PATENT DOCUMENTS

| | | |
|---|---|---|
| EP | 1 381 190 | 1/2004 |
| WO | WO 00/54151 | 9/2000 |
| WO | WO 01/33381 | 5/2001 |

OTHER PUBLICATIONS

Papastavrou, S. et al., "Mobile Agents for World Wide Web Distributed Database Access", IEEE Transactions on Knowledge and Data Engineering, vol. 12, No. 5, Sep.-Oct. 2000, pp. 802-820.

(Continued)

*Primary Examiner* — Azam Cheema
(74) *Attorney, Agent, or Firm* — McCarthy Tétrault LLP

(57) ABSTRACT

The disclosure provides a system and method for a client connected to a server to a resource in a network. For the system a virtual machine module is provided to access a library and to create virtual machine templates and to create virtual machines from the virtual machine templates. The virtual machine module provides to a host machine in the network access to machines, user profile settings and instances of an application in the network and to multiple operating systems. The client has: access to an instance of the resource; an access module to provide the client with communication to access to the server using load balancing algorithms to access the file using Remote Desktop Protocol (RDP) commands; and an authentication module providing access to a directory structure accessed by the server using Microsoft Group Policy Objects (GPOs) and Active Directory (AD) services to authenticate the client with the server.

19 Claims, 38 Drawing Sheets

(56) References Cited

U.S. PATENT DOCUMENTS

| | | |
|---|---|---|
| 6,101,508 A | 8/2000 | Wolff |
| 6,101,537 A | 8/2000 | Edelstein et al. |
| 6,161,139 A | 12/2000 | Win et al. |
| 6,182,142 B1 | 1/2001 | Win et al. |
| 6,360,232 B1 | 3/2002 | Brewer et al. |
| 6,360,262 B1 | 3/2002 | Guenthner et al. |
| 6,754,696 B1 | 6/2004 | Kamath et al. |
| 7,526,410 B2 * | 4/2009 | Anastassopoulos et al. . 702/186 |
| 7,577,722 B1 * | 8/2009 | Khandekar et al. ........... 709/220 |
| 2002/0112048 A1 | 8/2002 | Gruyer et al. |
| 2003/0009476 A1 | 1/2003 | Fomenko et al. |
| 2003/0156119 A1 | 8/2003 | Bonadio |
| 2003/0195950 A1 | 10/2003 | Huang et al. |
| 2004/0167984 A1 * | 8/2004 | Herrmann ..................... 709/229 |
| 2004/0199639 A1 | 10/2004 | Harris |
| 2004/0255289 A1 | 12/2004 | Alex George et al. |
| 2004/0261025 A1 | 12/2004 | Rizk et al. |
| 2004/0268364 A1 * | 12/2004 | Faraj .............................. 719/316 |
| 2005/0066284 A1 | 3/2005 | Ho et al. |

OTHER PUBLICATIONS

Klemm, R.P., "Web Companion: A Friendly Client-Side Web Prefetching Agent", IEEE Transactions on Knowledge and Data Engineering, vol. 11, No. 4, Jul.-Aug. 1999, pp. 577-594.

Bouguettaya, A., "Supporting Dynamic Interactions Among Web-Based Information Sources", IEEE Transactions on Knowledge and Data Engineering, vol. 12, No. 5, Sep.-Oct. 2000, pp. 779-801.

Gavron, Jacquelyn and Joseph Moran. How to Use Microsoft Windows NT 4 Workstation. Emeryville, CA. 1996. p. 73.

* cited by examiner

Profile Synchronization on Multi Servers - Process Flow

Client GUI

2200D

Client and Server Agent

2200E

Fig. 23 Library Shares
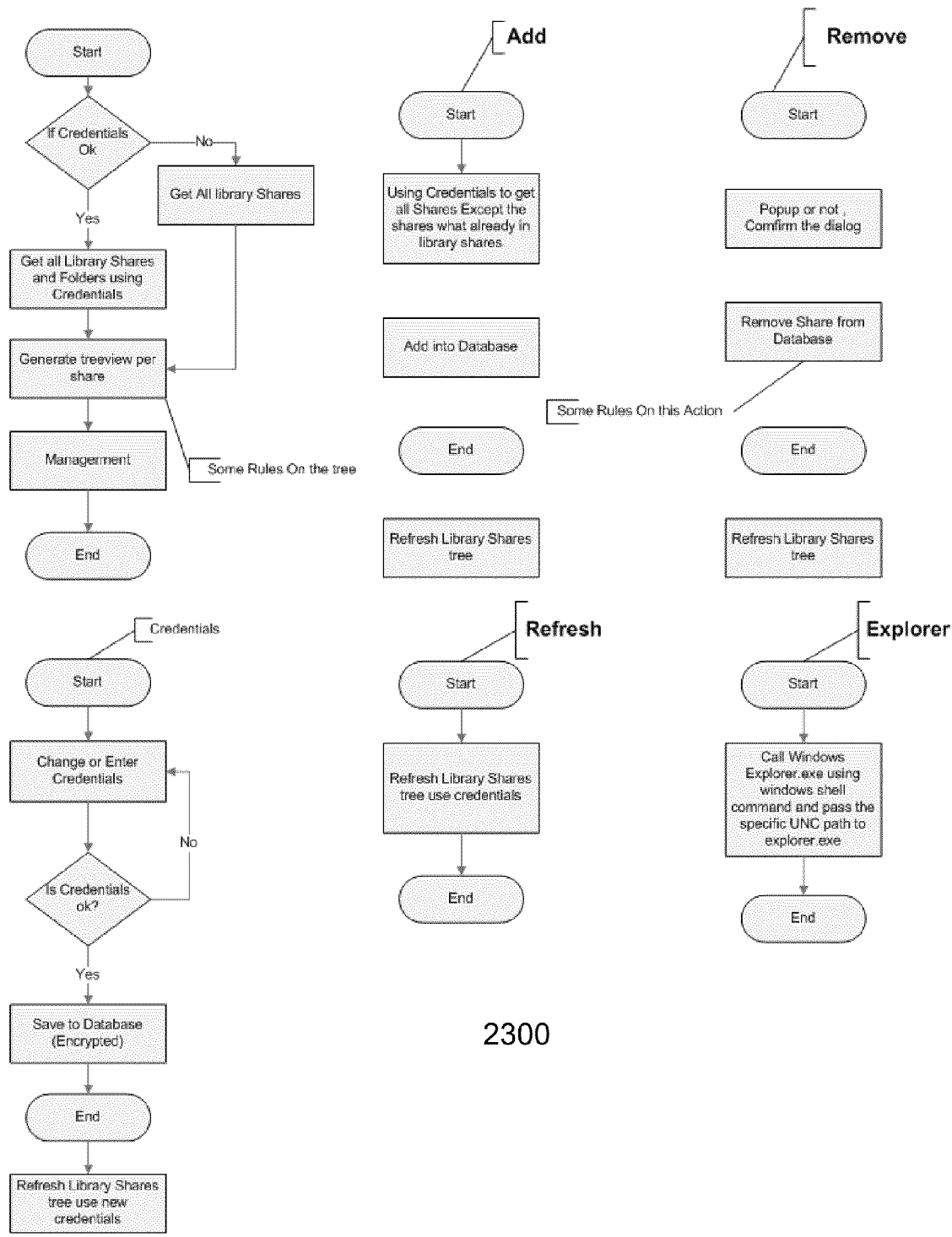
2300

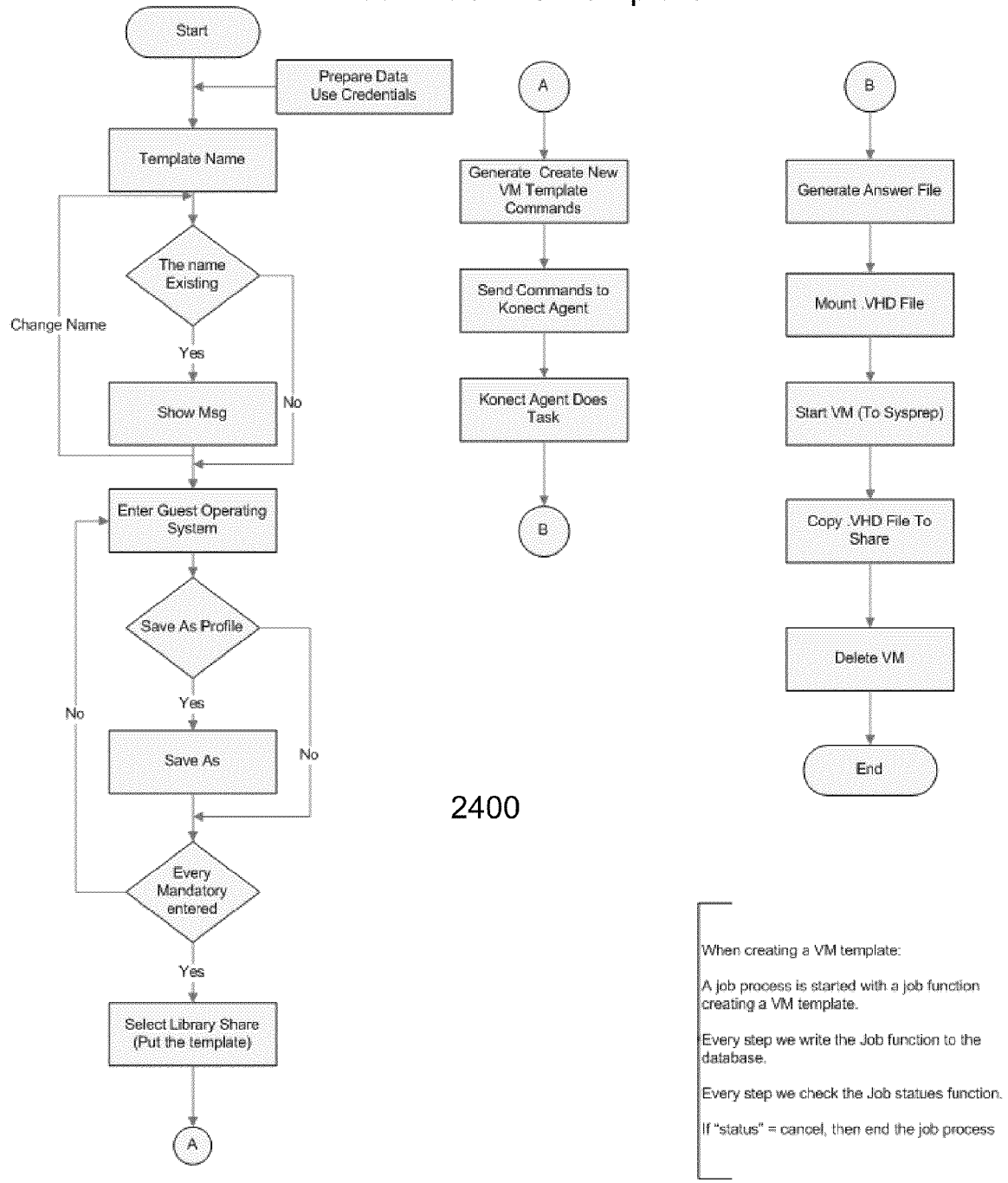

Fig. 25 Virtual Machine Creation
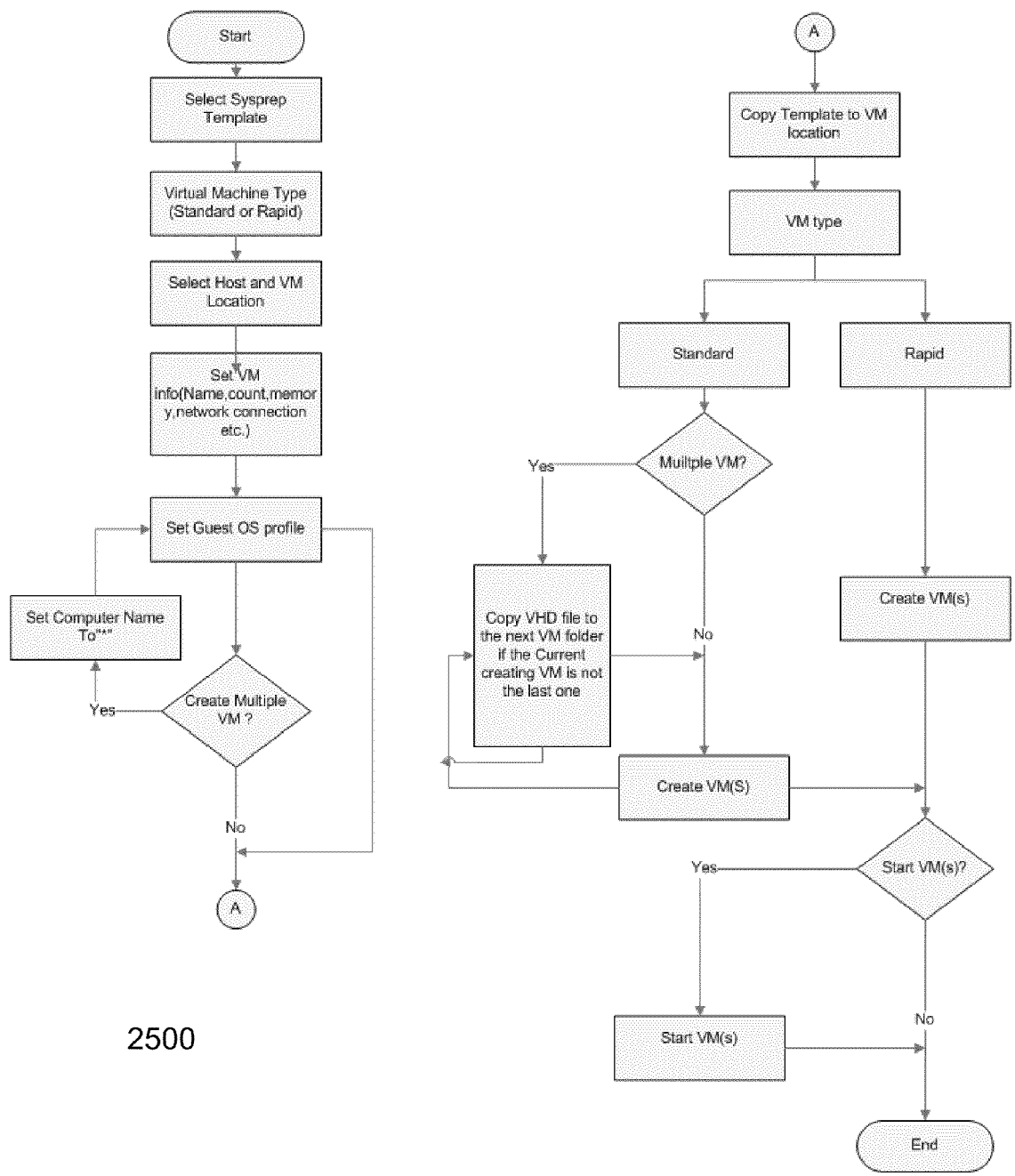
2500

Create Group Policy Objects

2600

Fig. 27
Get, Delete, and Set Group Policy Objects
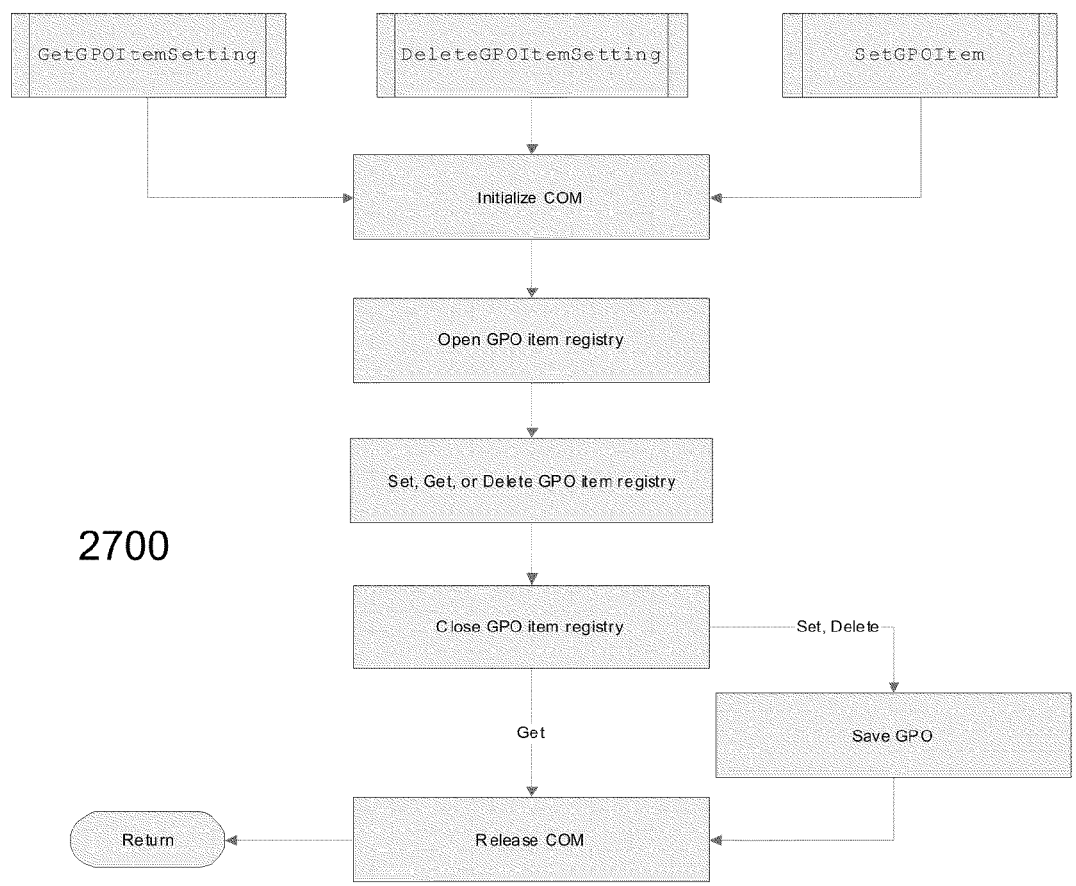
2700
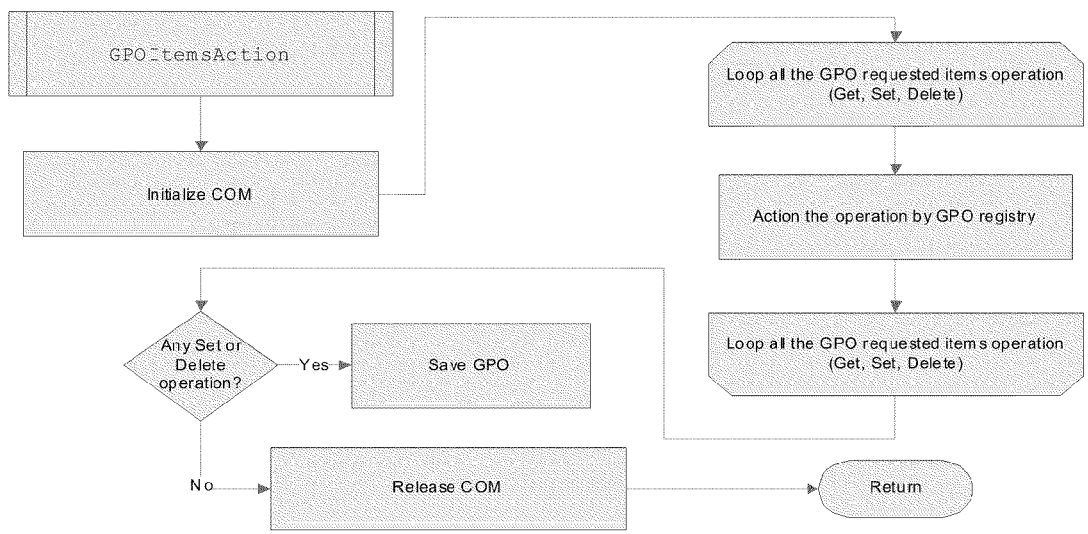

Get and Set Folder Redirection

Filter Active Director Objects

2900

Creation and Assignment of Network Resources

Assignment of Network Resources
GUI

Assignment of Multiple Roles and Services

3000C

Fig. 31
Load Balancer

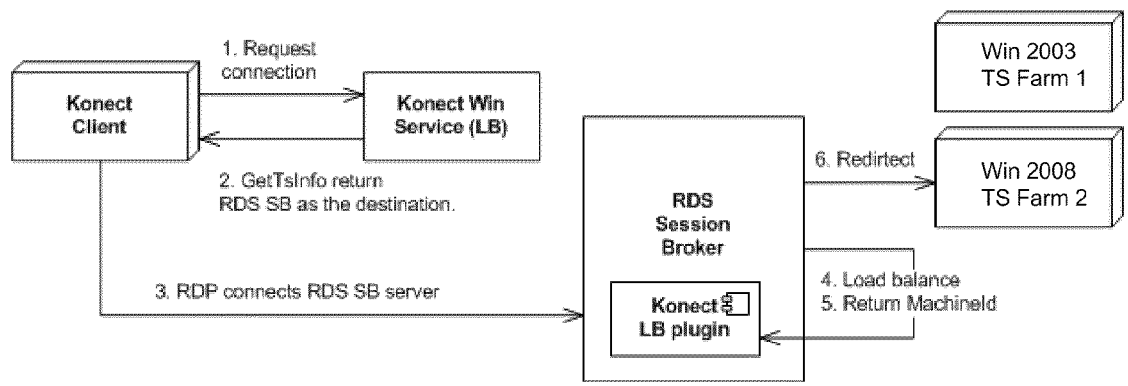

```
STDMETHOD (Initialize) (
    __in ITsSbProvider *pProvider,
    __in ITsSbPluginNotifySink *NotifySink,
    __in ITsSbPluginPropertySet *PropertySet
    );

STDMETHOD (Terminate) (
    __in HRESULT hr
    );

STDMETHOD (GetMostSuitableTarget)(
    __in ITsSbClientConnection* pConnection,
    __in ITsSbLoadBalancingNotifySink* pLBSink
    );

STDMETHOD (NotifySessionChange)(
    __in TSSESSION_STATE state,
    __in ITsSbSession* pSession
    ){return E_NOTIMPL;}

STDMETHOD (NotifyTargetChange)(
    __in DWORD pChangeType,
    __in ITsSbTarget* pTarget
    );

STDMETHOD (NotifyClientConnectionStateChange)(
    __in CONNECTION_CHANGE_NOTIFICATION ChangeType,
    __in ITsSbClientConnection *pConnection
    ){return E_NOTIMPL;}
```

3100

SYSTEM AND METHOD FOR LAUNCHING A RESOURCE IN A NETWORK

RELATED APPLICATIONS

This application is a continuation-in-part application of U.S. patent application Ser. No. 11/291,913 filed Dec. 2, 2005, now U.S. Pat. No. 7,912,822 which itself is a continuation-in-part application of U.S. patent application Ser. No. 11/001,127 filed Dec. 2, 2004 now abandoned.

FIELD OF THE DISCLOSURE

The disclosure relates to a system and method for launching or accessing a resource in a computer network, in particular, a system and method of extending network resources for in and out of the workplace access.

BACKGROUND

Advantages of the Internet as an economical communications medium are driving companies to use it to deliver business critical applications and network data resources, enabling customers, partners, remote offices and mobile employees to work together and collaborate more efficiently.

However, a fundamental challenge facing organizations today is managing the increasing rate of required changes while maintaining business continuity. The process of building, deploying, integrating applications and melding with packaged applications and third-party data streams is becoming increasingly difficult. Today many enterprises approach migration with a growing series of uncoordinated tools to repeatedly build, rebuild and update operating systems and several other tools for ongoing management. Web-based applications and data provide a key company resource in today's business environment. Legacy applications are a mix of mainframe and pure client/server applications.

In order to consider application redevelopments for the Web, this typically entails a long-term effort, requires significant capital expenditure and frequently results in losing the rich client functionality necessary in business-critical applications to enhance productivity.

Terminal-based or centralized hosting environments in which multiple terminals connect to a host computer (i.e. server-based computing), applications and data are typically deployed, managed and supported on the server with solutions offering delivery and management over the Internet. The principle advantages of this form of deployment are reduced maintenance and support for client terminals, a standardized corporate client terminal and centralized resource management. However, for organizations with multiple locations and numerous users, the costs associated with traditional emulation software can be excessive due to costly individual licensing costs, maintenance, support and updates. Further web-based computing protocols within a server-based computing model could be very sensitive to network delay, consuming a constant amount of unnecessary bandwidth, in addition to utilizing significant server resources for each user session. Another system is virtual private networks (VPN), which allow enterprises to carve secure and reliable "networks" out of the public Internet infrastructure. However, the very nature of a remote access VPN, being to provide secure access to distributed users at numerous remote locations, introduces deployment and maintenance concerns. VPNs are generally unable to deliver instant and continuous connectivity and are processor-intensive and bandwidth-heavy in use. Another drawback of VPNs is that a VPN client must be installed and maintained on every PC that requires access and each individual PC user must be trained to operate the VPN application. This configuration leads to source data, which often resides on laptop PCs or other devices, being left vulnerable to loss or theft. Once connected via a VPN the remote PC is granted full rights and privileges to roam the corporate network, which may be exploited by hackers using a remote VPN connection to gain access to corporate network resources.

There is a need for a system and method for providing access within the corporate environment, remote or mobile access to applications and data, which addresses deficiencies in the prior art.

SUMMARY OF THE DISCLOSURE

In a first aspect, an access system for a client connected to a server in a computer network to a resource stored in the network is provided. The system comprises: a file stored in the client and the server; an operating system that accesses the file, the operating system being able to be executed on the client and the server; a library accessible by the server to store virtual machine templates on the server in the network; and a virtual machine module in the server to access the library and create virtual machine templates for the library and to create virtual machines from the virtual machine templates, the virtual machine module providing to a host machine in the network access to a plurality of machines, user profile settings and instances of an application in the network and to multiple operating systems. In the system, the resource is an application that can execute on the client or the server. The client has access to an instance of the resource; a microprocessor; an access module providing instructions to the microprocessor to provide the client with communication to access to the server using load balancing algorithms to access the file using Remote Desktop Protocol (RDP) commands; an authentication module providing instructions to the microprocessor to provide access to a directory structure accessed by the server using Microsoft Group Policy Objects (GPOs) and Active Directory (AD) objects to authenticate the client with the server; and provides a terminal-based environment for accessing the application that uses the file in the network through the RDP commands.

In the system, the host system may have a hypervisor installed thereon to implement supervisory roles and functions for the virtual machine module.

In the system, the host system may further comprise: a synchronization module in the server to synchronize data and objects from a plurality of hypervisors in the network.

In the system, the synchronization module may synchronize processes threads received from any of a virtual machine, operating system or function call generated in the network.

In the system, the synchronization module may utilize process delegates to asynchronously create the threads by accessing and synchronizing a prioritized list of functions and commands.

In the system, the authentication module may manage user profiles and permissions using GPOs in the network.

The access system may further comprise a folder redirection module in the server to change a target location of folders in a user profile within the network.

The access system may further comprise a filter module to filter AD objects and their assigned network resources to specific users, groups and computers in the network.

The access system may further comprise an object management module to retrieve a users profile and to select, view, assign and manage objects and their links to network resources in the network.

In the system, the virtual machine module may further comprise a synchronization module to synchronize operation of the plurality of machines, the instances of the application and the multiple operating systems and to provide control of the operation though a graphical user interface (GUI).

In the system, the synchronization module may: generate process threads to synchronize data based on the type of data to be synchronized; determine a data source when existing data is being synchronized; establish a connection to a virtual machine manager (VMM) data source when the data source is a VMM, and then retrieve data from the SCVMM machine; compare the data is compared against a central database; and update the central database if a difference is detected.

The access system may further comprise a load balancing module in the server to distribute components of a task to a plurality of servers in the network.

In the system, the client may further comprise an icon generating module providing instructions to the microprocessor to generate a first icon associated with the application and a second icon associated with a file used by the resource in a GUI on the client, the second module uses a mapping of icon files and application files relating to the resource on the server to generate the first icon on a display associated with the client, the first icon providing a graphic representation of a source of the instance of the resource reflecting whether the resource is located at the client or at the server.

In the system, when the file is stored on the server, the first icon may be provided with visual attributes indicating that the file is located on the server; and when the file resides on the client, the first icon may indicate that the file resides on the client.

In the system, the client may further comprise: a resource execution module providing instructions to the microprocessor. The instructions may be to: monitor for activation of the first icon at the client; initiate execution of the resource either on the client or the server for the client depending on whether the resource is to be accessed on the client first or the server first and to cause the application to access the file through either the client or the server depending on whether the file is to be accessed on either the client first or the server first; update a registry containing activation information on the resource, the registry being accessible by other processes operating on devices in the network; and initiate an access of the resource on the client after attempting to access the resource on the server, if the server is not accessible.

In the system, the server may further comprise a configuration management interface accessing user profile data defining logical data interfaces relating to the file, the application and a relationship between the file and the application, the user data providing privilege and sharing rights for the file and the application.

The access system may further comprise a virtual drive map of files relating to the file on the client, the drive map utilizing the user profile data and providing access to the file from the server to the client and from the client to the server.

In a second aspect, a method of providing access for a client connected to a server in a computer network to a resource stored in the network is provided. For the method, the network has an instance of a file in at least one of the server and the client and the network have an instance of an application that uses file in at least one of the server and the client. The network provides the client with access to the server using AD objects and provides secure access to the application for the client using a RDP. The method comprises: accessing a library accessible containing virtual machine templates; creating a virtual machine for a server in the network, the virtual machine having access the library and providing to a host machine in the network access to multiple machines in the network, multiple instances of an application in the network and multiple operating systems; providing instructions for execution on a microprocessor in the client to generate a first icon associated with the file and a second icon associated with the application in a GUI on the client; and providing instructions to the microprocessor in the client to monitor for activation of the first icon at the client. For the method, the resource is an application that can execute on the client or the server. Also for the method, the client has an instance of the resource; a microprocessor; an access module providing instructions to the microprocessor to provide the client with communication to access to the server using load balancing algorithms to access the file using RDP commands; has an authentication module providing instructions to the microprocessor to provide access to a directory structure accessed by the server using GPOs and AD objects to authenticate the client with the server; and has a terminal-based environment for accessing the application that uses the file in the network through the RDP commands.

In another aspect, an access system for a client connected to a server in a computer network to a resource stored in the network is provided. The system comprises: the client; the server; an instance of the resource stored in at the client and possibly at the server; an access module in the client providing instructions to a microprocessor in the client to provide the client with communication to access to the server using load balancing algorithms to access the file using RDP commands; an authentication module in the client providing instructions to the microprocessor to provide access to a directory structure accessed by the server using AD objects and GPOs to authenticate the client with the server; a file stored in at least one of a server and a client in the network; an operating system that accesses the file, the operating system being able to be executed on the client and the server; a first module in the client providing instructions to the microprocessor in the client to generate a first icon associated with the application and a second icon associated with a file used by the resource in a GUI on the client; a mapping of icon files and application files relating to the resource on the server; and a second module in the client. The second module provides instructions to the microprocessor in the client to monitor for activation of the first icon at the client; to initiate execution of the resource either on the client or the server for the client depending on whether the resource is to be accessed on the client first or the server first and to cause the application to access the file through either the client or the server depending on whether the file is to be accessed on either the client first or the server first; to update a registry containing activation information on the resource, the registry being accessible by other processes operating on devices in the network; and to initiate an access of the resource on the client after attempting to access the resource on the server, if the server is not accessible. In the system, the client provides a terminal-based environment for accessing the application that uses the file in the network through the RDP commands; the first module uses the mapping to generate the first icon on a display associated with the client, the first icon providing a graphic representation of a source of the instance of the resource reflecting whether the resource is located at the client or at the server; and the resource is an application that can execute on the client or the server.

In the system, when the file is stored on the server, the first icon may be provided with visual attributes indicating that the file is located on the server; and when the file resides on the client, the first icon indicates that the file resides on the client.

The system may further comprise a configuration management interface accessing user profile data defining logical data interfaces relating to the file, the application and a relationship between the file and the application, the user data providing privilege and sharing rights for the file and the application.

The system may further comprise a virtual drive map of files relating to the file on the client, the drive map utilizing the user profile data and providing access to the file from the server to the client and from the client to the server.

In the system, when the application is activated through the server, the server may present a GUI window on the client relating to activation of the application that is frameless and has a transparent background to provide a seamless graphical user interface environment at the client.

The system may further comprise a third module in the client to synchronize instances of the file between the client and the server, the third module synchronizing the file at any of when the application on the server is accessed, after access to the application on the server is completed or after the client is authenticated.

The system may further comprise a synchronization module in the server to synchronize data and objects from a plurality of hypervisors in the network.

The system may further comprise a parameter management module in the server to manage parameter to send and receive server agent requests on the server to client agent on the client in the network.

The system may further comprise: a library accessible by the server to store virtual machine templates on the server in the network; and a virtual machine module in the server to access the library and create virtual machine templates for the library and to create virtual machines from the virtual machine templates.

In the system, the authentication module may manage user profiles and permissions using GPOs in the network.

The system may further comprise a folder redirection module in the server to change a target location of folders in a user profile within the network.

The system may further comprise a filter module to filter AD objects and their assigned network resources to specific users, groups and computers in the network.

The system may further comprise an object management module to dynamically retrieve a users profile and to select, view, assign and manage objects and their links to network resources in the network.

The system may further comprise an object management module to dynamically assign multiple roles and features to a server in the network.

The system may further comprise a load balancing module in the server to distribute components of a task to a plurality of servers in the network.

In another aspect, a method for presenting information to a client in a network where resources are stored in at least the client or a server in the network is provided. The network has an instance of a file in at least one of the server and the client and the network has an instance of an application that uses file in at least one of the server and the client. The network provides the client with access to the server using AD objects and provides secure access to the application for the client using a RDP. The method comprises: providing instructions for execution on a microprocessor in the client to generate a first icon associated with the file and a second icon associated with the application in a GUI on the client; providing instructions to the microprocessor in the client to monitor for activation of the first icon at the client. When a request for the file is initiated on the client, the method provides instructions for execution on the microprocessor: to initiate execution of the application either on the client or the server for the client depending on whether the application is to be accessed on the client first or the server first and to cause the application to access the file through either the client or the server depending on whether the file is to be accessed on either the client first or the server first; and to update a registry containing activation information on the application, the registry being accessible by other processes operating on devices in the network. The method further comprises: accessing a directory structure stored on the server using GPOs to authenticate the client with the server; providing instructions to the microprocessor for the client to access to the server using load balancing algorithms for the file using RDP commands; and initiating an access of the application on the client after attempting to access the application on the server, when the application is to be initiated on the server first and the server is not accessible. For the method, the client provides a terminal-based environment for accessing the application that uses the file in the network through the RDP commands.

In another aspect, an access system controlling access of a client to resource, such as an application, database (either local, server, or web-based), service, data and/or a file, located within a network having a server and the client is provided. The system comprises: a client data interface defining data interfaces, data transmission rule sets, methods and scripts associated with the client; a user profile associated with the client storing the data interfaces, the data transmission rule sets, the methods and the scripts; a server communicator controlling distribution of the user profile within the network; and an access module providing a bi-directional view of the application and the file between the server and the client. In the system, the client can selectively choose to search for the application from one of first searching for the application on the server and first searching for the application on the client. In the system, client interfaces (such as GUIs) may include and are not limited to: a desktop launcher, server desktop, client desktop, or a portal, and/or a combination thereof.

In the system, the administrative interface may comprise a configuration management user interface on the client to define logical data interfaces, data transmission rule sets, methods and scripts.

In the system, the logical export and import data interface may comprise export and import data connections, import and export data views and the import and export data bags.

In the system, the logical import data interface may import data from an import data source into the system.

In the system, the import data may be used during execution of the server communicator to load data from then import data source into then import data bags.

In the system, the logical export data interface may be used to export data from an export data source into an export data target client of the user profile delivery system.

In the system, an export data view of the export data bag may be used during execution of the server communicator to load data from then export data bag out to then export data target.

In the system, the server communicator may execute defined scripts stored in then user profile data.

In the system, the rule processor may be invoked by the server communicator to execute the user's requests and responses using either or both the import and export data bags based on data transmission rules.

In the system, the server communicator language may comprise a set of server communicator commands and a server communicator processor to process and execute each server communicator command lines.

In the system, the communicator commands may comprise: a load command; a display command for displaying data from a data bag into the export data target; a format command for formatting a data bag into a user display using a defined rule set; a execute command for executing a data bag from a user's request; and a save command for saving data from a client to an import data connection at the server.

In another aspect, an access system for a client connected to a server in a computer network to resource, such as an application, database (either local, server, or web-based), service and/or a file, stored in the network is provided. The system comprises: the client in the network; the server in the network; an instance of the application stored in at least one of the server and the client; a file associated with the application stored in at least one of the server and the client; and an access module operating to provide the client with access to the server. In the system at the client, a first icon of the file/data is provided and if the instance of the application is stored at the server, the application/service is automatically accessed when the icon at the client is activated.

In the system, when the application/service is not stored on the client, the icon may have attributes associated a location of the application/service.

In the system, the client may be provided with an option of searching for the instance of the application on either the client first or the server first.

In the system, user profile data relating to a user at the client may be provided in the network. The user profile data may define rights and access privileges to resources relating to the application/service assigned to the client.

In the system, a configuration management interface may be provided defining logical data interfaces to resources relating to the application assigned to the client utilizing the user profile data.

In the system, a virtual drive map of files relating to the application/service may be built on the client. Therein, the drive map may utilize information from the user profile data and provides access of the files from the server to the client and from the client to the server.

In the system, a mapping of icon files and resources resident on the server may be provided to the client; and icons relating to the icon files may be generated in a dedicated area in a GUI.

In the system, the dedicated area is a start application area or a system tray area.

In the system, when the resource resides on the server, at the client the resource may be reconfigured to present the resource to the user as a client-based resource through the client. Also, the mapping may be utilized to present icons on the client indicating where applications/services reside, which may be implemented by the client.

In the system for server applications/services residing on the server, icons relating to files using the server applications/services may be presented to the client with a unique server indication when files associated with the applications are presented to the user.

In the system, when the resource resides on the client, an icon indicating that the resource resides on the client may be presented to the client. In the system, when the resource resides on the server, an icon indicating that the resource resides on the server may be presented to the client. In the system, the mapping may be used to overlay (e.g. ignore) icons that do not indicate correctly where the resource resides.

In the system, when said resource resides on said server, at said client a menu bar is presented in a GUI resources are reconfigured on said client via the access system, presenting said resource to said user as a server-based resource through said client.

In yet another aspect, a method for presenting information to a client in a network where a resource, such as an application, database (either local, server, or web-based), service and/or a file, is stored in at least the client or a server in the network is provided. The method comprises: asking a user at the client to select whether applications/services for files/data accessible by the client are to be searched first from a location comprising the client and a server in the network; and utilizing information from a response to associate an icon associated with the file/data if the response indicates that the file is to be associated first with a remote application.

In the method, a user profile data relating to a user at the client may be provided in the network. Therein the user profile data defines rights and access privileges to resources relating to the application assigned to the client.

In the method, a configuration management interface may be provided defining logical data interfaces to resources relating to the application assigned to the client utilizing user profile data.

In the method a virtual drive map of files relating to the application may be built on the client, utilizing information from the user profile data and providing access of the files from the server to the client and from the client to the server.

In the method, for applications residing on the server, at the client a menu bar is presented in a GUI presenting the application to the user as a server-based application.

In the method and systems, port knocking and load balancing may be performed between the client and server when accessing a resource stored at the server.

In other aspects various combinations of sets and subsets of the above aspects are provided.

BRIEF DESCRIPTION OF THE DRAWINGS

The foregoing and other aspects of the disclosure will become more apparent from the following description of specific embodiments thereof and the accompanying drawings which illustrate, by way of example only, the principles of the disclosure. In the drawings, where like elements feature like reference numerals (and wherein individual elements bear unique alphabetical suffixes):

FIG. 23 contains flow diagrams of library management algorithms used in the network of FIGS. 1A and 9;

FIG. 24 contains flow diagrams of template management algorithms used in the network of FIGS. 1A and 9;

FIG. 25 contains a flow diagram of a virtual machine creation algorithm used in the network of FIGS. 1A and 9;

FIG. 27 contains flow diagrams of group policy management algorithms used in the network of FIGS. 1A and 9;

FIG. 31 contains flow diagrams of load balancing algorithms used in the network of FIGS. 1A and 9.

DETAILED DESCRIPTION OF AN EMBODIMENT

Figure 1A:
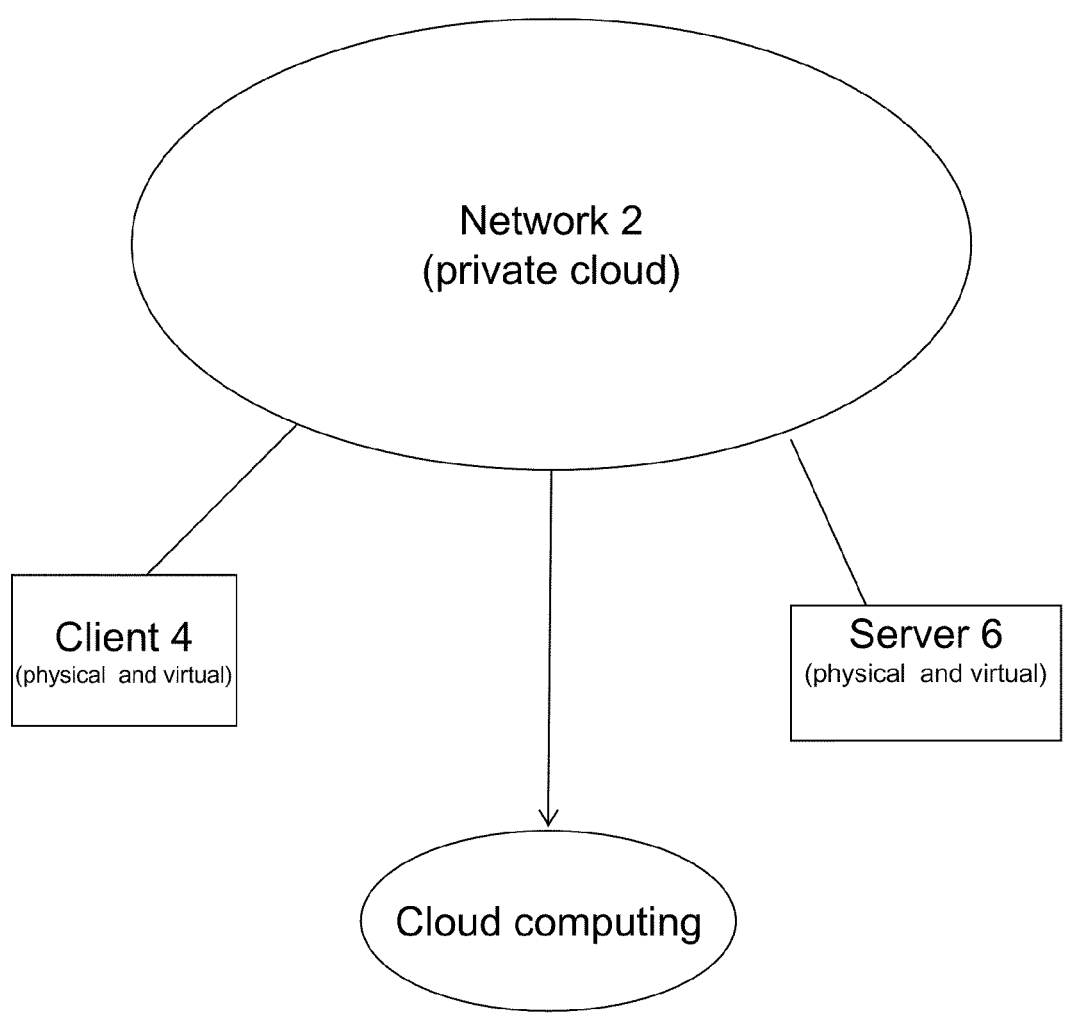
FIG. 1A is a block diagram of a network associated with an embodiment.

The description which follows, and the embodiments described therein, is provided by way of illustration of an example, or examples, of particular embodiments of the principles of the present disclosure. These examples are provided for the purposes of explanation, and not limitation, of those principles and of the disclosure. In the description, which follows, like parts are marked throughout the specification and the drawings with the same respective reference numerals.

An embodiment generally comprises a system and method of sharing files and other resources, such as applications, files, services, data and other information, amongst elements in a network, such as a client and a server. In particular, a user at the client has local files, data, applications and services stored thereon and the server also has files, data, applications and services stored thereon. Frequently, an instance of an application or service may be installed on both the client and the server, e.g. Microsoft Word (trade-mark) or Microsoft Excel (trade-mark). The embodiment provides the client with access to both applications and services and allows the client to specify from which source (e.g. client or server) to first seek activation of the application or service. In providing such access, the embodiment provides bi-directional views of resources for both the client and the server. As an additional function, the embodiment may provide an additional graphic or text notation to the user at the client through an icon on his client interface of whether a file (or data) associated with an application (or service) will be using either a local (client-side) instance of the application or a remote (server-side) instance. In other instances, no indication of any specific notation association of an application/service and or file/data to application/service is provided by the icon. This facilitates a perception that all files, applications, services and data are locally installed at the client. In order to facilitate these functions and operations, data relating to a client, its local applications, local files and access privileges are stored and selectively accessed by the server. Although the description provided herein focuses on sharing and accessing files/data and applications/services, the embodiment can also be used to share any resource which may be accessed in a network. Such resources may include: files and applications, databases and services. An embodiment can separately handle files, data, applications and services; however, there are similarities in handling files and data and similarities in handling applications and services. There are further other similarities in handling files, data, applications and services. It will be appreciated that when the term "file" is used, a similar feature or function can be provided for at least data (without explicitly mentioning data). It will further be appreciated that when the term "application" is used, a similar feature or function can be provided for at least a service (without explicitly mentioning a service). Further detail on these features and functions are provided below.

An embodiment provides facilities for virtualization of one or more services to one or more servers in a network. Virtualization allows management of physical and virtual machines from a single management GUI pane from an administrator station. Benefits of having multiple virtual machines (VMs) consolidated on a single physical host machine include savings in time and resources in maintenance, power consumption, system cooling costs and space allocation.

Figure 1B:
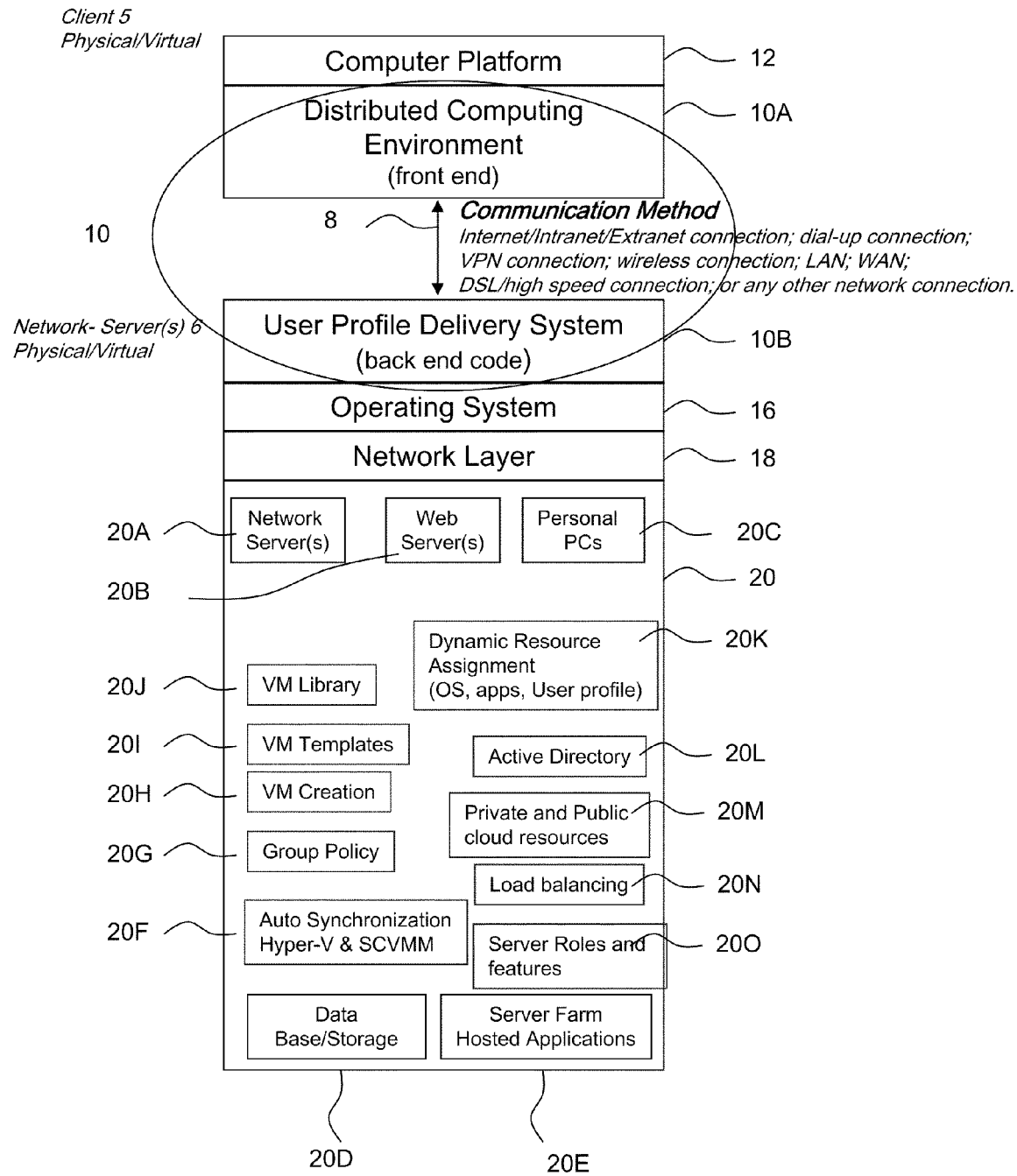
FIG. 1B is a block diagram of aspects of a client and a server in a network system in said network associated with an embodiment.

Referring to FIGS. 1A and 1B, for an embodiment, network 2 is provided comprising client 4 and server 6. Network 2 may be any network architecture allowing remote access by client 4 to server 6. Exemplary architectures include systems using Intranet/Internet/Extranet TCP/IP connections, dial-up connection, VPN connections, LANs, WANs or DSL, wireless, cable modem or any other type of connections or architectures. Server 6 may be a single physical or virtual server or may comprise multiple servers in a server farm. Communication link 8 connects client 4 to server 6 and provides one or more conduits for transfer of data, files and information there between. As an interface and mechanism for the transfer of data, files and information between client 4 and server 6, user profile system 10 is provided amongst client 4 and server 6, which utilizes communication link 8 effects the transfer. User profile system comprises front end interface 10A located in client 4 and back end interface 10B located in server 6.

Figure 2:
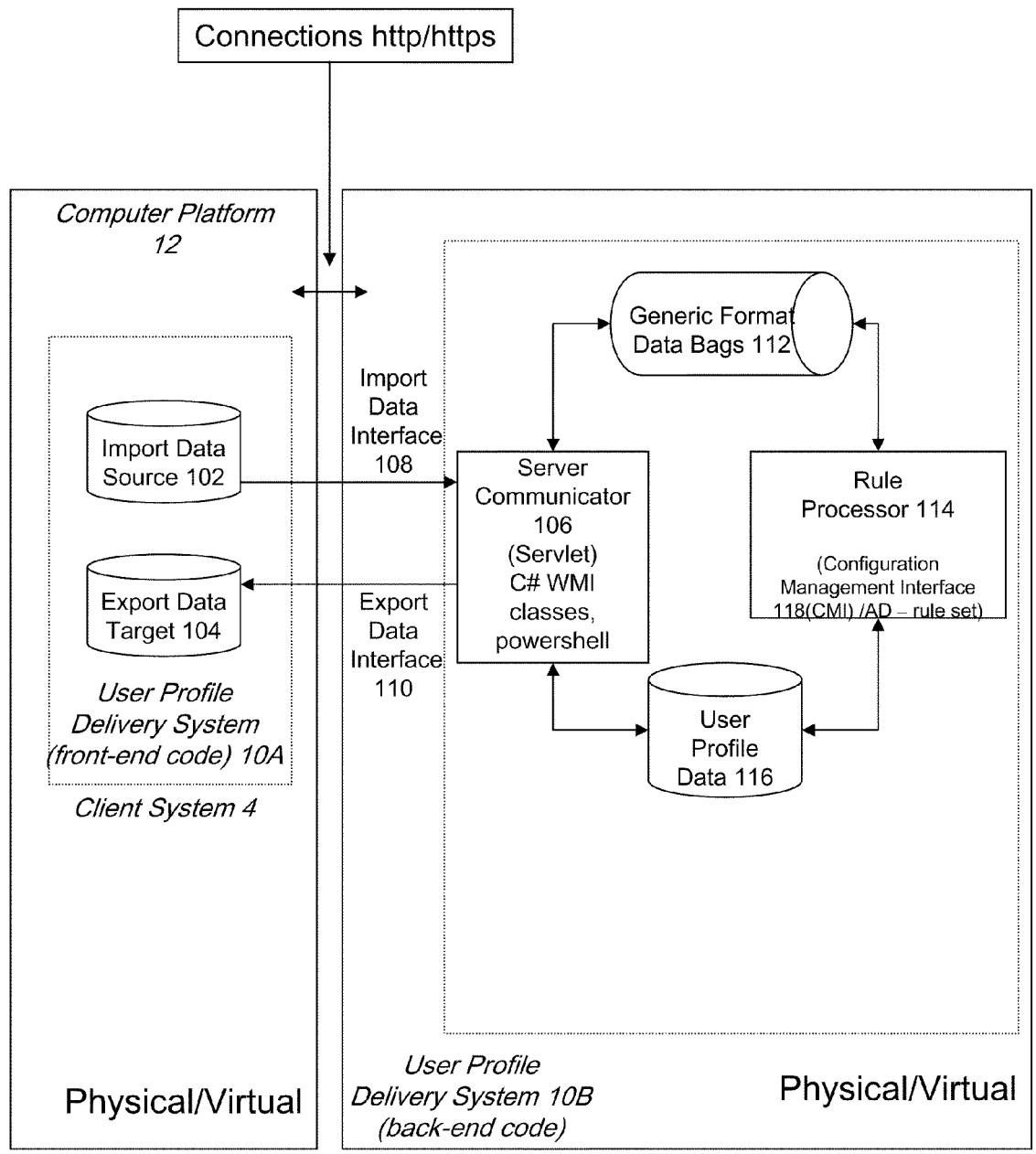
FIG. 2 is another block diagram of the network system of FIG. 1B.

Referring to FIGS. 1A, 1B and 2, further detail on client 4 is provided. Client 4 comprises computer platform 12 having typical, known components, including a microprocessor (not shown), memory (not shown), secondary storage hard drive (not shown) and software installed thereon which allows client 4 to install and operate applications. It will be appreciated that client 4 may be a thin client, such as a SunRay (trademark) thin client. Client 4 also includes distributed computing module 14 embodied in software and hardware components, which enables it to access network 2. Network 2 may comprise a combination of one or more private cloud networks and one or more public cloud networks. Front end interface 10A of user profile delivery system 10 is embodied in software and provides front-end code operating as a data storage and transmission interface with server 6. It includes import data source 102 and export data target 104. Data source 102 contains transmission data (userids/passwords, file commands, other input) related to client 4. Target data 104 contains responses from server application 6, including icon data, document files and desktop view data.

Server 6 comprises back end interface 10B of user profile delivery system 10, physical and virtual operating system 16, network layer 18 and various individual computing components 20, including physical and virtual network server 20A, webserver 20B, physical and virtual computer 20C, database 20D, physical and virtual server application 20E, synchronization module 20F, providing automatic synchronization of Hyper-V and SCVMM data objects and real time data, group policy management module 20G, VM creation module 20H, VM Templates 20I, VM Library 20J, dynamic resource assignment module 20K, Active Directory (AD) module 20L, private and public cloud resources 20M, load balancing and dynamic configuration of roles and services module 200. AD module 20L provides is access to a library of directory services defined by the AD services and protocols. Such services are implemented using a number of standardized protocols, including: Lightweight Directory Access Protocol LDAP; Kerberos-based authentication services; and DNS-based naming and other network information services. Group Policy provides a set of rules which control the working environment of user accounts and computer accounts and is a feature in Microsoft's operating systems. Back end interface 10B is embodied as software and provides an interface for server 6 to client 4 through its front end interface 10A and comprises communication server 106, an interface with import data interface 108, an interface with export data interface 110, generic format databags 112, rule processor 114, user profile data 116 and configuration management user interface 118. Databags 112 provide transport for a RPC interface and may contain string or serializable Java objects, WMI classes, PowerShell (trade-mark) command, scripts which may be invoked using a .Net framework using C# or C++ and data link libraries (DLLs) which get serialized and deserialized on each end of the connection with the communication server 106. Rule processor 114 defines and implements rules of operation for server 6. User profile data 116 provides data for export data target 104. Configuration management user interface 118 provides a module for controlling and assigning the user profile data 116.

Figure 21:
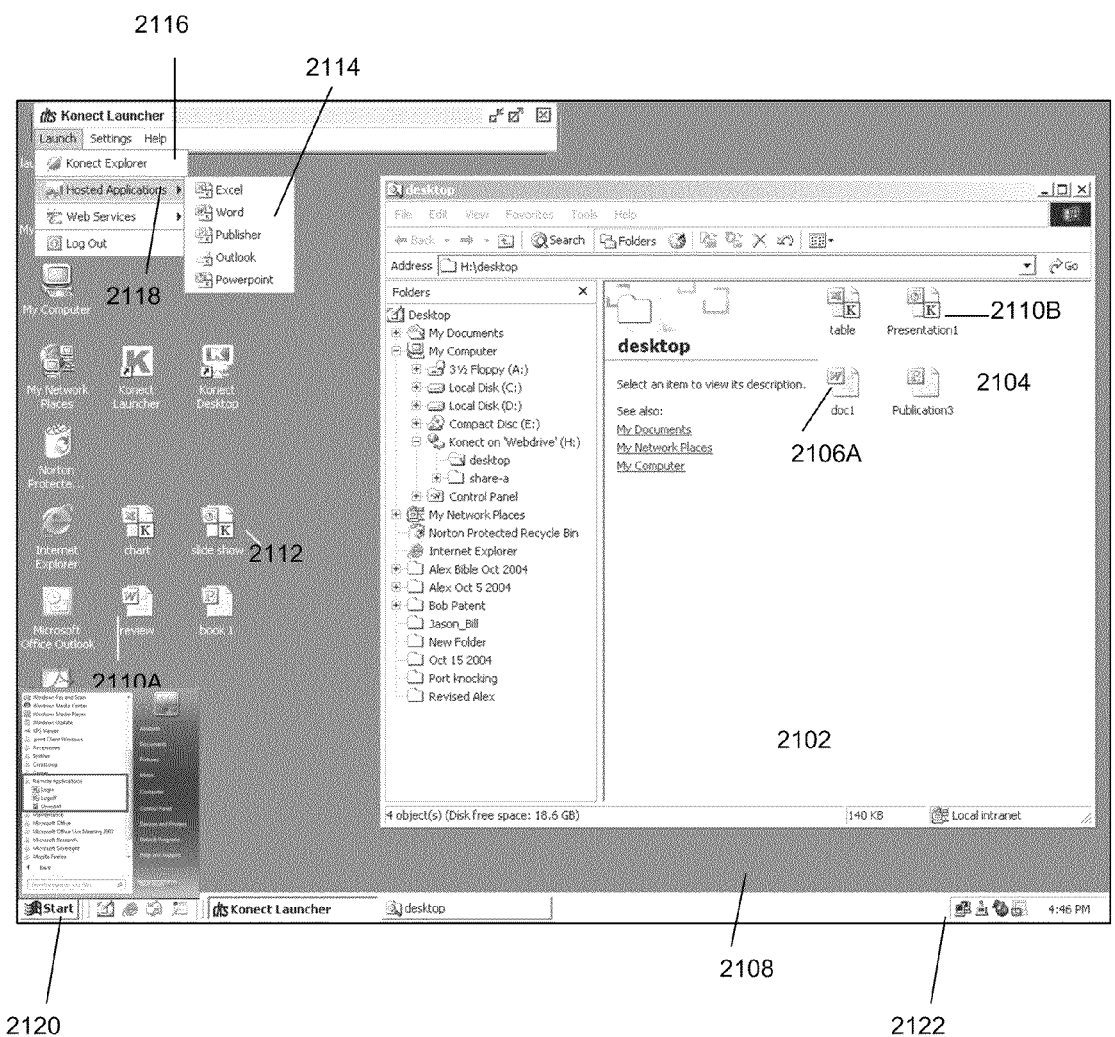
FIG. 21 is a diagram of a screen display of a GUI for an embodiment generated on a client associated with the network system of FIG. 1B.

Referring to FIG. 21, when a user at client 4 initiates the embodiment, on the display associated with client 4, screen 2100 is generated by software operating on client 4. The screen may provide interfaces to physical or virtual machine(s), thin clients, web pages, desktop launchers, system tray and start menu. Further, when the user authenticates onto server 6, he can view files/data stored in directories associated with server 6 as well as local files to network resources and services as provided in window 2102. These resources can be private and public cloud network resources and services. The server files and data may be dynamically integrated and created on the client interface and may be accessed using the client. In such an embodiment, the user may utilize web browsing software (such as Explorer—trademark) on the client to access files/data. Entries 2104 provide individual icon and text information relating to files/data associated with client 4. For example a Microsoft Word document (trade-mark) entitled "doc1" is listed is shown, with the title of the document and its associated icon 2106A. In client interface 2100, icon 2110 is showing a file located on client 4 which also uses the Word application. As is typical with client interfaces, activation of a mouse click when the mouse pointer (not shown) is upon icon 2110 will launch the associated (physical or virtual) application and/or virtual machine and open the file in the application. It will be appreciated that the user profile data interface on client 4 may be implemented as one or more types of interfaces both physical and virtual such as a desktop launcher, server desktop, client desktop, thin client portal, or a client-based system, system tray and start menu.

The embodiment can provide visual information to identify a location in the network of an associated application for a file. Icons 2112A and 2110B may have a subscript "K" displayed therein. This notation indicates that the location of the associated application/service does not reside on client 4, but on actually on server 6. It will be appreciated that in other embodiments, any other visual notation may be used, including using no notation.

In the top portion of window 2100, pull down menu 2116, 2120 and 2122 may also provide a list of additional physical and virtual services, applications and desktops available from both the private and public cloud provider to the user. Hosted application selection 2118 provides a listing of server-based applications 2114 which may be activated by the user. From the pull-down menu, a separate hot key 2116A, link or icon may be provided allowing a user to open a window 2102 on the client interface on client 4. From the pull-down menu 2118B web services may provide a listing of web-based applications which may be launched by the user on client 4. From the pull-down menu, server/web based applications may be visually differentiated from local applications by providing a different icon than an icon for a corresponding server-based application. In this particular implementation, the known icon for a Word application is augmented with a "K", as shown. Other visual keys may be implemented, including using no notation.

It will be appreciated that at client 4, the client interface providing information on elements/resources such as files, data, applications, services and web-based services can provide several types of icons and cues to a user at client 4 providing different information and access capabilities for the element through the client interface. For example, an icon can be provided representing a "shortcut" for its associated application/service. The shortcut icon can be displayed in the client interface on client 4. Icons may be populated on client interface dynamically creating 2119C shortcuts to networked elements/resources from server 6. These resources may also be accessed in the starts program and the system tray of the client 4. Published applications and services with their correct file/data type associations may be displayed on client 4. To the end user, these applications and services appear as they are locally installed on the client 4. Again, a special notation may or may not be used to indicate that these applications and services are from server 6.

The client interface, such as a GUI, may dynamically create a special link to a folder or link in a dedicated area of the GUI. Such a link or folder may provide a list of application/services and their associated icons for frequently accessed elements/resources on client 4. Such a folder or link may be labeled as a remote application folder. One dedicated area of the client interface may be in a frequently accessed area, such as in a start menu area 2119A in Microsoft Windows GUI or in an activation area. An activation icon/bar having information on system level matters of client 4 may be provided. The activation 2119B icon/bar may also include icons for accessing elements/resources on client 4. For example, in a Microsoft Windows GUI, an activation icon/bar may be located in a "sys tray" region 2119B which is generally located at the bottom right hand area of the client interface on the client 4. Other types of icons having other types of associations and functions may be provided.

Figure 3:
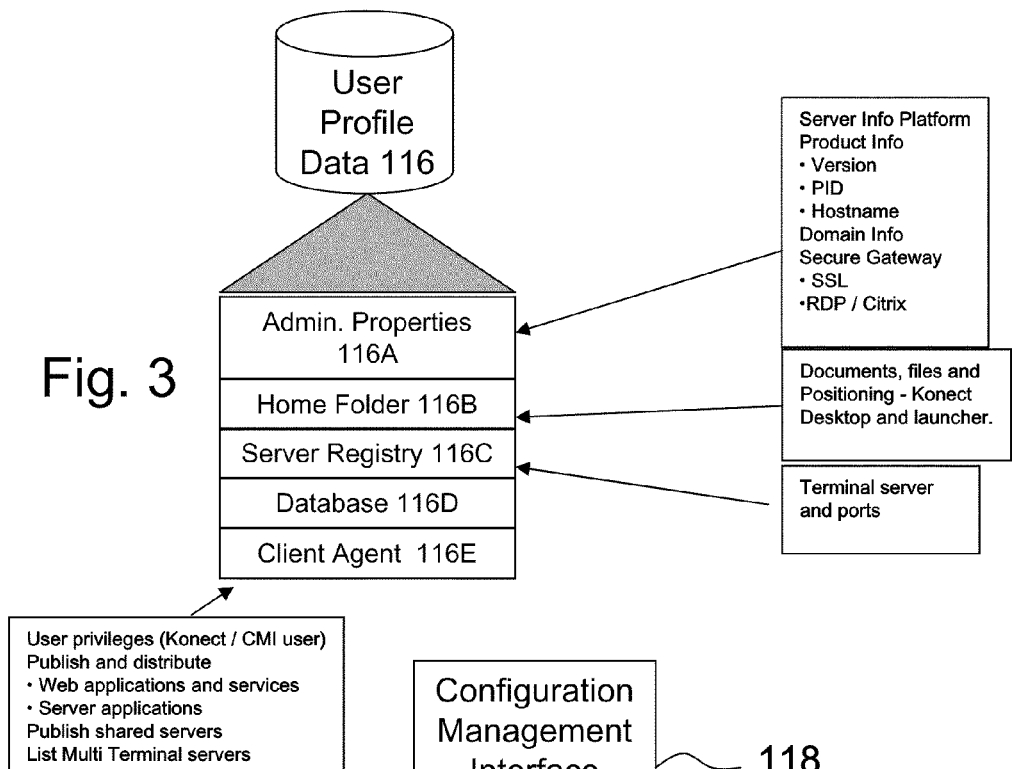
FIG. 3 is a block diagram of a user profile data structure used in the network system of FIG. 1B.

Referring to FIG. 3, in order to assist elements in network 2 to track location, privilege and sharing rights of files and applications, access data for a client 4 needs to be stored and communicated with server 6. In the embodiment, user profile data 116 is used for this purpose. It includes data relating to administrative properties 116a, home folder 116b, server registry 116c and database 116d and a client agent. In particular, user profile data 116 stores configuration information for back end interface 10B. Data for administrative properties relate to application settings, e.g. hostname, process id, version and installation location. Data for home folder contains a specific user's information, such as data relating to his shared folders, desktop (home) folder, icon positions and documents. Data for the server registry contains port and addresses data for the servers 106. Database 116d stores registered applications, published shares and server 106 information. The client agent provides read and write requests to and from the client to server and server to client. These settings in the user profile data may all be configured by a system administrator, via the configuration management console and the back end interface 10B.

Figure 4:
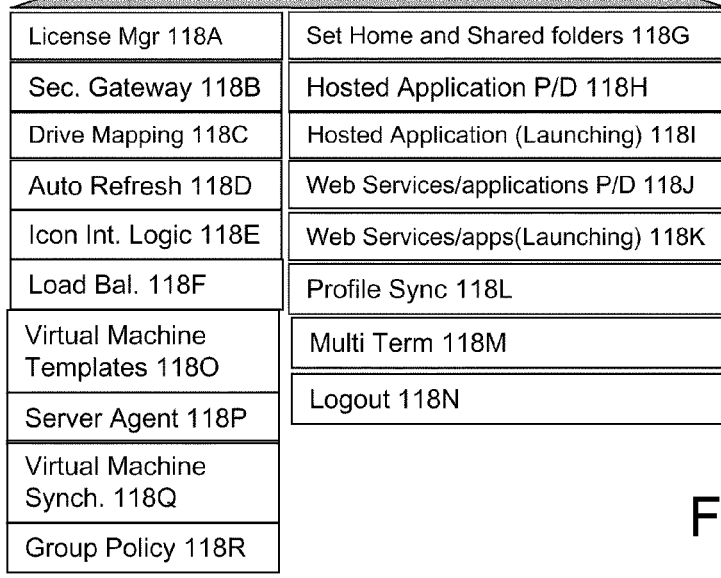
FIG. 4 is a block diagram of a configuration management user interface used to define the user profile data structure of FIG. 3 for the network system of FIG. 1B.

Referring to FIG. 4, similarly, in order to track access and privilege settings for an application by a client 4, configuration data needs to be stored and communicated within elements in network 2. As such, configuration management for the application is provided through a configuration management user interface implemented as a web application that allows a system administrator to configure the settings for the entire application. Configuration data is assigned as configuration management user interface data 118 and comprises license manager 118A, secure gateway 118B, drive mapping 118C, auto refresh 118D, icon integration logic 118F, load balancing 118G, set home and shared folders 118G, hosted application P/D 118H, hosted application launching system 118I, web services P/D 118J, web services application launching system 118K, Profile Synchronization 118L, Multiple Terminal Servers (Server Farm) 118M, logout functions 118N, VM template creation 118O, Server Agent 118P, Virtual Machine Synchronization 118Q and Group Policy Management 118R.

Figure 5:
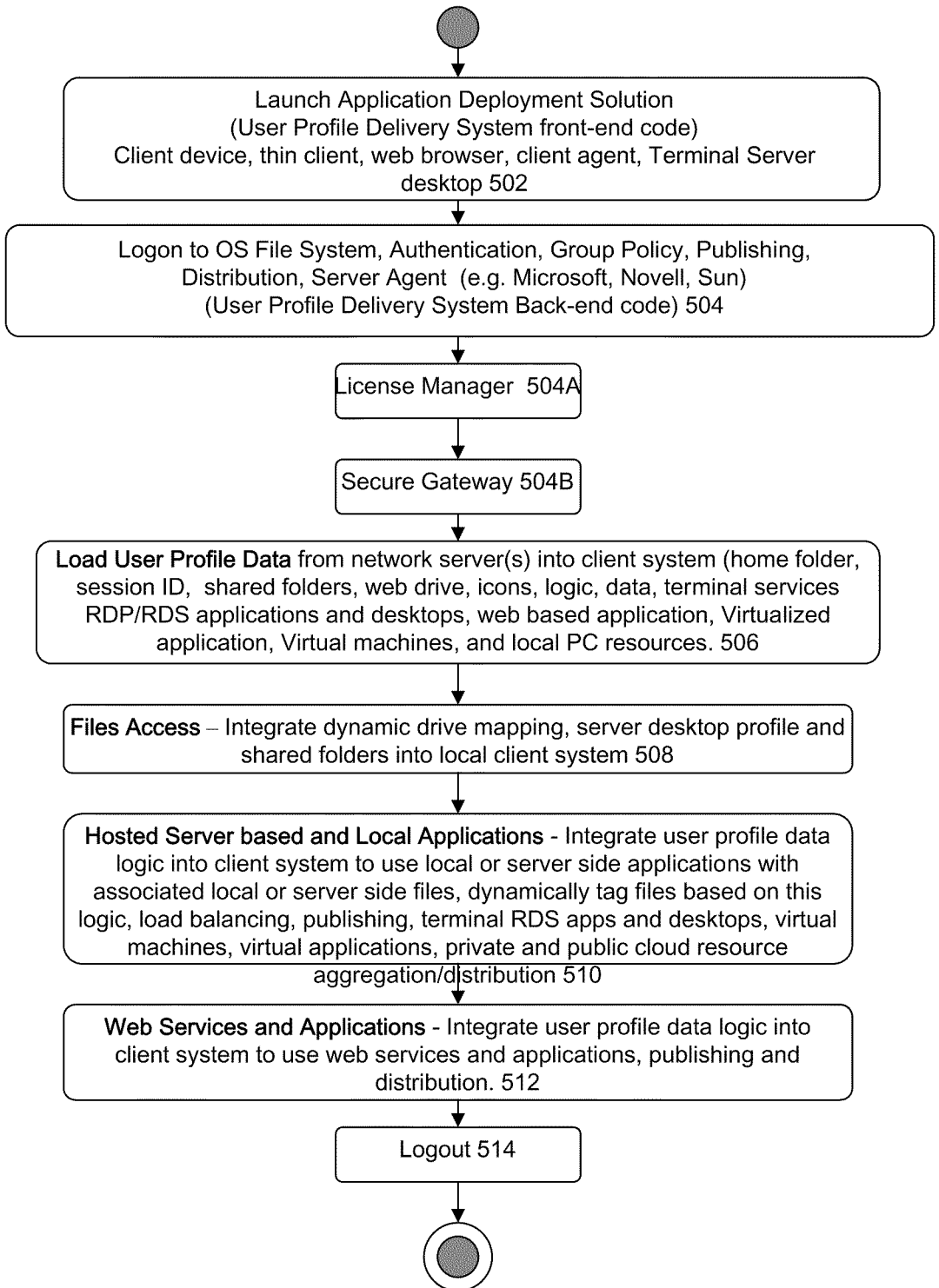
FIG. 5 is a flow diagram showing operations of the network system of FIG. 1B.

Referring to FIG. 5, in order for a client 4 to assess its privileges and access rights to files, applications and services with other elements in network 2, the other elements, notably server 6, need to obtain relevant access information from client 4. To assist in this process, client 4 delivers its data to server 6 through a delivery process. Flow chart 500 shows elements of the profile delivery process. In particular, to initiate the process in process 502 a user at client 4 launches delivery system 10 and invokes back end interface 10B through an appropriate signal carried over communication link 8. At process 504, to successfully launch a user's profile, the user needs to provide user identification credentials at logon to enable delivery system 10 to access back end interface 10B.

In process 504a license manager is invoked once communications between client 4 and server 6 are established. The license manager monitors the number of users accessing server 6 to ensure that there are enough valid user licenses available for the software, before authenticating a user to his user specific user profile. In process 504b secure gateway can be turned on or off to access server 6.

In process 506 once a user is successfully authenticated, back end interface 10B exports user's profile data 116 via the server communicator 106 to export data target 104. User profile data 116 that is loaded into client 4 is used to interpret the user profile data interface, specific to each user and contains all the user rights and access privileges to network resources assigned to that user via the configuration management user interface 118. User profile data 116 contains attributes allowing the user to the following data: home folder, session ID, server desktop files and folders, shared folders, web drive, icons, logic, data, terminal services published applications and desktops, web based applications and services, virtual machines, virtualized applications, Group Policy and AD permissions and local PC access and local PC integration of server resources.

In process 508 user profile data contains attributes that dynamically map the local client 4, thereby making single or multiple server-network folders, files and shared folders available to the user via client 4. During configuration, back end interface 10B stores the data of all published servers and PCs available to all users in the Users profile delivery database 116d. At runtime, the system retrieves which servers and shares are permitted access to the individual client user and builds a hierarchy of shares in IIS, complete with access permissions, mapping each individual share to a WebDAV folder in that user's unique virtual directory. WebDAV is the Web Distributed Authoring and Versioning extensions supported by IIS to allow bidirectional file access via HTTP/HTTPS and virtual directory refers to an IIS virtual directory.

In process 510, server-based hosted applications are published and distributed to specific users via the configuration management user interface 118. User profile data 116 dynamically checks for both local and server published and distributed applications and their associated icons. User profile data 116 uses icon logic to accurately populate the user profile data interface on client 4. Files on client 4 using server-based application may be tagged with a unique smaller second image icon object that may be integrated into the standard desktop icon image object of client 4 to differentiate files that are utilizing a server-based application versus a local application. Back end interface 10B may publish and distribute server-based applications to multiple servers to improve performance to multi-user environments. Servers can be grouped into server farms with each farm with its own distribution method and rule set. Server 6 may allow listing of several servers IPs in the server registry and then allow a distribution load balancing method of accessing hosted applications to be selected respective to the amount of users requesting this service. Distribution methods such as CPU load monitoring, round-robin methods, per-user per server count and random distributions. Network resources can include a mix of both private and public cloud resources within user's profile.

In process 512, server 6 publishes web services and applications for distribution to specific users via configuration management user interface 118. The user profile data will accurately populate the user profile data interface on client 4.

In process 514, a logout process is provided wherein server 6 closes the user profile data interface on client 4. As a GUI, the user will click on the "x" in the top right hand corner of the active window or from the pull down tab selecting logout. Selecting yes will logout the user and disconnect his user profile session.

Figure 6:
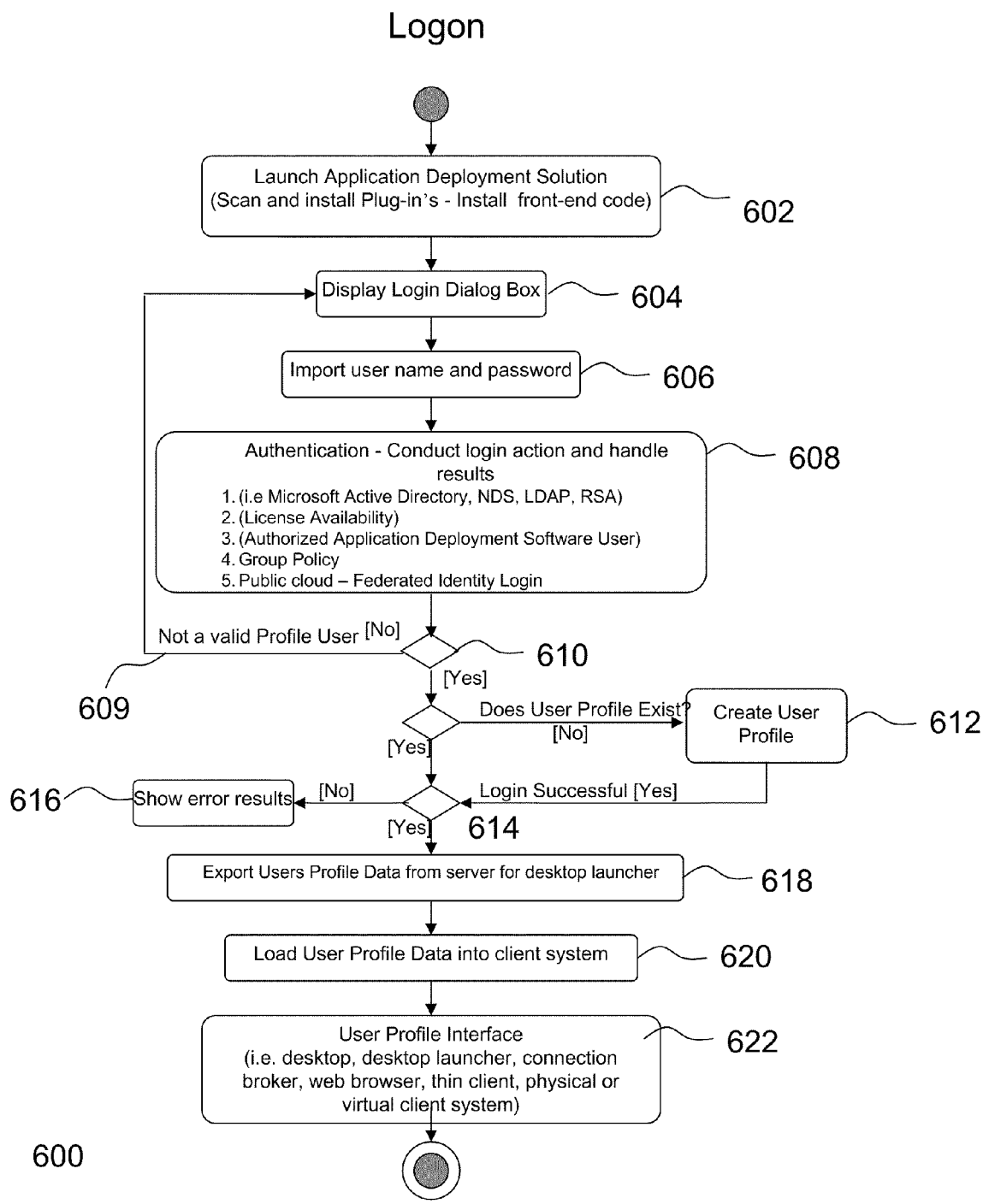
FIG. 6 is a flow diagram showing login operations of the network system of FIG. 1B.

Referring now to FIG. 6, as part of the accessing of information a user at client 4 needs to first access delivery system 10. This access is provided through login routine 600. Therein, at process 602 the user launches from client 4 user profile delivery system 10a, which then invokes back end interface 10B by through a signal sent over link 8. It may be necessary to require a one-time install of a plug-in such as an active X or JVM plug-in to run the application. Client 4 scans and detects if the plug-in is installed and, if not, a user will be prompted to install the plug-in. Thereafter, delivery system 10 may be installed onto client 4. Once installed, in process 604 the user is prompted with a display login box on client 4. In process 606 the user is required to input specific credentials such as user name and password by way of an external input means interfaced with client 4, such as a keyboard. Import data source 102 is then sent via the import data interface 108 to the server communicator to retrieve the user's profile data 116. In process 608, the import data bags 112 are processed through the rule processor 114 to handle results. Rule processor 114 uses known authentication protocols such as those provided through AD objects, Novell Directory Services (NDS), LDAP, RSA security, federated identities, or any other type standard authentication protocols to authenticate users. A federated identity is used for public cloud or third party providers outside of the user's network. The user must also be assigned as a valid user of the system via the configuration management user interface. At decision point 610 if the user is not a valid user on server 6, the user will be prompted with the login dialog box and text display telling the user "login failed" at 609 and the user is required to retype his user credentials. In process 612, if the user is a valid user on server 6, the user is required to have an existing user profile on server 6. If the profile does not exist, the user profile is created for the user by the user profile delivery system. At decision point 614 if there is a problem with creating a user's profile on server 6, an error message is displayed to the end user that the user profile does not exist at process 616. If the user and a user's profile exist on server 6, the user is successfully authenticated at process 618. The user profile via back end interface 10B will then get/retrieve and export the user's profile data 116 via server 106 to the export data target 104. At process 620, user profile data is loaded onto client 4. At process 622, user profile data interface is used to interpret the user's profile data on client 4. It will be appreciated that the user profile data interface on client 4 may be implemented as one or more types of interfaces such as a desktop launcher, server desktop, connection broker, web browser, thin client, or a physical or virtual client-based system.

Figure 7:
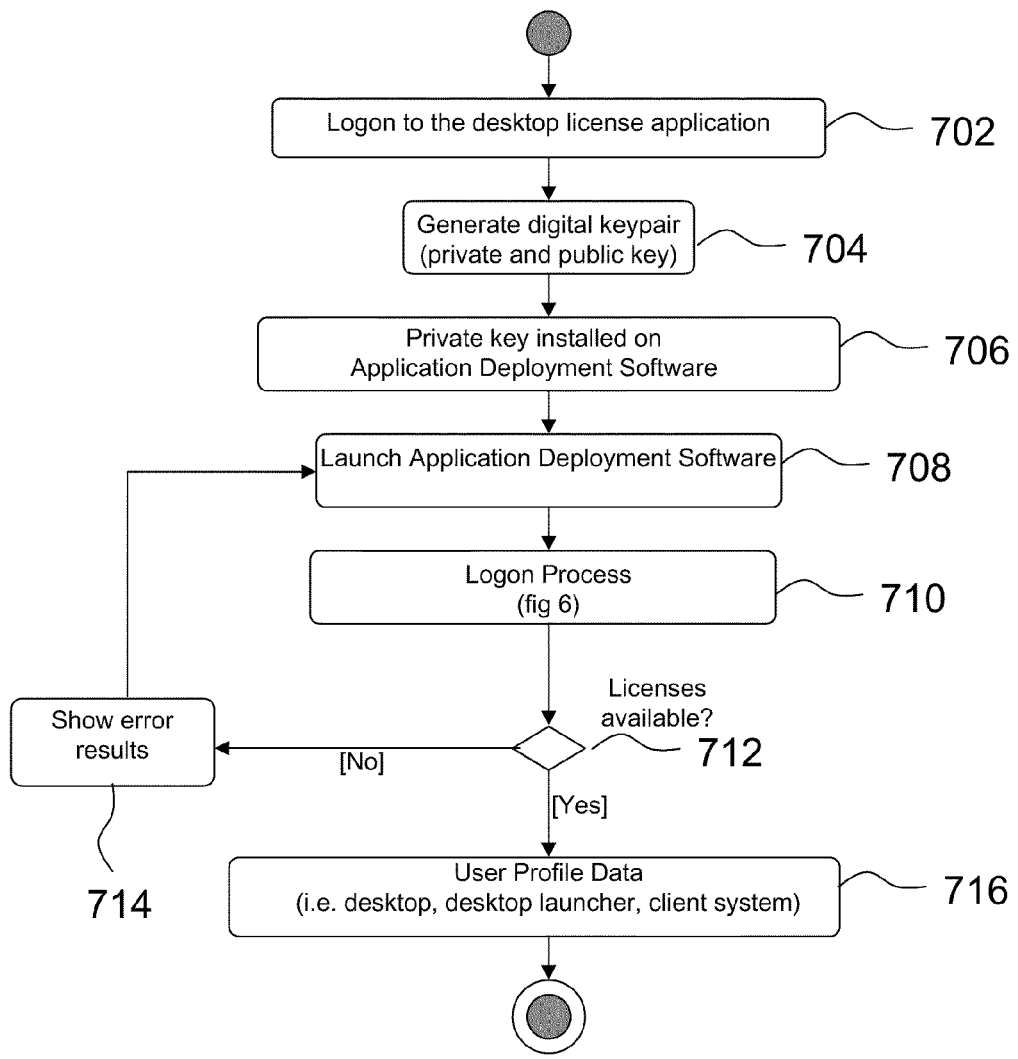
FIG. 7 is a flow diagram showing generation of a license key to manage valid users of the network system in FIG. 1B.

Referring now to FIG. 7, a license manager routine implements a logon process as shown generally at 700 confirms that a valid license for a set number of concurrent users for the Application Deployment is available for a user who is attempting to login to access their User Profile Data on the server. A user will be unable to utilize the system if a valid license is not available. Only the license key generated by the license manager application is sent to the administrator. The license key is installed onto server 6 via configuration management user interface 118.

At process 702, the license keys for the application deployment are generated by a system administrator using a license manager application. Upon a successful logon to license manager application, at process 704 the license manager application generates a license key which encodes the number of users able to concurrently logon to the server and contains a digital key pair that preferably will only work with a specific version release of application installed on client 4. The digital key pair generated is made up of both a public digital key and a private digital key. The public key is integrated into back end interface 10B. At process 706 the private digital key is encoded in the license key for the specific version release is delivered to the customer via email or CD format and is installed on server 6 via configuration management user interface 118. At process 708, when there is a match between the private key and the public key the user is provided access to the system. At process 710, server 6 checks whether there is a valid license available for the user attempting to logon to server 6 to access his user profile data. At process 712, if a license is not available, the user will be prompted by an error message 714 informing him the situation. If there is a valid user license available, the user will successfully complete the logon process. Subsequently, at process 716, the user profile data interface interprets the user profile data on client 4.

Figure 8A:
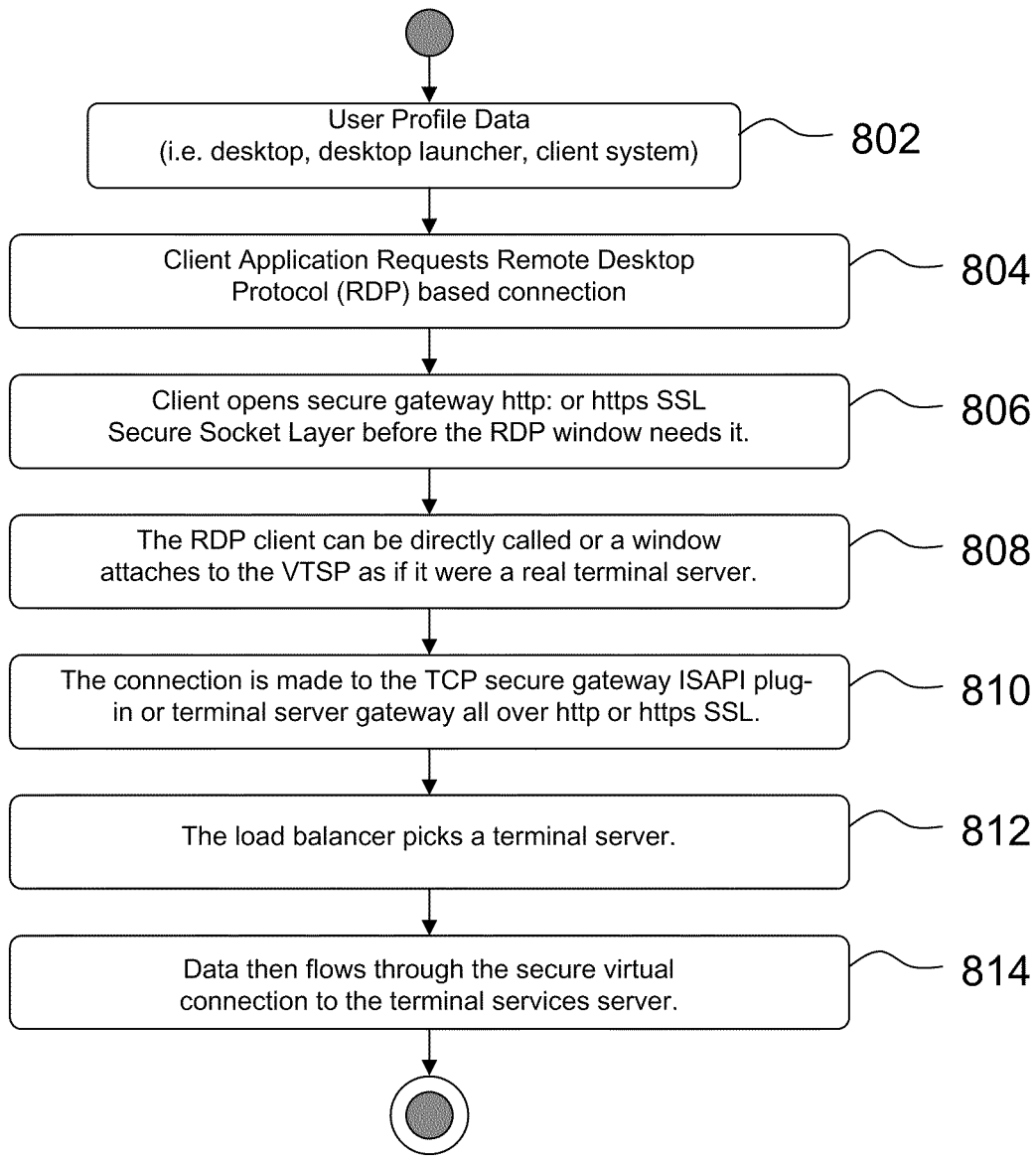
FIG. 8A is a flow diagram showing set-up for a gateway operation of the network system in FIG. 1B.
Figure 8B:
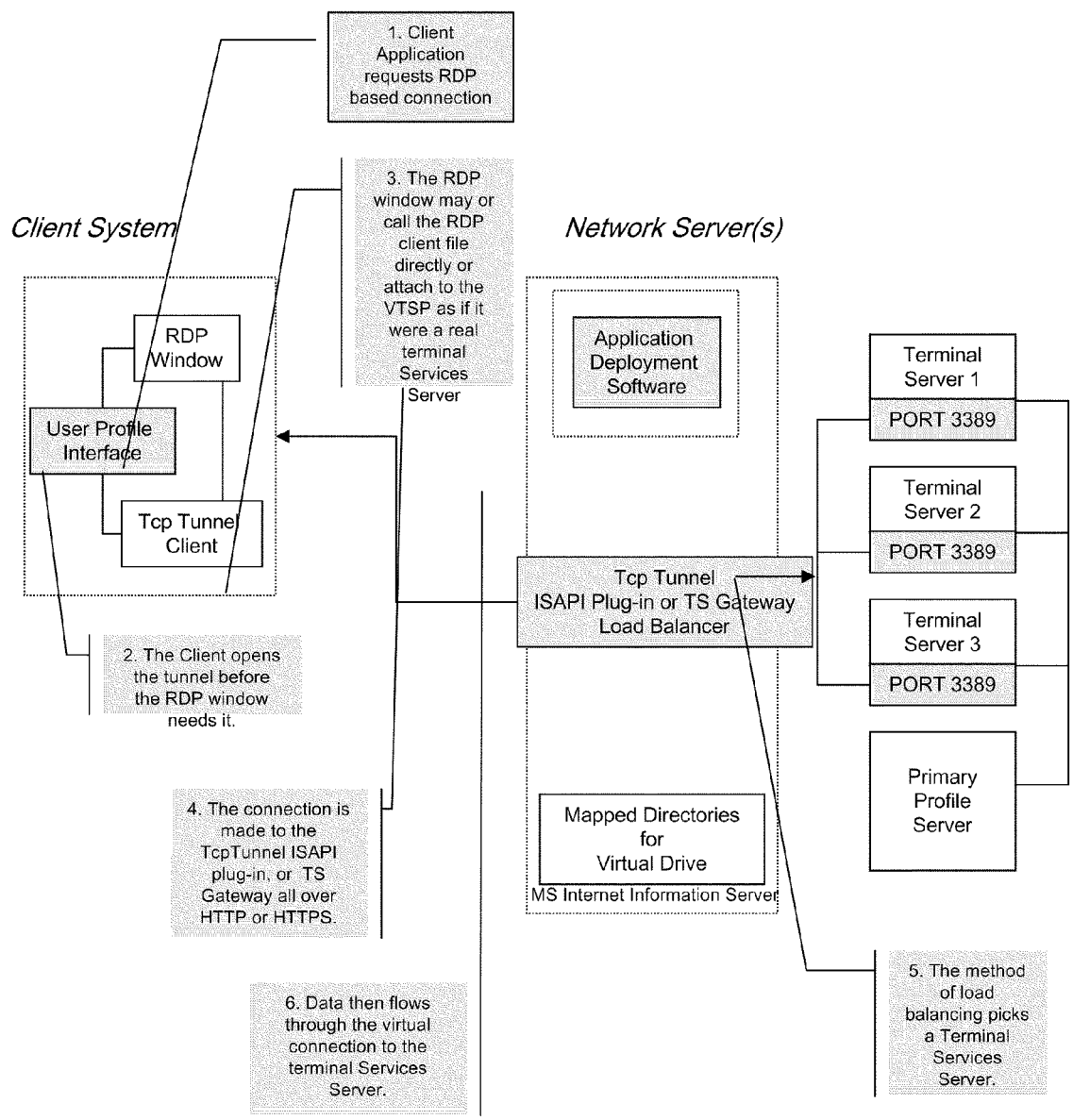
FIG. 8B is a network diagram showing data rules, setup and operations performed by a gateway operation for the network system of FIG. 1B.

Referring now to FIGS. 8A and 8B, the secure gateway sets up a secure tunnel between client 4 and server 6 when using hosted server-based applications, as shown generally at 800. The secure gateway provides a tunnel for all server-based application data from network terminal services on server 6 through standard ports 80 (http) and 443 (https). This allows the network to function without compromising security by having to open additional firewall ports to extend hosted server-based hosted applications from one or more server 6.

The secure gateway may require a one-time install of a plug-in such as an active x plug-in on client 4 to run the hosted server-based application. Client 4 can scan and detect if the plug-in is installed, and if not, a user will be prompted to install the plug-in. Once installed, each user from their user profile data interface may access user specific hosted server-based applications that have assigned to them as defined by the configuration management user interface. At process 802 the user profile data is used to interpret the user profile data interface on client 4. At process 804 from the user data interface (which could be one or more, or a multitude of interfaces such as a desktop launcher, server desktop, or client 4), the user can invoke secure gateway tunneling by requesting a server-based hosted application, using for example a RDP based connection. The user request is sent from client 4 to server 6 via a created RDP file or a wrapped MSTSC OCX file (Microsoft Terminal Connection Server OLE Control eXtension file) that calls MSTSC to request a RDP connection from client 4 to server 6. Server 6 then establishes a TcpTunnel directly to the RDP client or may use an ISAPI plug-in, which reads the configuration information from server registry 116c. The TcpTunnel plug-in is directed to several Terminal services, of which one can be client 4 that the plug-in is running on. At process 806, client 4 opens the TcpTunnel before the RDP window needs it. The RDP window then directly connects to the RDP client or may attach to the Virtual Terminal Services Port (VTSP) as if it were a real terminal services server at process 808. Client 4, when ready to connect to the Terminal Server behind the firewall, starts its tunnel, creating a Virtual Terminal Services Port (VTSP). When the client requests a connection it may create first a RDP file on the local client machine dynamically, it then may the RDP client to open the file. It the sends the request to a terminal server gateway. The terminal server may require the user to provide valid credentials to access terminal server behind gateway firewall. If successful, the terminal server gateway sets up a tunnel between the client machine and the target server via the terminal server gateway. The client may also begin to send connection information across the wire through the VTSP.

At process 810 a connection is made to the TCP secure gateway ISAPI plug-in or terminal server gateway all over http or https SSL. Using an ISAPI plug-in, client 4 can issue five commands for a connection:

(1) open—This command opens a connection. The command indicates to server 6 that a tcp connection is imminent. It initiates buffers to be allocated and opens the port at server 6 to the destination server.
(2) close—This command closes a connection. A connection is also closed when a connection is broken.
(3) write—This command sends data to an open connection. This command requires no response. It leaves the HTTP/1.1 connection alive, which lowers lag time.
(4) read—This command starts a response thread, which is kept alive and delivers data back to the client as the destination server has data to send.
(5) readwrite—This command performs one complete read and write of the data.

Typically, this command is only used when client 4 cannot communicate with the separate requests. Using terminal server gateway client 4 uses MSTSC to setup and to initiate secure tunnel.

In one embodiment, port knocking for an available port may be used to identify an available port at the server side. To initiate port knocking, the system can call an appropriate routine, such as TcpKnock.startKnockServer (int portLow, int portHigh), where the portLow and portHigh identify a start and end of the port range opened on the firewall for the knock service. It will be appreciated that port knocking does not require a specific port to be mapped to a specific server. Instead, a specific port sequence knock within a range of available ports is provided to identify an appropriate port to be dynamically mapped to a specific server. The embodiment can also use a terminal server gateway One of those ports may be randomly used for the load balancing connection to server 6. When client 4 is connecting to server 6, at server 6, it calls String combo=TcpKnock.GetCombination( ). The return value is provided to client 4 and identifies the int port=TcpKnockClient.StartConnection(combo) on which to perform porting knocking to identify an appropriate port to open. Once the value is returned, client 4 uses the port number to dynamically map available port to connect to server 6. When client 4 connects to that port (on the WAN interface) with the RDP client, the traffic is routed directly to the target server 6. Without knowing the specific sequence of knocks within a specified port range, all requests that try to scan or access these ports may be rejected. For example, if the port knocking range is from 1600 to 1610, the port knocking sequence will open one of those ports by using a sequence knock established by the server to client for that specific application session. Each application session that is established will have its own knock sequence. When the port is open it will be dynamically mapped to a specific target server port 3389. When the session client 4 is complete, it does not need to do anything further to close the connection, as the RDP connection is closed automatically when the window is closed:

On the server side, at process 812 load balancing is performed. The TcpTunnel plug-in is aware of multiple targets, for when the server wants to use a specific method of load balancing terminal services server. Different methods of load balancing may include CPU load monitoring, round robin method, per user per server count and random. Further detail on load balancing is provided later. At process 814, data on the client 4 then flows through the virtual connection to the terminal services.

Referring to FIG. 8B, the secure gateway may use a port knocking service or terminal server gateway COM object to enhance the software load balancing feature. The gateway may be implemented as a service running on the server 6. Client 4 communicates with server 6. Server 6 comprises a secure gateway, and a server containing a set of network applications. Client 4 communicates with server 6 through messages generated locally and transmitted over link 8. Client 4 initiates an access for an RDP application by generating a request message to server 6. Client 4 preferably is required to be authenticated prior to launching any applications on server 6. An AD object in server 6 may be accessed by server 6 to authenticate client 4. Various authentication systems and techniques known in the art may be used, including processes such as LDAP, Novell Directory services and others.

To initiate port knocking, the port knocking service must be active ("on"). Server 6 receives client request to access application; the port knocking service generates a port sequence/key for client 4; and server 6 sends the port knocking key sequence to for the requested application back to client 4 via a message over link 8. When a user at client 4 initiates an application or service, the system may send the key/sequence, client data and IP, user id and the application requested, which then forwards the request to gateway and the port knocking service. The port knocking service generates a query for a load balancer associated with TS server and retrieves the proper application or service IP address. The port knocking service sends applications and/or services IP addresses to server 6 and creates a working directory on the server 6 where these settings are stored. The server 6 then sends the application and services IP to client 4. Client 4 performs port sequence/key knocking on the designated port set in by server 6. If the port sequence/key knocking is successful, the port knocking service will connect the selected application on server 6 and relay the connection from client 4 to TS server.

Figure 9:
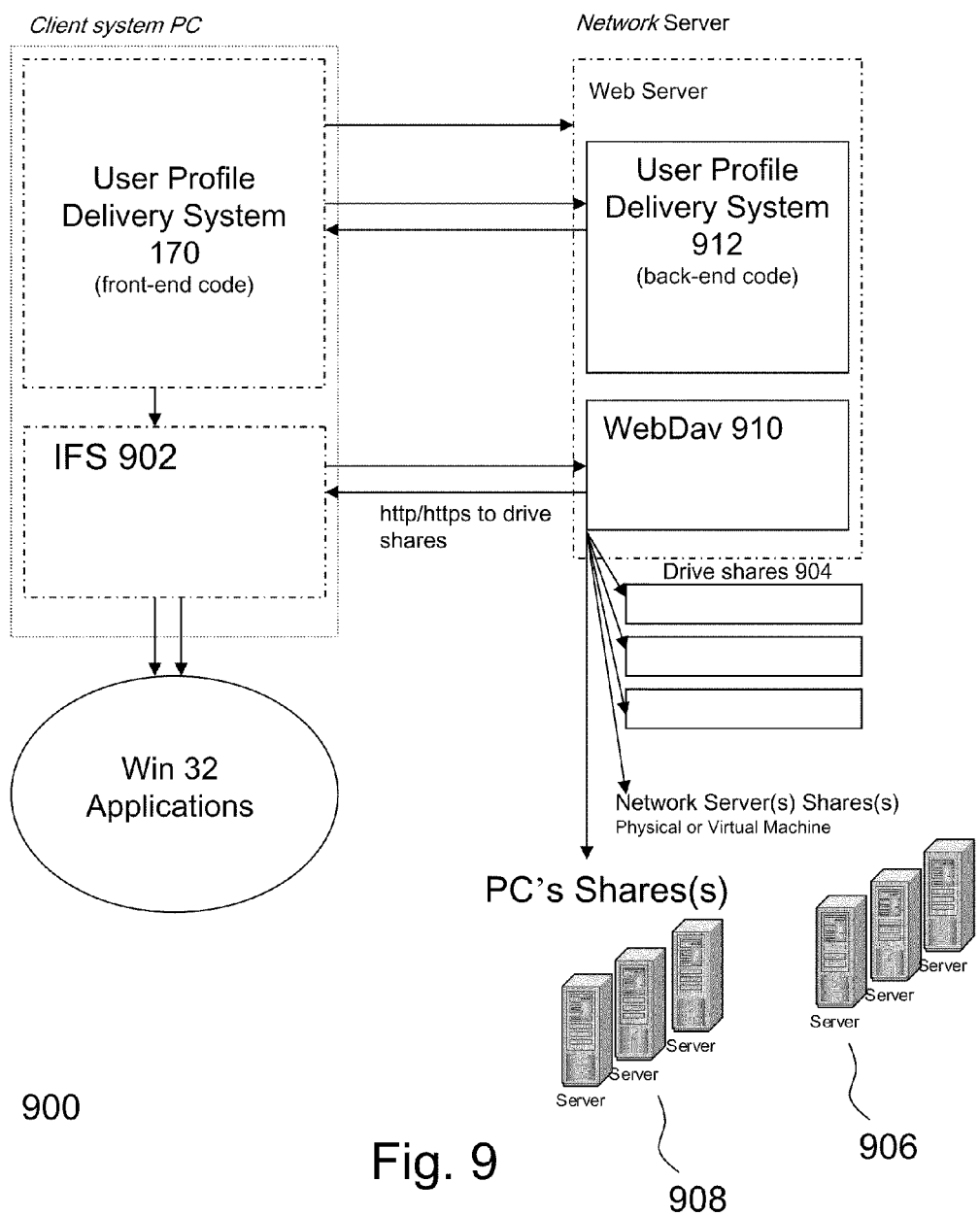
FIG. 9 is a block diagram of the network system of FIG. 1B, during a mapping component operation.

Referring to FIG. 9, after a user at client 4 has signed onto the system, an aspect of the embodiment allows client 4 to access files, applications and services (such as web services) from server 6 as if the files, applications and services were stored locally on client 4. In providing this aspect, virtual drive-mapping component 900 is provided on client 4 and provides the user with a bi-directional view of data, files and folders from server 6 using back end interface 10B from local and remote sources. In particular, from client 4 to server 6, users can see data, files and folders from server 6 on client 4. Also, server-based applications and services can access a virtual drive mapping on client 4. Drive mapping component 900 is installed with the other components described earlier in relation to FIG. 2. Rule processor 114 (FIG. 2) builds the user profile data that drive mapping component 900 uses to setup the hierarchy of folders on client 4 that contain the user's individual drive shares and the common drive shares from file servers.

To provide bidirectional views, a virtual drive-mapping component dynamically sets up a client 4 with a bi-directional virtual drive that contains a user's data, files and folders from server 6, including LAN PC shares on client 4. To the user, the virtual drive is accessed as if it were a local drive on client 4. It is mounted as a drive letter using any free letter the machine may have. Virtual drive-mapping component 900 also monitors for changes in data, files and folders to synchronize information between client 4 and server 6 after a user has successfully logged onto his user profile data interface from server 6. Using virtual drive-mapping component 900, data, files and folders are transparently moved between client 4 and server 6 via communication link 8. To facilitate the virtual drive mapping, client 4 has an Installable File System (IFS) 902 that communicates at the operating system level to provide a bi-directional view for the user using the local client 4 and client applications (both local and server-based applications). The server 6 dynamically builds a virtual directory at the server directory level. Then, the IFS from client 4, reads this virtual mapping directory. Depending on the client's selected preference in searching applications (i.e. to search for either local or server applications first), the user profile obtains and stores an inventory of both local and server-based application, their extensions and their associated icons. The user profile also reconfigures the local client 4 to utilize this application to file association. The client bi-directional view means that a user can use either a local or server-based application to save file back to the server using the virtual drive mapping. For example the bi-direction view allows a local client application to save a file to the server. Therein, when a local word application is used on client 4, the user is able to: open the word application; edit document; and select "save as" and identify a server folder located by the dynamically virtual mapped drive on the client 4. As another example, the bi-directional views allow using a server hosted application to save a file to the server. Therein, when a server word application is activated on the client 4, the user is able to: open the word application; edit a document; and select "save as" and identify a server folder located by the dynamically virtual mapped drive on the client 4. In operation for the user, the virtual drive is assigned a drive letter that appears to be just like any other locally mapped drive. IFS 902 may be integrated into delivery system 10 and is loaded transparently for the user. The virtual drive-mapping component on client 4 dynamically selects the first available drive letter not used on client 4. The system may, once granted security access via a signed certificate that accompanies the download, dynamically install new drivers allowing IFS 902 to map in new drives if needed. The IFS allow multiple paths 904 on the physical and virtual network-server 906 and PCs 908 within a LAN or WAN to be mapped into a single drive letter on client 4, building a complete virtual drive which may include the user's home profile and multiple shared data, drives, folders and files on one or more network-server and personal PCs.

The virtual drive-mapping component dynamically maps client 4 using rule processor 114 (with rule sets defined in the user's profile data), which utilizes an authentication protocols, such as those provided in AD objects, to determine what access rights and privileges a user has to the server and personal PCs within a LAN or WAN. Using the windows API and these access rights and privileges, the WebDav server 910 is created to dynamically map the user's shared data, drives, folders and files into a specially configured web server that provides access to these server 6 and PCs share within a LAN or WAN. These access rights and privileges are then extended and utilized by the virtual drive-mapping component on client 4 to dynamically map client 4. The virtual drive-mapping component communicates with back end interface 10B of server 4 via any of one of several types of connections, including: an Internet/Intranet/Extranet connection; dial-up connection; VPN connection; wireless connection; LAN; WAN; DSL/High speed connection or any other network connection. This allows a standard security measure to be installed, without the need to build additional modules. The WebDav component is installed in server 6 and may be hosted from a variety of WebServers including IIS from Microsoft, Apache and Tomcat. WebDAV is the Web Distributed Authoring and Versioning extensions supported by IIS to allow bidirectional file access via HTTP/HTTPS. Extensions exist to support WebDAV on other HTTP/HTTPS servers as well. This, coupled with the use of WebDrive as the IFS (Installable file system) on client 4, a drive letter is mapped into a virtual directory on the server, which contains the hierarchy of shares created in process 508.

Figure 10:
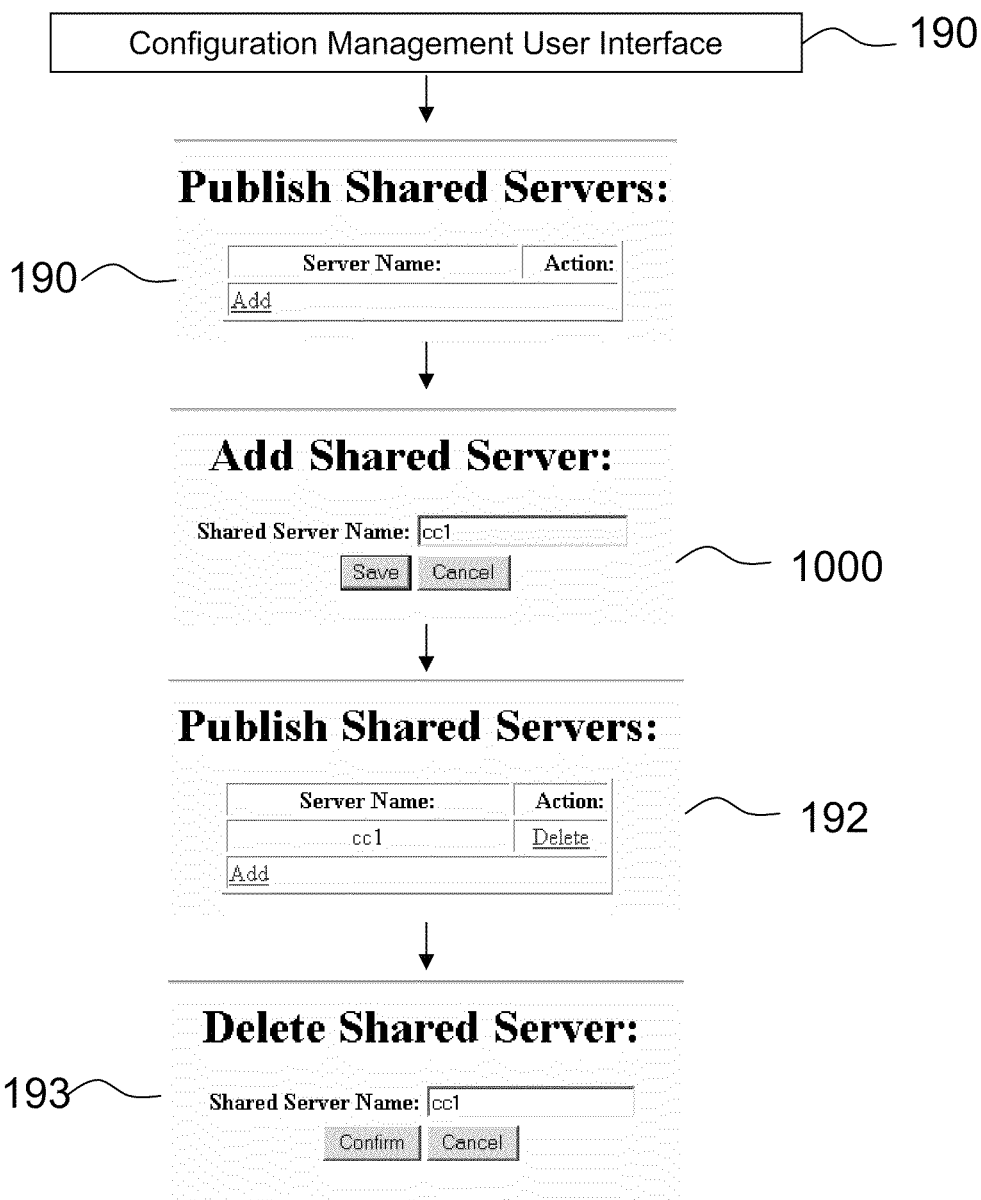
FIG. 10 is a diagram showing an exemplary access control GUIs for the network system of FIG. 1B.

Referring to FIG. 10, detail is provided on access control by a client 4 to servers 6. As an interface, GUIs within the configuration management user interface are used to control access levels for users to servers 6 and PCs within a LAN or WAN environment. A user may have access to one or more shared servers 6 and/or PCs as defined by configuration management user interface 118. One of many views and ways to do this is for the administrator to add the specific server and/or PC via the configuration management user interface. A physical or virtual server and/or PC may be published via an "add" command. In this example the server name "cc1" is provided to the shared server name dialog box 1000. The server name may then be canceled or saved into the database within user profile data. Once published, the user may have access to one or more specific shared server and/or PCs that are defined by his user profile data, which is retrieved from back end interface 10B. Server 6 and PCs are dynamically mapped at both the server 6 and client 4. Shared server and/or PCs can also be removed by selecting the delete function of the specified server or PC. Selecting "confirm" will delete the specified server and/or PC via the configuration management user interface. Selecting "cancel" will abort the delete operation.

Figure 11:
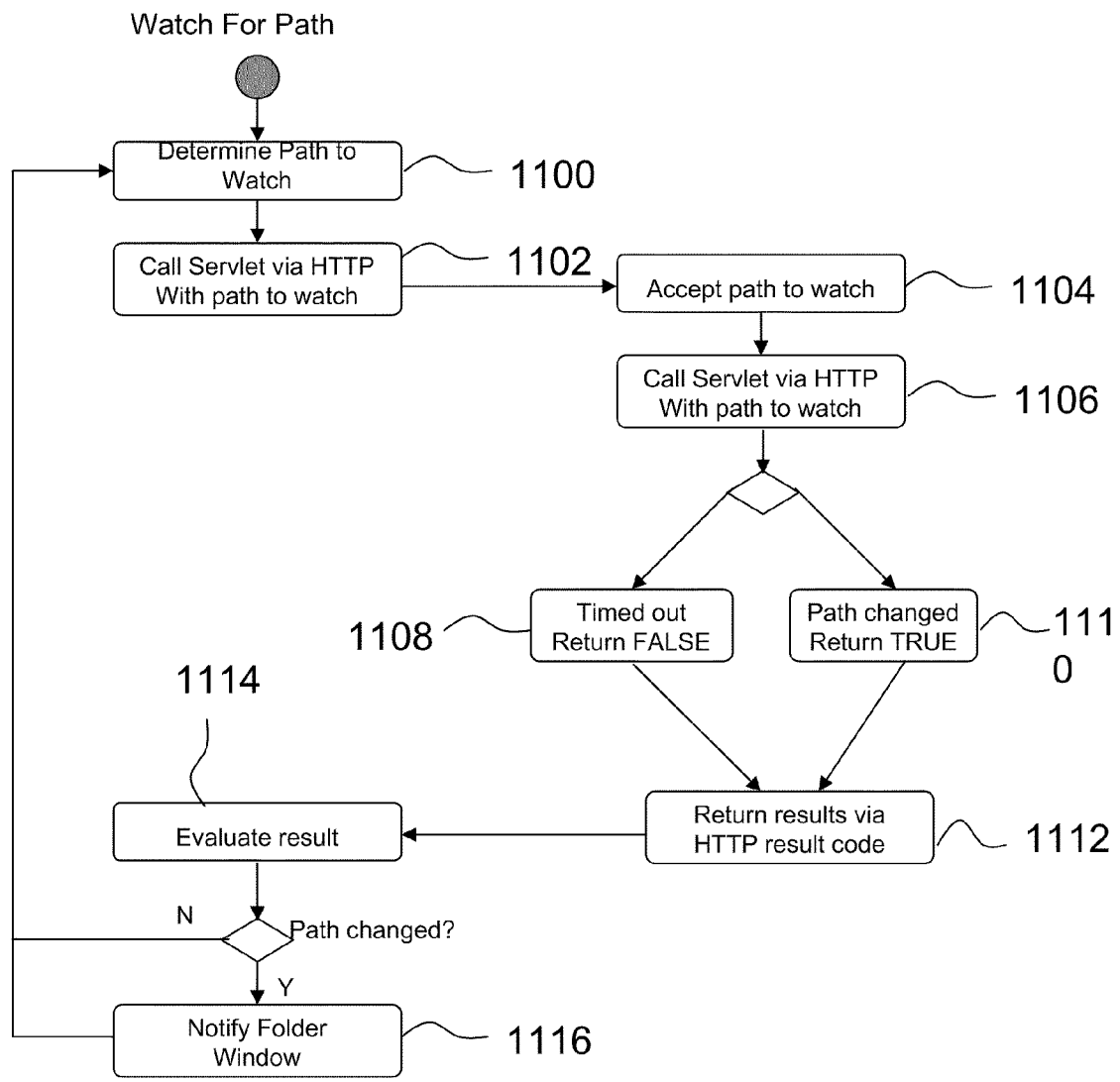
FIG. 11 is a flow diagram of an auto refresh function performed by the network system of FIG. 1B.

Referring to FIG. 11, as the system operates in real time, files, applications and servers may be dynamically added and deleted. The embodiment manages updates of system information for client 4 using an auto refresh module. The logic flow of the auto refresh module has first at process 1100 virtual drive mapping component 900 determining appropriate path or paths that must be monitored on server 6, by the auto refresh module to any changes to server data, files and folders. This auto refresh module synchronizes both client 4 and server 6 to ensure users have access to server data, files and folders is accurately represented on client 4 in real time. At process 1102 once the path or paths have been established, the user profile data interface establishes a loop, which periodically asks server 6 if the path and/or paths have changed. At process 1104, the server communicator 106 on the network-server handles the request using an application interface (API) such as the Win32, or Linux APIs that calls the servlet which monitors the path or paths for any changes per process 1106. Any timeout deadline may be set. In an embodiment a timeout deadline of 15 seconds is set. When the API times out process 1108 is taken and an indicator will be returned to the user profile data interface indicating that the path and/or paths did not change, such as FALSE, but any other indication may be utilized. If the server communicator 106 notes that the path or paths has changed prior to the timeout deadline, then no timeout will occur. At process 1110 a code will be returned to the User Profile Delivery System front-end code indicating that the path and/or paths did change. The code may be TRUE, but any other code indicator may be utilized. At process 1112 the code will be returned to the user profile data interface for evaluation.

At process 1114 the user profile interface evaluates the code that is sent to it to determine available paths. If the available paths have changed, the user profile interface will notify the system at process 1116 to refresh the user profile data interface on client 4 to accurately reflect and synchronize with server 6 in real time. This loop will continue to be performed until the user profile data interface is destroyed or closed.

Figure 12:
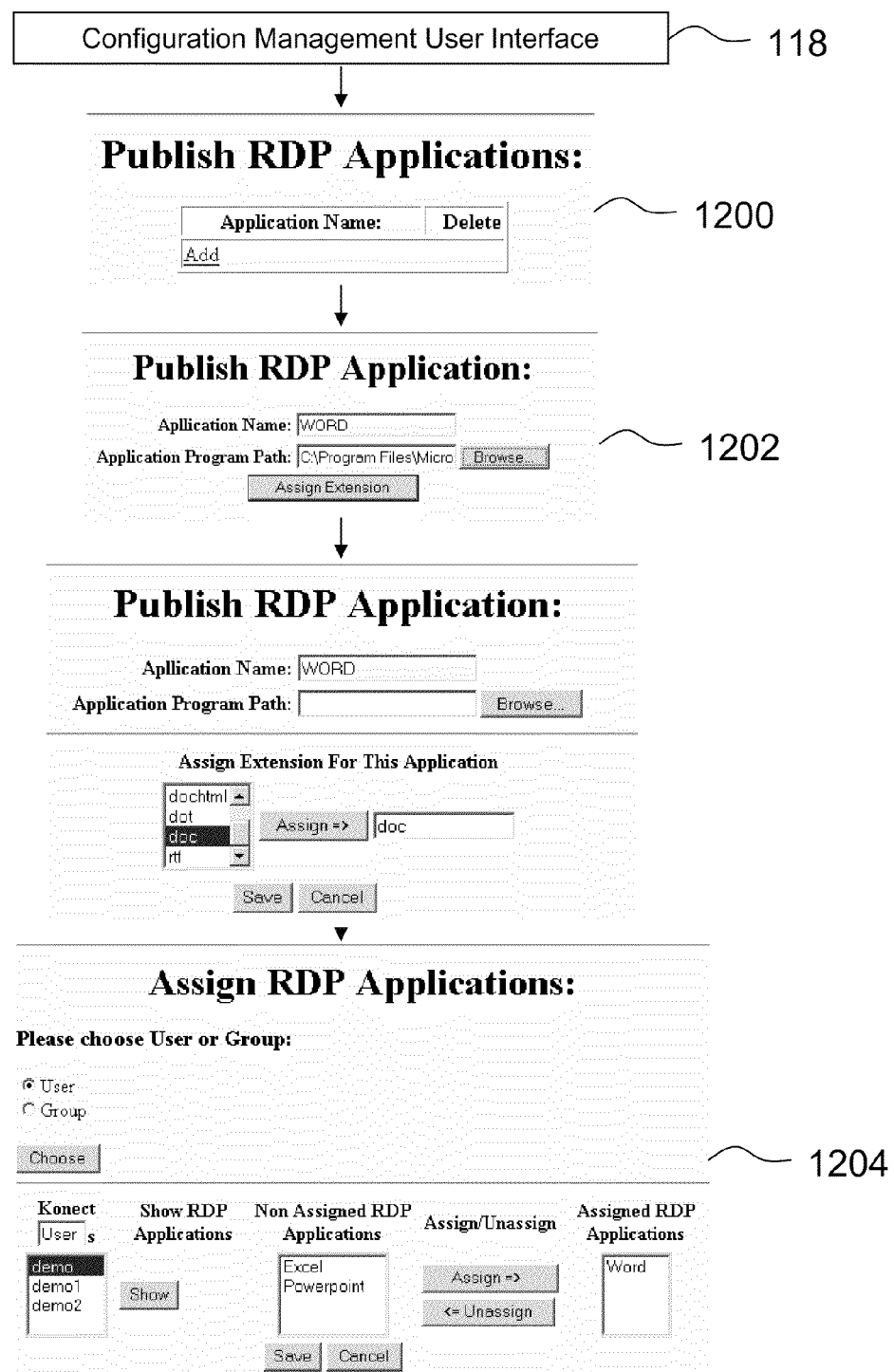
FIG. 12 illustrates exemplary GUIs for a publication and distribution function performed by the network system of FIG. 1B.

Referring to FIG. 12, for applications stored on server 6 which may be accessed by clients 4, a management process is provided to control and manage publication and distribution of these server-based applications. Management allows a system administrator to assign specific hosted server-based applications to a specific user and/or user groups via configuration management user interface of the system. In operation, a series of GUIs are displayed during the execution of the management process. Aspects of selected GUIs are described in turn.

The ability to publish and distribute hosted server-based applications can be configured using the configuration management user interface 118 of the system. To publish server-based hosted application, GUI 1200 is produced and the user selects "add". The application can be either a physical or virtualized application on the server. The application name from one of the many views available from the configuration management user interface. Then in GUI 1202 the user would type in any user-defined name for the hosted server-based application and its program path. For example, to launch a Microsoft Office word application, the application name could be "MS Word" or "Word" and the application path could be "C:\Program Files\Microsoft Office\Office\WINWORD.exe". Once the application name and path have been defined, the management console may then use a Microsoft server API to retrieve the associated extensions relative to the published application by selecting the assign extensions. Once extensions are retrieved, the server-based hosted application being published may require that a default extension is assigned from the retrieved extension list to complete the publishing of that application. The published application is then written to database 116*d*. Once published, the server-based hosted application can now be distributed by the configuration management user interface to multiple profile users using selections shown in GUI 1204. The system may distribute applications using AD users and user groups. From the management console, published applications may dynamically be distributed to existing AD users or user groups. Each user or user group may have access to different published applications as defined by the configuration management user interface of the system. Once the published server-based hosted applications have been distributed, the setting are then saved back to the database 116*d* of the user profile data within the system.

Figure 14:
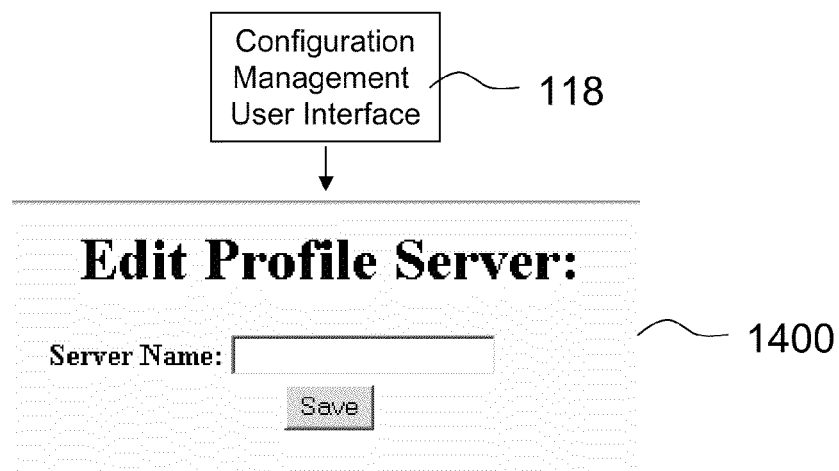
FIG. 14 is a diagram showing an exemplary GUIs for profile synchronization performed by the network system of FIG. 1B.

Referring now to FIG. 14, as part of the real time management of resources, the embodiment tracks and synchronizes access to files amongst clients 4 and server 6. File synchronization is a recursive process to copy files from a primary profile source to a target and back to primary profile source, using a best-case algorithm (copy all, newest file wins) in order to minimize file copying over the network. It operates by examining and pulling both the primary profile file server source directory and the destination directory and copying files to the target. Preferably it does not delete files that have been deleted on the source, as this could possibly cause loss of data. Following the two instances below, files are then restored/copied back to the primary profile server. The profile server can be set using the configuration management user interface 118. As shown in GUI 1400, to edit a profile server, a user would type in the primary profile server name and hit the save button. The primary profile server name is then saved in the server registry 116*c*.

File synchronization occurs at a connection instance and at the start or completion of a server-based application. At connection and disconnection to the back end interface 10B, a user pulls files from a profile server or other profile sources and allows other users to interact with server files from their client 4 via the user profile data interface. Again, an interface may comprise of one or more interfaces such as a desktop launcher, server desktop, or client 4. When the system AppRunner process starts, its properties file can optionally contain information where to pull/restore files from primary profile file server source directory and the destination directory and copying files to the target before and after the Terminal Services server application runs. The AppRunner is a server-side program, which launches the server-based application that the user selected, along with ensuring the user is logged out at the end of the session.

Figure 15:
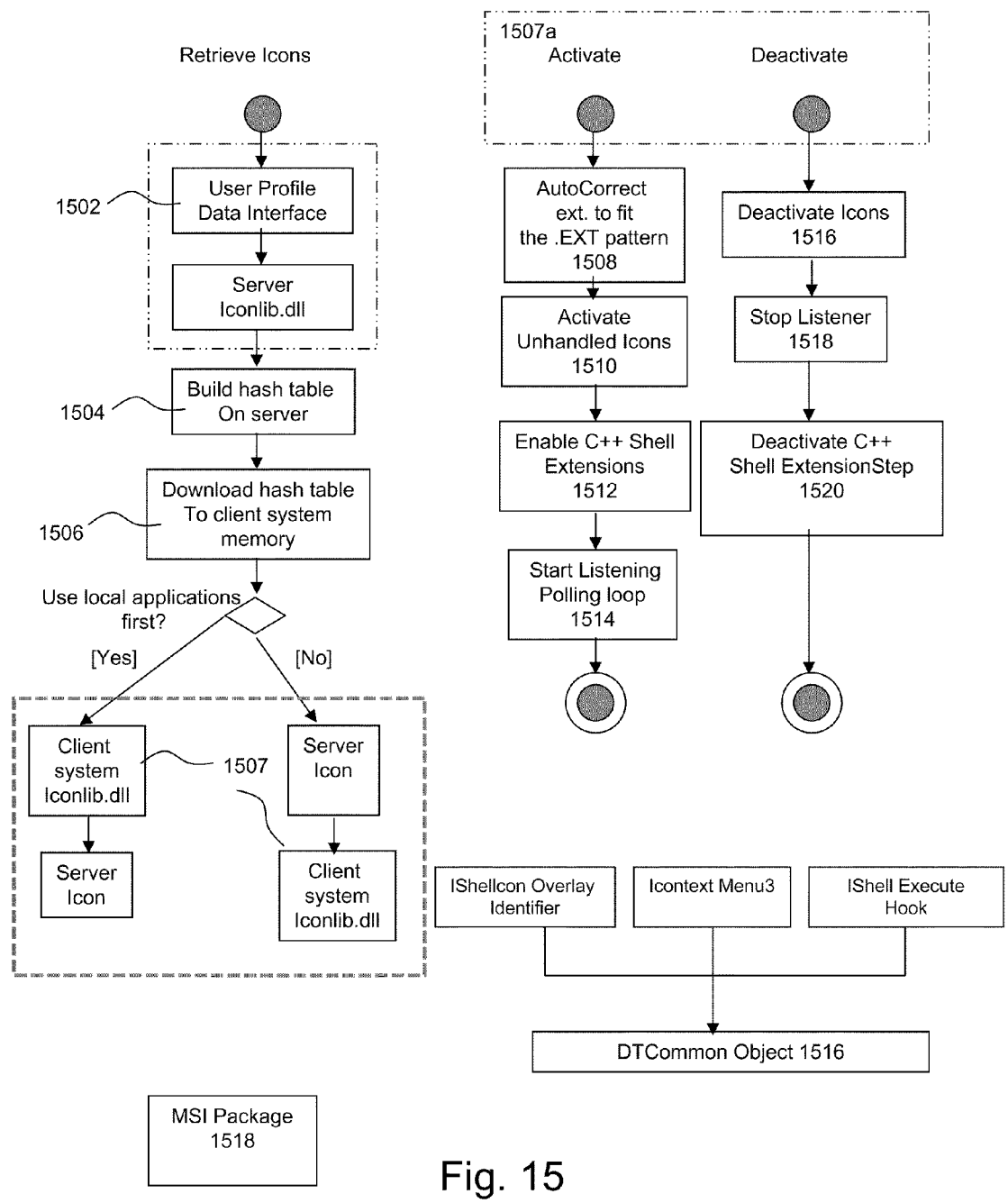
FIG. 15 is a flow diagram of the rules and operations performed on icon integration process performed by the network system of FIG. 1B.

Referring now to FIG. 15, as noted earlier, a feature of the embodiment is the ability to access a client 4 and take an inventory of applications (and/or services) stored on server 6 as well as applications (and/or services) stored on client 4. Applications can be initially sought from server 6 and then from client 4 or vice versa. When the user activates the client interface on the client 4, shortcuts and icons may be dynamically created and displayed into any one or more of the client interface special areas including and not limited to start menu, desktop icons and the system tray on the client 4. Also applications, their icons and their file/data type associations can be registered. From the inventory of identified applications, information on associations and locations between applications and both files and data can be made. Using this information, preferably, an initialization process operating on client 4 identifies available shortcuts to applications and associations between: (i) files and both applications and services; and (ii) data and both applications and services. The displayed applications may provide shortcuts and the correct file (or data) to application icon associations and a unique notation may optionally display as icons on the client 4. The icons may be presented: (i) in a special area in the GUI on the display of client 4; (ii) as desktop icons on client 4; (iii) as an icon in any activation bars; (iv) in a "Start" pull down menu or a launcher on the GUI on the display of client 4. Also, during initialization applications and their correct file (or data) type associations are registered on client 4. Registration facilitates correct association, generation and display of associations of icon to applications on client 4.

An aspect of the embodiment is that at client 4 each of applications, data and files may selectively be made to appear that they are installed on client 4, when one or more of such items may be installed on server 6. Icon shortcuts, associations between files and both applications and services and associations between data and both applications and services provide access for client 4 to remote applications running on server 6. Applications and services may include and are not limited elements and resources on client, server and web based applications and services.

Nevertheless, as part of the implementation of this access, the user at client 4 may be kept aware of the ultimate source of an application/service using specific notations, shortcuts and icons in client interface on the client 4. Registration of applications/services on client 4 system and the correct associations between files and both applications and services and associations between data and both applications and services allows the software to dynamically create shortcuts, icons and notations to elements and resources on the server 6 to be displayed in client interface on client 4. Registration of applications and services on client 4 may be required for correct icon, file path and file type association of icons, shortcuts and notations, etc. On client 4, the system may obtain an inventory of server 6 and client 4 applications/services using a hashtable created on memory of client 4. Applications (and services) on server 6 are registered on a system registry at client 4 and logged there. Status and log changes may be logged and saved into another registry under the user profile on client 4. This is done so that each client 4 can have its own unique profile data interface. The embodiment preferably backs up changes in a system registry and recovers original settings to the client 4 system registry when deactivating an access to server 6. When an application (or service) for a file (or data) is located on client 4, one type of icon for that file is displayed on client 4. Conversely, when the application for a file is located on server 6, a different type of icon for that file may be displayed on client 4. The identification of the appropriate icon to display is managed by the embodiment.

In particular, process flow 1500 for retrieving and displaying server and local client 4 icons on the client 4 is shown. From a user client interface, associations between files and both applications and services and between data and both applications and services on client 4 can be dynamically configured. Icons relating to server-based applications and services may be dynamically retrieved and configured from server 6, in addition to locally installed and configured applications or services. Icons for applications that are obtained from server 6 which client 4 may or may not have installed are encoded into Java ImageIcon objects for transport, and then saved as ".ico" files for the client 4 use. Java ImageIcons objects are Java library objects that are used to hold images, which are specifically used as icons inside of a Java application.

At process 1502 when the user profile data interface is activated or launched, the server Iconlib.dll is invoked to retrieve all published hosted server-based applications or services and their associated extensions using the system. The IconLib library handles all the native platform to Java translations for retrieving the icons from the system. These retrieved icons and their extensions are used to build Java ImageIcon objects process 1504 on the server and download the Java ImageIcon objects process 1506 from server 6 to process 1507 internal memory of client 4 from over link 8. Java ImageIcons are Java library objects that are used to hold images, which are specifically used as icons inside of a Java application. Generally, Java does not allow these ImageIcons to be created from Windows .ICO or .DLL resources. Instead a library for accessing icons from native sources and translated into Java ImageIcons is used, e.g. IconLib.dll. It will be appreciated that other method types and translation methods for retrieving and translating icons for applications and services for multiple operating systems made be used, including using native source code without translation.

The Java ImageIcon objects are used to build hash table on client 4. The hash table contains the relationships between the file extension (i.e. ".txt") and the actual image. The client interface on client 4 generates icon files on the client with images stored in the hash table. The embodiment may be set by default to use local or server applications first. If the software uses local client 4 application/services first, the Iconlib.dll is invoked to retrieve local applications and their associated extensions and then compare to server icons in client 4 internal memory, to accurately populate the user client interface on the client 4. If the embodiment uses server applications first, the server icons in memory of client 4 are compared to the Iconlib.dll of local client 4 retrieved applications and their associated extensions and are then used to accurately populate the client interface on the client 4. The user profile data contains graphics for the icons, file type extensions and the path to access and execute the application, service or associated file/data. Both server 6 and local client 4 applications and their associated icons are then utilized by the system shell extension, which is activated when the user is logging into client 4. The shell extension can be used to add functionality (e.g. icon overlays, icon notations, applications and services associations, associations among any of files, data, applications and services document activation and Context Menu activation) to the Microsoft Windows Shell (Explorer).

At process 1507 the client interface builds any icons and associations into any activation icons/bars (e.g. a sys tray in Microsoft Windows—trade-mark) into client 4 and makes necessary associations to any applications, services, icons and user controls using the systray.dll. At the client interface may also create shortcut link files to server-based applications or services and icons to any associated icon to file association, such as data relating to COM matters as provided in the hash table. At process 1514 the shortcut links are dynamically copied into the user's desktop folder so that they appear on the client interface on the client 4. The client interface can dynamically create a folder (which may be labeled as a remote applications folder) through another special area in the user's client interface (for example, in a start menu in Microsoft Windows) under a system program folder and can dynamically copy shortcut links associated with applications and services into this folder. A user at client 4 may see that the following elements are locally installed on client 4: applications and services in the system tray, start menu entries, shortcut links and icon associations between files and both applications and services and between data and both applications and services. From a user's perspective, the applications in the system tray, starts menu entries, desktop shortcut links and associations among files/data to application appear as if they were installed on client 4. This appears as if the application was installed on their client 4 machine, although it is actually a shortcut or icon with or without unique notation to a remote seamless application/service and/or file/data-to-application/service running on server 6.

The shell extension may be comprised of two sides: a user profile data interface side (example: Java Side); and a client side (example: C++ Side). As such, file name extensions on client 4 can be registered in a registry (such as a Windows registry) as if associated applications have been installed on client 4. As registered item typically only include an icon path of the extension icon file, execution of the item may typically be processed by the shell extension IShellExecuteHook COM component. The user profile data interface side handles activation and deactivation at process 1510 of a C++ shell extension and registration of icons for un-handled extensions. Unhandled extensions on the client 4 may be registered in the windows registry. The unhandled registry items under the extensions may include the icon images, icon path and file type extensions that may be processed by the shell extension IshellExecuteHook COM component. Unhandled extensions are icons that do not fit the ".ext" pattern on server 6 and/or client 4. For unhandled extensions, upon activation of the shell extension at process 1508, the shell extension first adjusts the extensions to fit the ".ext" pattern. It is also preferably that the sizes of icons at client 4 be matched with an appropriately sized icon for the corresponding application at server 6. At process 1510, the hashtable may include extension icons in a format that does not match the required format extensions to fit the ".ext" pattern on the client 4 system. For example, a hashtable may have icon extension in a format such as "[ext16:[icon16×16]ext32[icon[32×32]". This format may not match the required format in extension pattern on client 4 which is "[ext:[icon16×16][icon32×32]". As such, an adjustment should be made. The shell extension uses icons passed from server 6 to give icons to file patterns which may or may not have local icons at client 4 and may override icons for applications that have local icon, when a client selects a "server first" for application execution. For example, if Microsoft Excel is installed on local client 4 and is also available from server 6 as a hosted application, the embodiment may override using the icons on client 4 to use the Excel application icon on server 6. The embodiment may also dynamically display any associated Excel files on client 4 with the correct icon from server 6 to launch the application or associated file using Excel installed on server 6. See for example, icon 2012 (FIG. 21). The icon images in the hashtable are transferred into ".ico" files using the iconlib.dll on client 4 and saved into a temporary folder on client 4 so that it can be accessed later. Thereafter, each file extension in the hashtable can be checked against the windows registry. If the file extension is already registered, the embodiment can overwrite the default icon with the newly generated ICO file. If the file extension is not registered, the embodiment can create a new extension and populate the default icon location. All these changes may be logged and saved into another registry entry, such as \\HK_CURRENT_USER\Software\DesktopSites\Icons. This process allows the embodiment to backup changes in the registry in client 4 to original settings when the icon logic of the embodiment is deactivated. The backup information is also useful for tracking histories during other functions such as logoffs, fatal error recoveries, etc. The registry changes preferably are based on each user activating the embodiment on client 4 not system changes. This allows multiple users on a given client 4 to have their own unique registry settings.

The C++ shell extensions are then enabled in process 1512 by storing the Shell Extension activation status in the Microsoft Windows Registry, such as \\HK_CURRENT_USER\Software\DesktopSites\Shell Extension. Once the Shell Extension has been activated, all activations of applications and services are intercepted and logged into the same registry entry. The C++ shell extension may provide this interception, because it implemented the IShellExecuteHook Interface, as such all shell commands issued through windows may be filtered by C++ Shell Extension. Client 4 then starts listening and polling at process 1514 for any changes or updates to files/data and their associated extensions on client 4 so that they may be accurately reflected on the client interface of client 4. Upon a deactivation process, at process 1516 when the user logs out of his user profile data interface on client 4, all changes to local icons on client 4 are restored. The listener stops listening and polling at process 1518 and the C++ shell extension is then deactivated at process 1520. When the deactivation status of applications is stored into the registry entry, the C++ Shell Extension may not need to filter the shell commands.

The C++ side handles integration with the user profile data interface on client 4. It does this by implementing interfaces provided by 3 Comm, e.g. IShellExecuteHook which is used to capture document activation events; IContextMenu3 which is used to add entries to the document's context menu; and ShellIconOverlayIdentifier, which is used to overlay icons on top of Icons defined by the system and pass control to a common object. At process 1516, common object handles activation and deactivation, icon display logic, identifying existence of a handler for an application when an object is in client first mode and communicating via a message key to the Java side.

It is useful to note the Shell Extension is a set of stateless objects, as they store all of the current activation information in the Microsoft Windows Registry. This allows multiple Windows Shell processes to start and share the activation information, even though that specific instance of the Windows Shell was not activated.

The embodiment may provide multiple processes to deliver applications from server 6 to client 4. An administrator may also select desired resources from server 6 to be published (e.g. files, data, applications and services). Server 6 generates an MSI (Microsoft Windows Installer) package for the selected resources. The MSI package is then downloaded from server 6 to client 4 via a link 8. A user at client 4 initiates the MSI package. Execution of the MSI package at process 1518 causes the installation of the published resources on client 4. Installation includes static registration of the icons and file type associations of the application on client 4. These icons and shortcuts may appear in a dedicated area of the GUI on client 4, such as a system tray, start menu, desktop shortcuts and/or activation bar.

Figure 16:
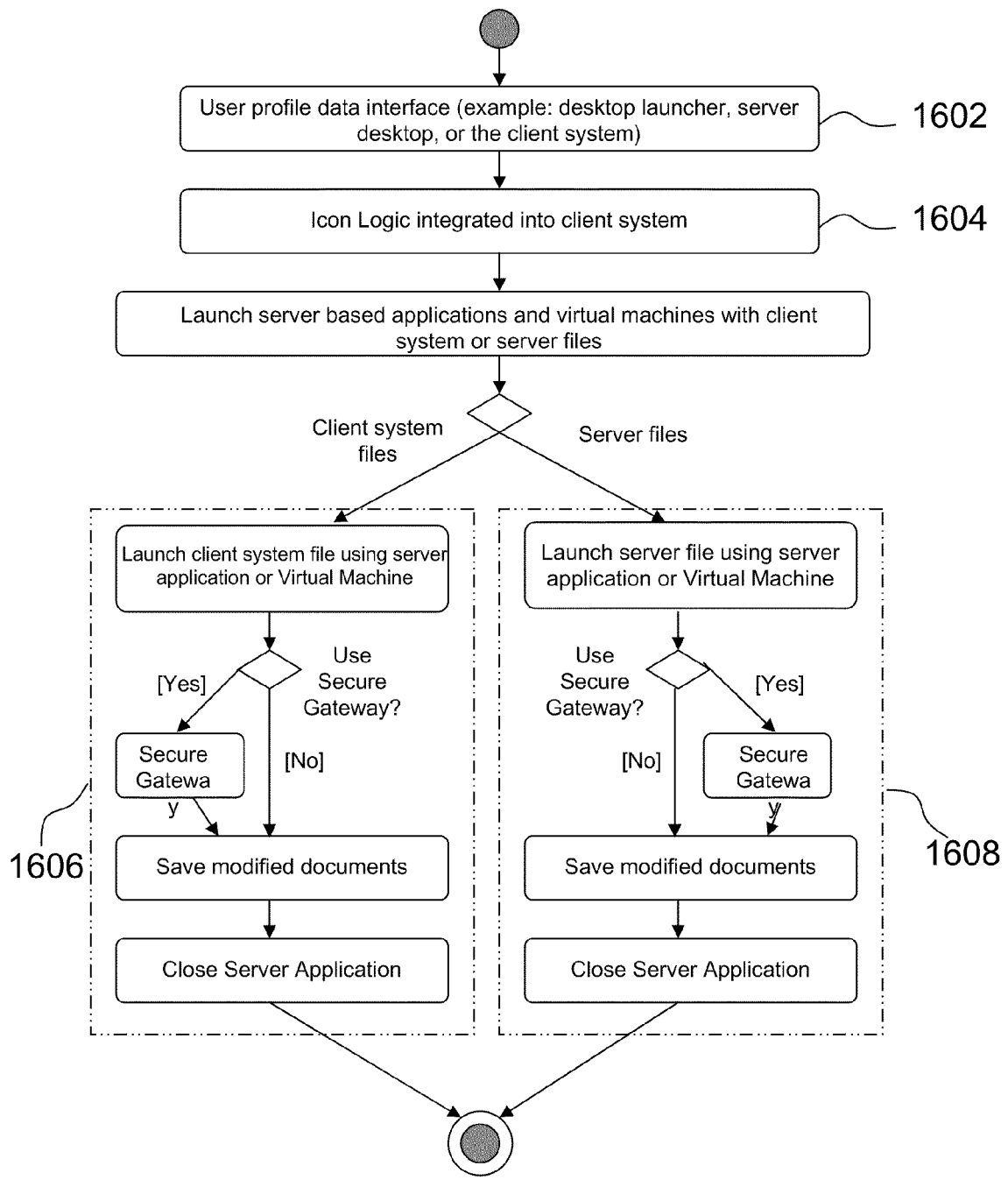
FIG. 16 is a flow diagram of host-based application launch process performed by the network system of FIG. 1B.

Referring now to FIG. 16, a process for launching a hosted server-based application is shown at 1600. From a user client interface, the user can seamlessly launch a hosted server-based application using a local or server-based file from client 4. Launching server 6 application/service on the client interface on the client 4 will appear in a seamless windows environment just like a locally installed application on the client 4. From the user's perspective the application/service on server 6 appears as if it was installed on client 4. To achieve this transparency, the server software may maximize the RDP window on client 4 and the outside window may be made to be frameless and transparent by color value. As such, the software will have a same color as the desktop background color of the application or service of server 6. As such, the RDP window is transparent to the user and only the application windows are visible. This allows the published applications to appear to run seamlessly on client 4 within a seamless windows environment. It will be appreciated that in other embodiments other techniques and systems may be used to launch applications, using techniques and systems known in the art.

To launch a hosted server-based application at process 1602 user's profile data interface is activated using the system. The process for icon logic at process 1604 will dynamically populate the user's profile data interface, so that hosted server-based physical and virtualized applications and virtual machines in association with local and server files on client 4 are tagged with the appropriate icon logic. The files may be tagged with a unique icon label overlay to signify to the user that launching that specific file will be accomplished using a hosted server-based application. Both local and server files can be launched from the local client 4 using the system. Local files are defined as files available on client 4 hard drives. Server files are files on a server not located on client 4's local hard drives.

When launching a local client 4 file using a hosted server-based application, path 1606 is taken and port knocking or secure gateway may or may not be utilized depending on settings set in configuration management user interface 118 turning port knocking or secure gateway on or off. For remote access the port knocking or secure gateway is generally turned on. For local LAN access the secure gateway is generally turned off. If the secure gateway is on, all application data will run through port 80 or port 443 eliminating the need to open unnecessary ports. If the secure gateway is off, port 80 and port 3389 may be required to be open to run the hosted server-based application on the local LAN. If port knocking is turned on, then depending on the combination sequence sent by the client from the server for that instance of launching a server-based physical or virtualized application and virtual machines will perform the knock and open the port within a defined start and stop port range defined by the configuration management user interface. Each new instance from the client to server to launch a server-based application will have its own combination sequence to open the port. Saving any edits or modifications to the document can be achieved in the same manner as launching a local application. Closing or exiting a hosted server-based application can be achieved in the same manner as closing or exiting a local application.

When launching a server file using a hosted server-based application path 1608 is taken and port knocking or secure gateway may or may not be utilized depending on settings set in configuration management user interface turning secure gateway on or off. For remote access the port knocking or secure gateway is generally turned on. For local LAN access the secure gateway is generally turned off. If the secure gateway is on, all application data will run through port 80 or port 443 eliminating the need to open unnecessary ports. If the secure gateway is through port 80, then port 3389 may be required to be open to run the hosted server-based application on the local LAN. If port knocking is turned on, then depending on the combination sequence sent by client 4 from server 6 for that instance of launching a server-based application will perform the knock and open the port within a defined start and stop port range defined by the configuration management user interface. Each new instance from the client to server to launch a server-based physical or virtualized application and virtual machines will have its own combination sequence to open the port. Saving any edits or modifications to the document can be achieved in the same manner as launching a local application. Closing or exiting a hosted server-based application can be achieved in the same manner as closing or exiting a local application.

In other embodiments on a Solaris, Unix or Linux client, the client side of the application runs may be implemented in a similar fashion. However, provisions may need to be made for drive shares and implementations of Terminal Services. In particular, the drive shares may not be mapped via WebDAV to the client. Instead the drive shares may use a NFS. Also, the client may not use a Microsoft implementation of the Terminal Services Remote Desktop Client. Instead it may use a RDesktop client as a library.

Turning now to aspects of activation of application and files, a description is provided first on a process for activating a local application for client 4 for a file stored on server 6.

Figure 17:
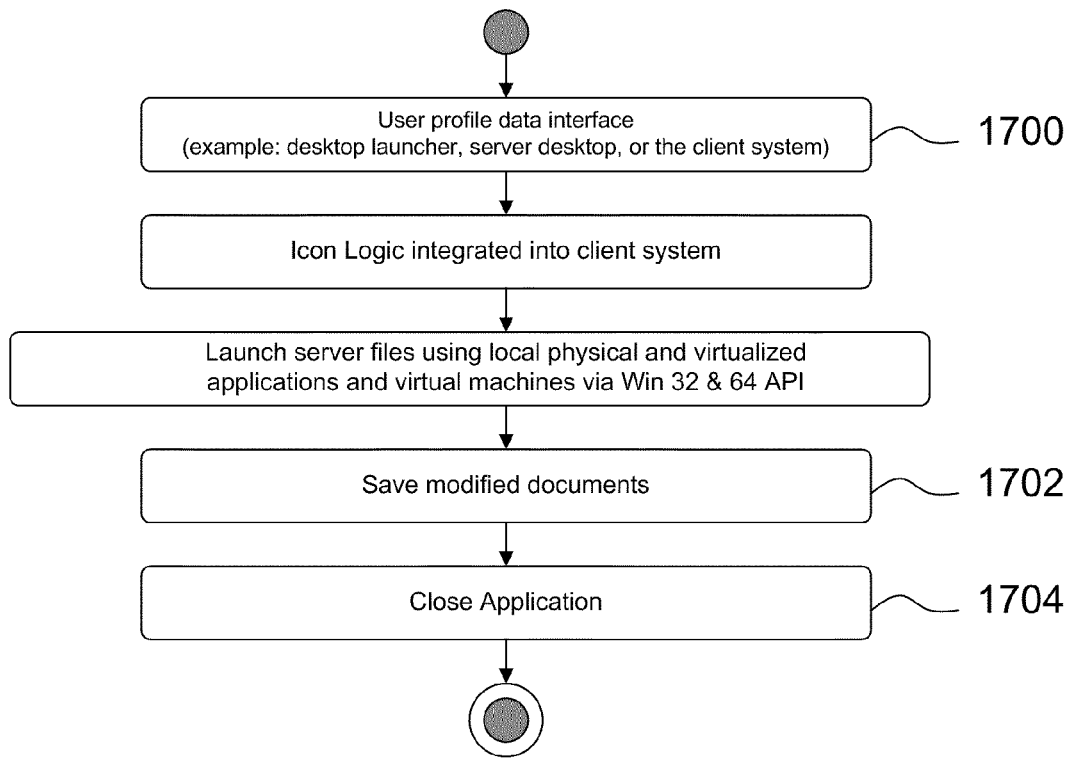
FIG. 17 is a flow diagram of local application launch process performed by the network system of FIG. 1B.

As such, referring now to FIG. 17, a process for launching a local application with server-based files is shown. From a user profile data interface, the user can launch a local client 4 application using a server-based file similar to a LAN environment. Launching a local application with a server-based file is initiated at process 1700 from the user's profile data interface (one or more or a multitude of interfaces such as a desktop launcher, server desktop, or client 4) using the system. The icon logic module (FIG. 15) of the system dynamically populates the user's profile data interface, so that server files may use local applications on client 4. The icon logic for server files on client 4 is populated with the same icon label association as the files on the local client 4. For example, a Word file is labeled with a Word icon. Launching a server file with a local client 4 physical and virtualized application and virtual machine may be achieved using a Microsoft Win 32 and 64 API similar to a LAN environment. A standard method of opening a server file, with a local client 4 application functions just like on a LAN environment. At process 1702 saving any edits or modifications to the document is performed in the same manner as launching a server file with a local client application on the LAN environment. At process 1704 closing or exiting a document is performed in the same manner as closing or exiting a server file with a local client application on the LAN environment.

Now, further detail is provided on selected interface and administrative functions of the embodiment.

Figure 18:
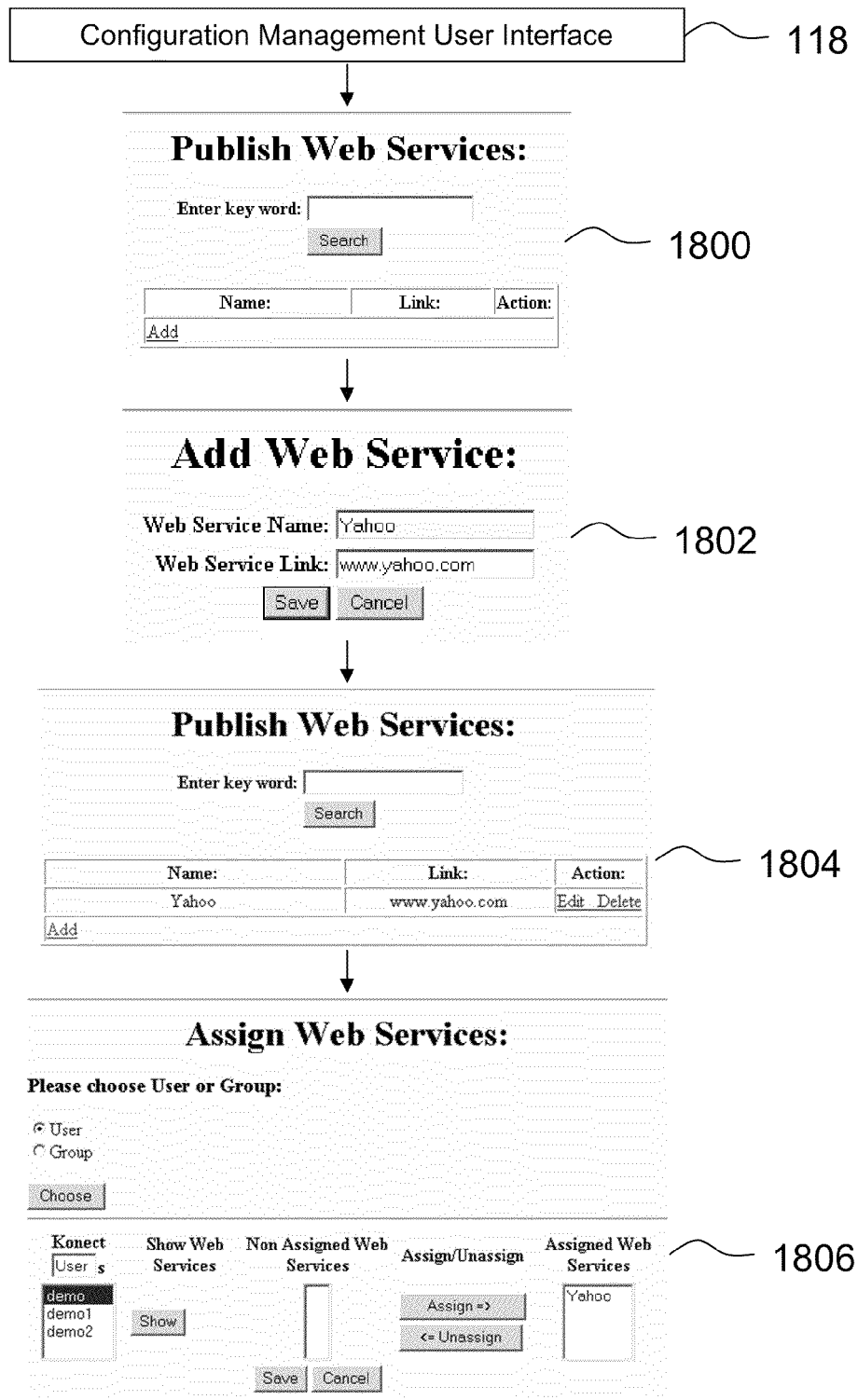
FIG. 18 illustrates exemplary GUIs for a publishing service processes performed by the network system of FIG. 1B.

Referring to FIG. 18, a management process is provided to control a user's access to web applications and services. In the course of execution of the management process, a series of GUIs are selected provided to the system administrator to assist in navigating through the process. The GUIs provide an interface for the administrator to assign specific web applications and services to a specific user and/or user groups via the configuration management user interface of the system from a private and/or public cloud. A web service is defined and not limited to physical and virtual applications, desktops and servers. A private cloud is generally referred to web applications and services located on a clients own network where a cloud provider is referred to as a third party provider outside of the clients network providing the web application or services.

In particular, publication and distribution of web applications and services are configured using the configuration management user interface 118 of the system. In GUI 1800 to publish web applications and services, a user selects "add" to add a web application or service name from one of the many views available from the configuration management user interface. Next in GUI 1802, the user enters any user defined name of the web application or services and its URL location path. For example, if you are launching a Yahoo, the web application name could be "Yahoo" and the application path could be "http://www.yahoo.com". Once the web application or services name and path have been defined, selecting "save" in GUI 1804 writes the data to the database 116*d*. Once published, the web application or service can now be distributed by the configuration management user interface to multiple profile users. GUI 1806 provides the user with the interface to control this distribution. The system may distribute web applications or services using Microsoft's AD users and user groups. From the management console, published web applications or services may dynamically be distributed to existing AD users or user groups. Each user or user group may have access to different published web application or services as defined by the configuration management user interface of the system. Once the published server-based hosted applications have been distributed, the setting are then saved back to the database 116*d* of the user profile data within the system. To delete a web application or service, the user would select "delete" from the GUI 1804 to confirm the action.

Figure 19:
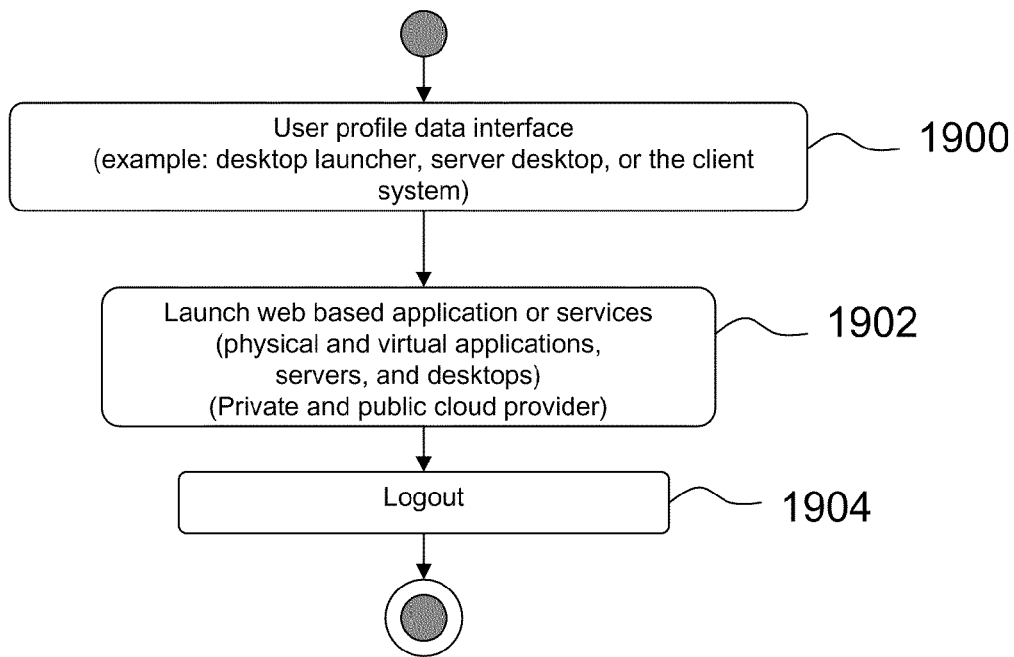
FIG. 19 is a flow diagram of a web based application launch process performed by the network system of FIG. 1B.

Referring to FIG. 19, once configurations of web applications and services are complete, each application and service is available for launching. To launch a web application or service from a private or public cloud provider, a series of GUIs are provided to the administrator to guide him through the process. From the user profile data interface the user may select a web application or service by activation of the appropriate selection. The embodiment may dynamically configure and publish desired resources from server 6 to a separate web server (not shown). A web page may provide an assembly for the resource, which is automatically generated according to the configuration of the resource at sever 6. A user at client 4 may access the configured web page via link 8 from a specified URL. A Common Language Runtime (CLR) application on client 4 checks the referenced assembly on client 4. If the assembly on client 4 is available and identical to the web-based assembly, the user select the server resource icon on generated at client 4 and launch the selected resource from server 6. The assembly may contain the logic for icons and shortcuts to server 6 resources as mentioned above. The resource will appear to the user to be installed on the client 4. In one configuration, resources are located on server 6 and shortcuts and icons are provided on client 4 for those resources. If the assembly on client 4 is different than the assembly on server 6, the CLR will download the new assembly from server 6 and load it on client 4. The assembly on client 4 can be updated with the information of the updated resource on server 6.

During login process 290 (FIG. 2), the system gets, loads and integrates the user's profile information into the user profile data interface on the client 4. A user may launch 1902 the web application or service by one of two methods. In the first method the user clicks on an icon image object shown on client 4 to launch the specific web service or application. In the second method the user launches the specific web service or application from the user profile data interface on the client from a pull down tab. Both methods will send a get web application URL string to the server 6. The system will capture the user profile data interface content and open a new web browser window to display the web application or service. To logout of the web application or service, simply close the browser window or selecting logout from the pull down tab of the desktop launcher.

Figure 20:
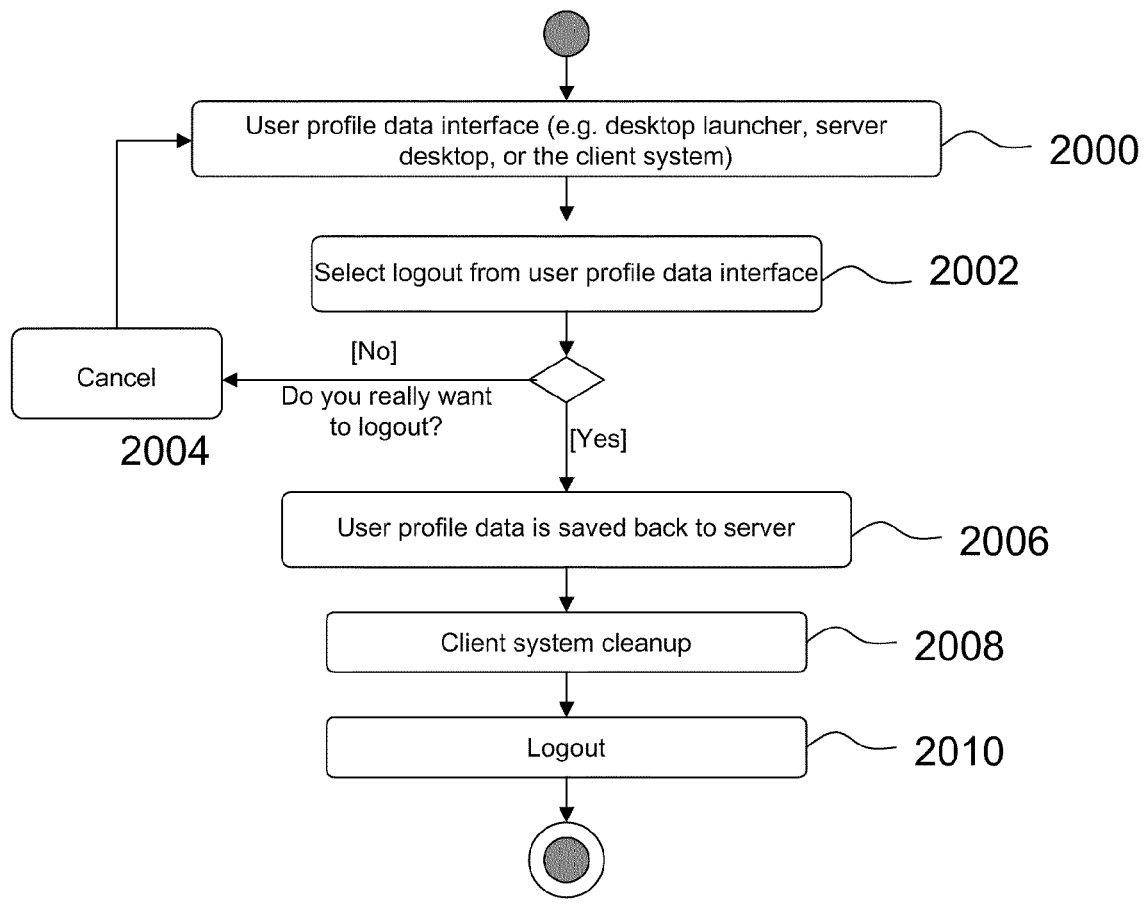
FIG. 20 is a flow diagram of a logout process performed by the network system of FIG. 1B.

Referring to FIG. 20, a procedure to logout of the system is shown. To logout of the system, the user simply closes the user profile data interface (which could be one or more, or a multitude of interfaces such as a desktop launcher, server desktop, or client 4) by clicking on the "x" or from the pull down tab selecting logout. A dialog box will prompt the user "Do you really want to logout?" if the user selects cancel, the logout command will be aborted and the user will remain logged into their user profile data interface. If the user selects "yes", the user's data profile will be saved back at the server via the server communicator. All user profile data and virtual drive mapping on client 4 will be removed and deleted. The user will then be transparently logged out from both client 4 and the server.

Turning back to load balancing and FIG. 8B, load balancing is invoked when the client requests a hosted server-based application and the server side is aware of the existence of multiple networked terminal services server IP's in the server registry data, as defined by the configuration management user interface. Load balancing is also defined in the configuration management user interface 118 to execute a specific method of load balancing. Load balancing methods such a CPU load monitoring, round robin balancing, per user, per server count and random balancing may be used. Server farms can be created to add multiple terminal servers into a server farm. Each server farm and the servers in then can have their own load balancing rule set methods. To add terminal server from GUI 1300, a user selects the "add" button and enters the server name and the port to utilize terminal services shown in GUI 1302. Selecting "save" saves the inputted server data to the server registry 116*c*. The server registry data can be utilized to populate the user's profile data. To remove networked terminal services server, GUI 1304 is displayed and the user selects "delete" and confirms the server to be deleted in GUI 1306.

Back end interface 10B performs several steps to connect the Windows Terminal Services client (RDPWindow) to the Window Terminal Services Server. When the client requires a connection, the system opens a tunneled HTTP/HTTPS connection to the server, which may communicate to the ISAPI (Information Server API) plug-in or directly to the RDP client over HTTP (or HTTPS). When the Client requests a connection it may create first a RDP file on the local client machine dynamically, it then may the RDP client to open the file. It the sends the request to the Terminal server gateway. The Terminal server will require the user to use valid credentials to access terminal server behind gateway firewall. If successful, the TS gateway will set up a tunnel between the client machine and the target server via the terminal server gateway. The client may also create the Virtual Terminal Services Port (VTSP) on the client machine. Next, the RDPWindow attaches to the VTSP which, in turn begins communicating across the HTTP (or HTTPS) connection to the ISAPI plugin. When the first actual data reaches the ISAPI plugin, it selects a Windows Terminal Services server to connect to and associates the VTSP with that actual Terminal Server. The selection process is a simple, round-robin selection.

Figure 13:
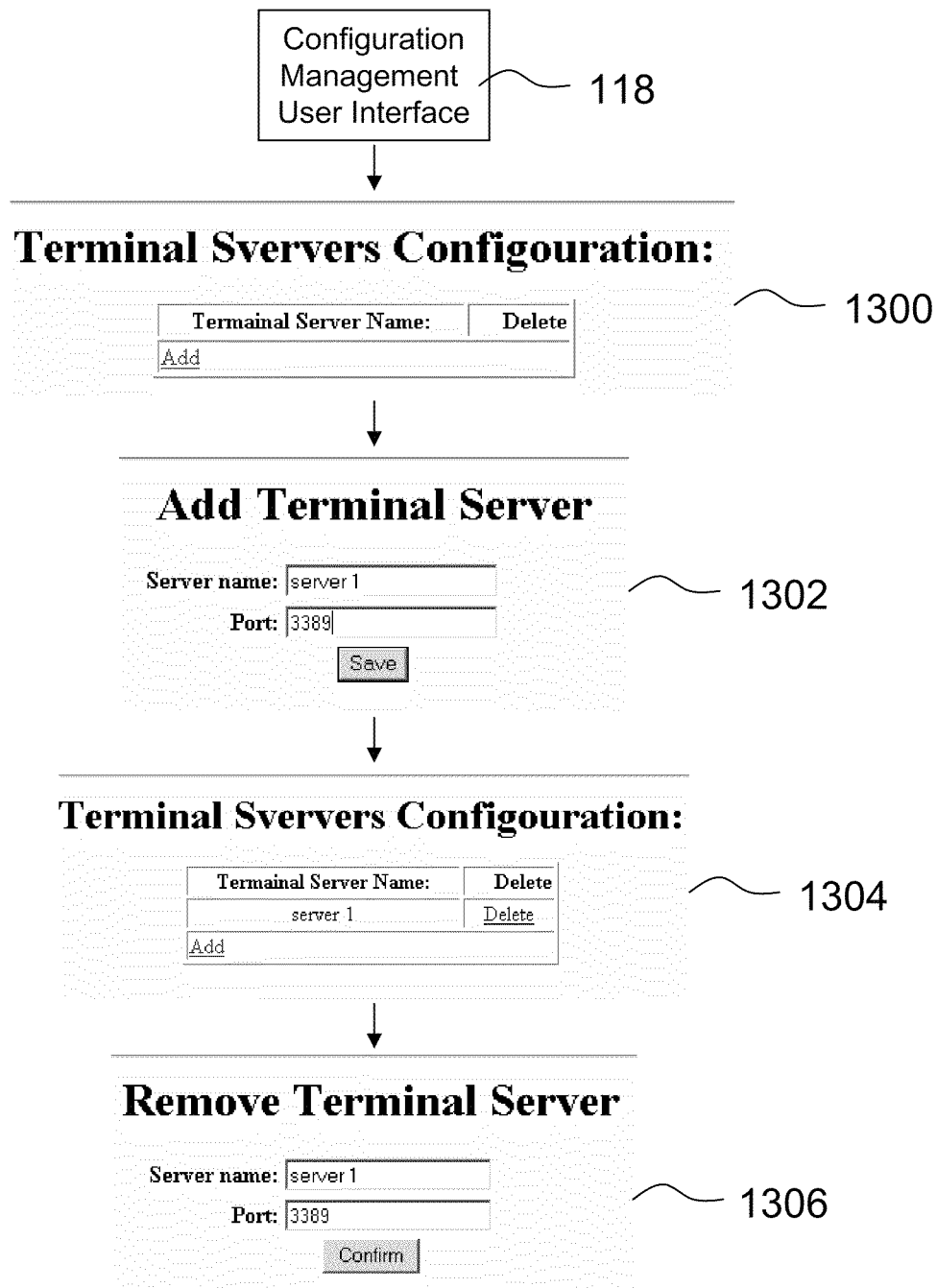
FIG. 13 illustrates exemplary GUIs for a load balancing function performed by the network system of FIG. 1B.

Referring to FIG. 13, a series of GUIs for the load-balancing module are shown. The load-balancing module of the system dynamically controls user requests to launch hosted server-based physical or virtual applications and virtual machines on one or more network terminal services server. Load balancing occurs when more than one terminal services server is used within a domain. Load balancing farms can be created with multiple terminal servers within each farm with independent rule set. Generally, load balancing is more suited to environments having more than one networked server 6. Servers 6 may be added or removed via one of many views using the configuration management user interface 118.

Further detail is now provided on distributed computing features of an embodiment. In particular, so-called "cloud computing" platforms effectively turn a data center into a utility service that provides virtual computing and storage services. As an example, three classes of services have been developed: Software as a Service (SaaS) delivers physical and virtual applications and virtual machines as a subscription service over the internet; and Platform as a Service (PaaS) provides an integrated environment to design, develop, test, deploy and support custom applications; and Core Cloud Services provides services for common features such as billing, security and storage a software vendor may need to complete its offering.

Virtualization as provided by an embodiment provides consolidation of multiple machines, applications and operating systems to a single host machine. As part of the virtualization features, software and processes are provided to control and synchronize centrally stored data, objects, applications and operating systems.

One embodiment allows one or more operating systems to run on a host system. Host servers can have an operating system or "bare metal" server that virtual machines run on. A bare metal server has only the hypervisor loaded onto it with no operating system installed on host server. Microsoft Hyper-V (trade-mark) server is an example of a "hypervisor" that implements supervisory roles, features and functions from an administration station in the network. Per conventions established by Microsoft, a "role" is a collection of software components that enables a server to provide a service to its network. An example of a role is "Domain Controller" or "Application Server" (such as a Web server with application frameworks). Often a role can be installed in one step, but the software may still require extensive configuration setting to operate as the administrator wishes. For instance, a server can be upgraded to become a Domain Controller, but unless user and computer accounts are added to it, the upgrade is not useful. A "feature" is a component/data/element that a server may need, but the feature is not necessarily the primary function for the server. A feature involves different properties than a role. A feature may not require any services. For example, a Recovery Disk feature is simply a tool. However, other features may have services associated with them. For example, when the Hyper-V role is installed on a machine, it may require additional virtualization services to be installed and operating on the machine for feature to operate correctly.

An exemplary system provides a hypervisor manager and a system center virtual machine manager (SCVMM), which is a virtual machine manager (VMM). Communications between a hypervisor and its elements can be conducted through asynchronous threads and delegation protocols. In C#, a delegate is a type that encapsulates a method and is similar to a function pointer in C and C++. Virtualization applications operating on a hypervisor manage physical and virtual machines from a single location.

There are two types of virtualization hypervisors. Type 1 hypervisors execute directly on clients' hardware to control the hardware and to monitor guest operating-systems. As such, a guest operating system operates on a different application layer from the hypervisor. Type 1 hypervisors are typically deployed when a sole operating system (OS) is to be installed on a client. When a user activates the client, the client presents only a single OS that has a local look and feel through its GUI. Type 2 hypervisors are hosted virtual machines running on host servers executing on a conventional operating system environment in a separate application layer from the local OS. Type 2 hypervisors are typically deployed when a user is meant to have access to his local desktop OS in addition to the centrally-managed corporate OS.

WMI Classes, .Net, C#, C++, PowerShell and VMM PowerShell (trade-marks) are structures and applications used to push and pull objects from the virtual database to the virtual machines. These components are used alone or in combination to synchronize, receive, send, create, delete and manage objects and real time data. Host servers, host groups and their associated virtual machine hardware and software elements push and pull object data from the hypervisor and management console. Such elements include the operating system, SCSI controller, network adapters, BIOS, processor, memory, COM ports, drives, image location, integration service, snapshots locations, store location, domain, password and time zone. Hardware and software elements that can be managed include: virtual machine name, machine location data, state of virtual machines, status, uptime, heartbeat, current memory usage, available memory and snapshots. Commands that can be virtually initiated through the network include, for example start, turn off, shut down, save, pause, resume, reset, snapshot, revert, rename, delete, delete saved state, new template creation, clone VM, cancel job and synchronize host.

A central database integrates multiple virtualization management features, objects and real time data. Records in the database can be integrated with real time objects and data that are provided from other databases, servers and objects such as Microsoft Sequel server, Hyper-V and SCVMM. The data integration is provided using a Microsoft .Net framework and utilizing C# to invoke WMI classes, PowerShell (trade-marks), C++ DLLs and scripts.

An embodiment provides a system for Type 1 and Type 2 hypervisors that support a Virtual Desktop Infrastructure (VDI). An application virtualization platform deploys virtualized applications real time to a client from a virtual application server. One platform is Microsoft's Application Virtualization (MS App-V) platform (trade-mark). The App-v client can be installed on only the client machines and the clients do not need to have local installation of the applications. Application data is stored on the virtual application server. Software for a client can be streamed to the client or can be locally cached from the application server to the client when requested and then executed locally. As such, execution environment is contained to the client. As such, the application does not make changes to the client itself. Applications are also isolated from each other on the client, thereby allowing different versions of one application to be run concurrently on the client.

Figure 22A:
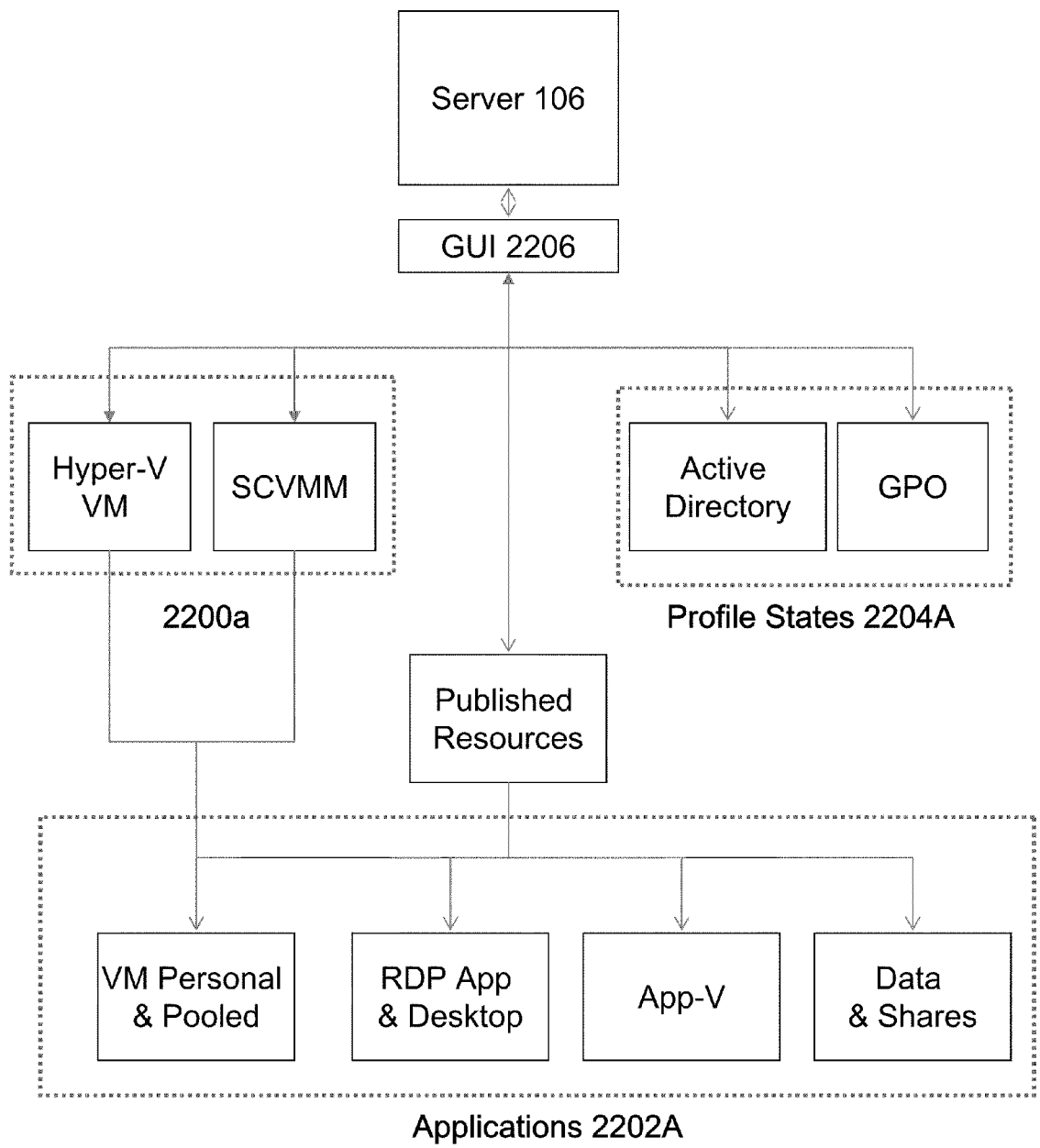
FIG. 22A provides a block diagram of virtual machine elements controlled by an embodiment for the network of FIGS. 1A and 9.

FIG. 22A shows elements that are controlled in a network by an embodiment through a server, such as server 106 (FIG. 2). The server may be a virtual server. In one embodiment, three virtualization elements are controlled by the server: operating systems 2200A; applications 2202A, and user profile states 2204A. Operating systems 2200A include VM operating systems hosted on Hyper-V and SCVMM. Applications 2202A include VM personal and pooled applications, RDP applications and desktops, App-V applications and data and shared elements. Profile states 2204A include profiles provided by AD and GPOs. Details on the control of the elements is provided on a GUI 2206 generated on the server.

As part of management of virtual machines, an embodiment provides synchronization of data, files, virtual machines and applications across multiple platforms. Synchronization provides consistent, real time bidirectional views of data (e.g. views of data from a client to a server, from the server to the client and between clients) in time and versions of the data. Synchronization allows different entities in the network to generate queries and retrieve information data and objects in real time, such that the entities are retrieving a consistent view of the data and objects. Synchronization may be provided asynchronously or synchronously. An asynchronous synchronization can be initiated in response to an event, such as a message of an update. A synchronous synchronization can be automatically initiated according to an existing timed interval. An embodiment provides automatic synchronization, tracking and movement of objects and physical and virtual machines in real time for a hypervisor. Objects and virtual machines include server clusters, physical and virtual machines, host groups, state, status, properties and attributes. Data and time synchronization is provided for server clusters, physical and virtual machines, host groups, state, status, properties and attributes.

Figure 22B:
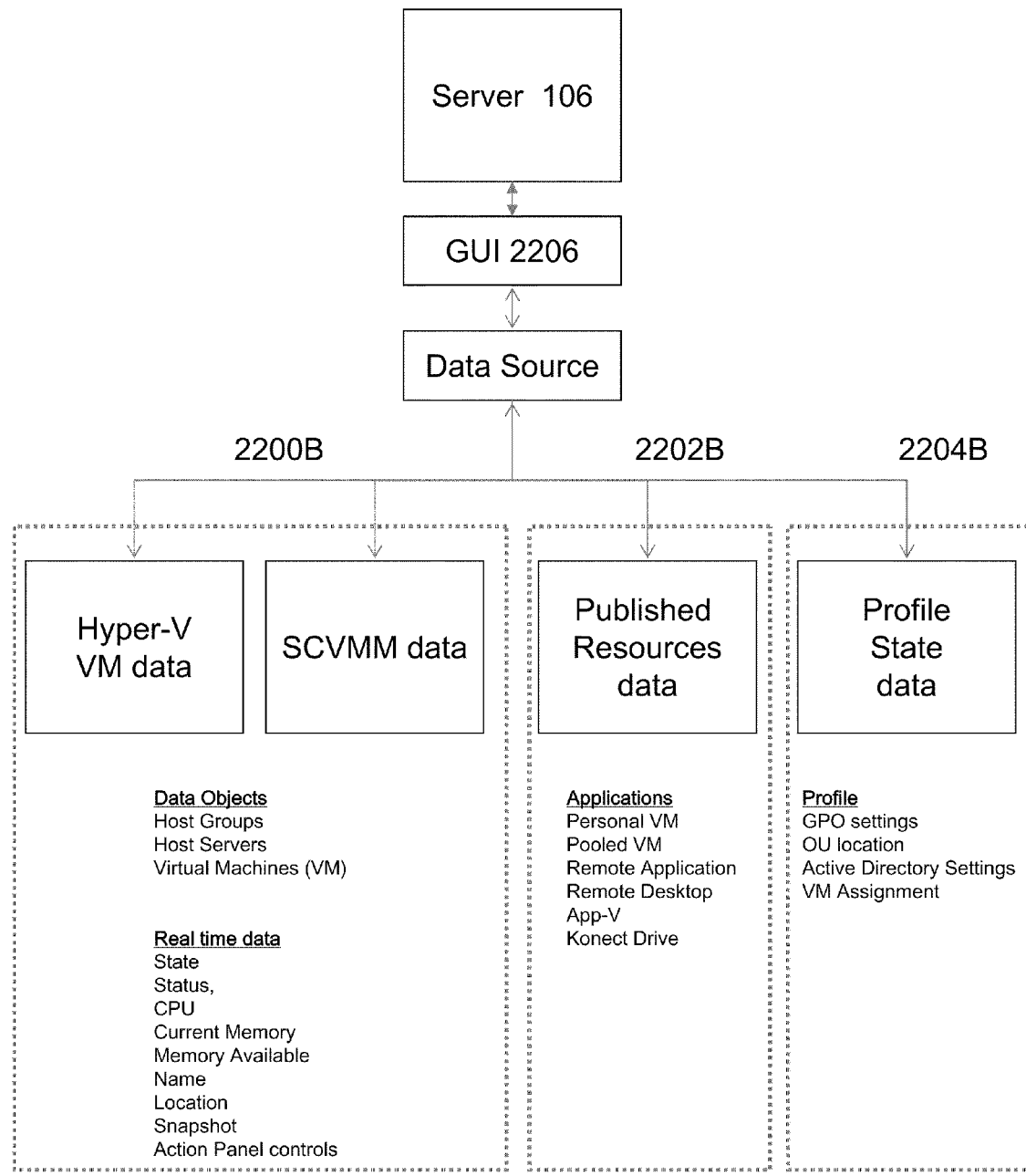
FIG. 22B provides a block diagram of elements being synchronized by an embodiment for the network of FIGS. 1A and 9.

FIG. 22B shows elements that are synchronized across a network by an embodiment. The elements that are synchronized are data sources. A data source is an entity that can produce, store and retrieve data in the network. Three data sources are provided: Hyper-V Virtual Machine (VM) and SCVMM data sources 2200B, published resources data sources 2202B, and profile state data sources 2204B. Data sources include data sources 106 (FIG. 2). Hyper-V VM and SCVMM data sources include data objects and real-time data. Data objects include host groups, host servers and virtual machines on host. Real time data include states of the VMs, the status of the VMs, CPU usage of a VM, current memory usage, available memory, name of VM, locations of VMs, status snapshot of VM and action panel controls available for current VM state. Published resource data include dynamic assignment of personal and pooled VMs, Terminal Server remote applications and desktops, App-V virtualized applications and virtual machine drives. Profile state data include specific Organizational Unit (OU) location data, Group Policy and AD settings and VM assignment data. An OU provides classifications for objects located in directories in the embodiment and names in a digital certificate hierarchy. OUs can be used in an embodiment to differentiate between objects with the same name or to define entities that can create and manage objects. An embodiment synchronizes these data sources and provides a reconstructed version of the data that are refreshed on GUI 2206 to provide an accurate state of the data.

Figure 22C:
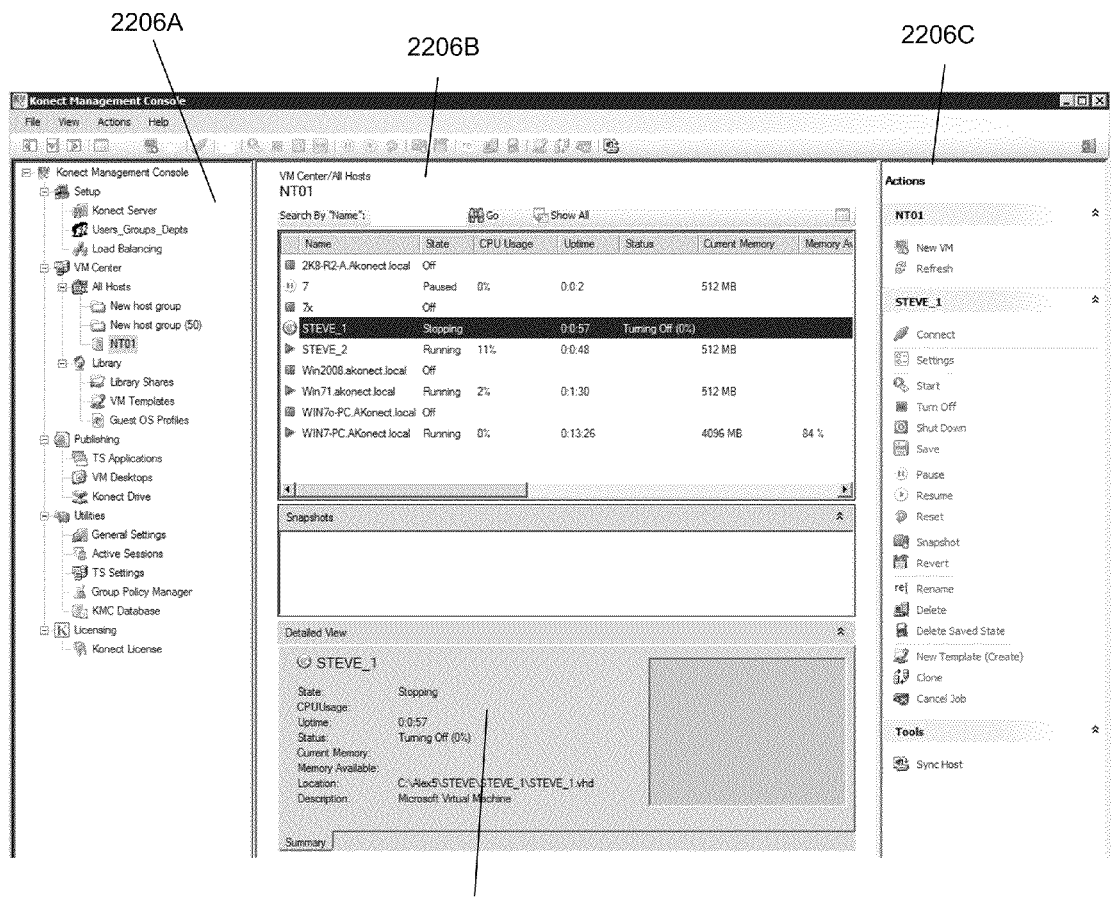
FIG. 22C is a diagram of a screen display of a GUI for an embodiment for control of a virtual machine for the network of FIGS. 1A and 9.

FIG. 22C provides an exemplary GUI 2206 generated in the virtual machine environment for an embodiment. A GUI provides an interface for the administrator to manage virtualized components. In one embodiment, management of the virtualized components is controlled through a management GUI pane, with multiple sub-panes. Sub-panes include tree inventory items 2206A, information and data pane 2206B, action pane 2206C, summary and detail views 2206D, pull down menus and action tool bar items and tabs. The GUI panes generate an integrated interface allowing invocation of multiple actions for multiple items in a single request. The request may invoke process calls to add, delete, change, modify and update the central and third party databases. The processes may include changing, getting, sending and receiving real time data and objects synchronized to interact with multiple managers and databases through the GUI management pane.

The pane may be a single pane. The GUI and virtualization features allow linking of multiple virtualization objects from multiple managers and databases into a single command. For example, the single pane allows a single command to create and publish virtual machines, assignment of virtualized applications to elements in the network and modify users' profiles using group policy and AD settings.

GUI 2206 shows an integrated management pane where multiple objects and features stored in the database can be displayed. To synchronize real time data and objects, a MSVM_VirtualSystemManagementService command is invoked to get summary information method for virtual machines.

Information and actions available to a user are provided through GUI 2206. The GUI may have several panes, where each pane is dedicated to a specific function/report. Action pane 2206C provides an interface for initiation of commands relating to a selected data source, which may be a virtual machine. As shown for a "new VM", its status can be "refreshed" by activating the associated icon. Other commands include start, turnoff, resume, pause, save, reset, snapshot, etc. Different commands are shown depending on the status/restrictions of a given machine. Parameters using the MSVM_ComputerSystem classes can be used to invoke these commands. When a change is made either at the source to the data being synchronized or the GUI to source data being synchronized, the changes is synchronized and reflected in the GUI. For example, the current state of the virtual machines can be provided in real time, indicating for example, whether a machine is on, off, its available RAM or other resources, etc.

The GUI provides reports on communications of multiple functions, contexts and parameters to be automatically synchronized at one time. The GUI provides an interface to set the time interval for both real time objects and real time data. The synchronization thread checks if any changes are noted, the new value is written to the database and reflect change on an administrative console GUI synchronization pane.

Figure 22D:
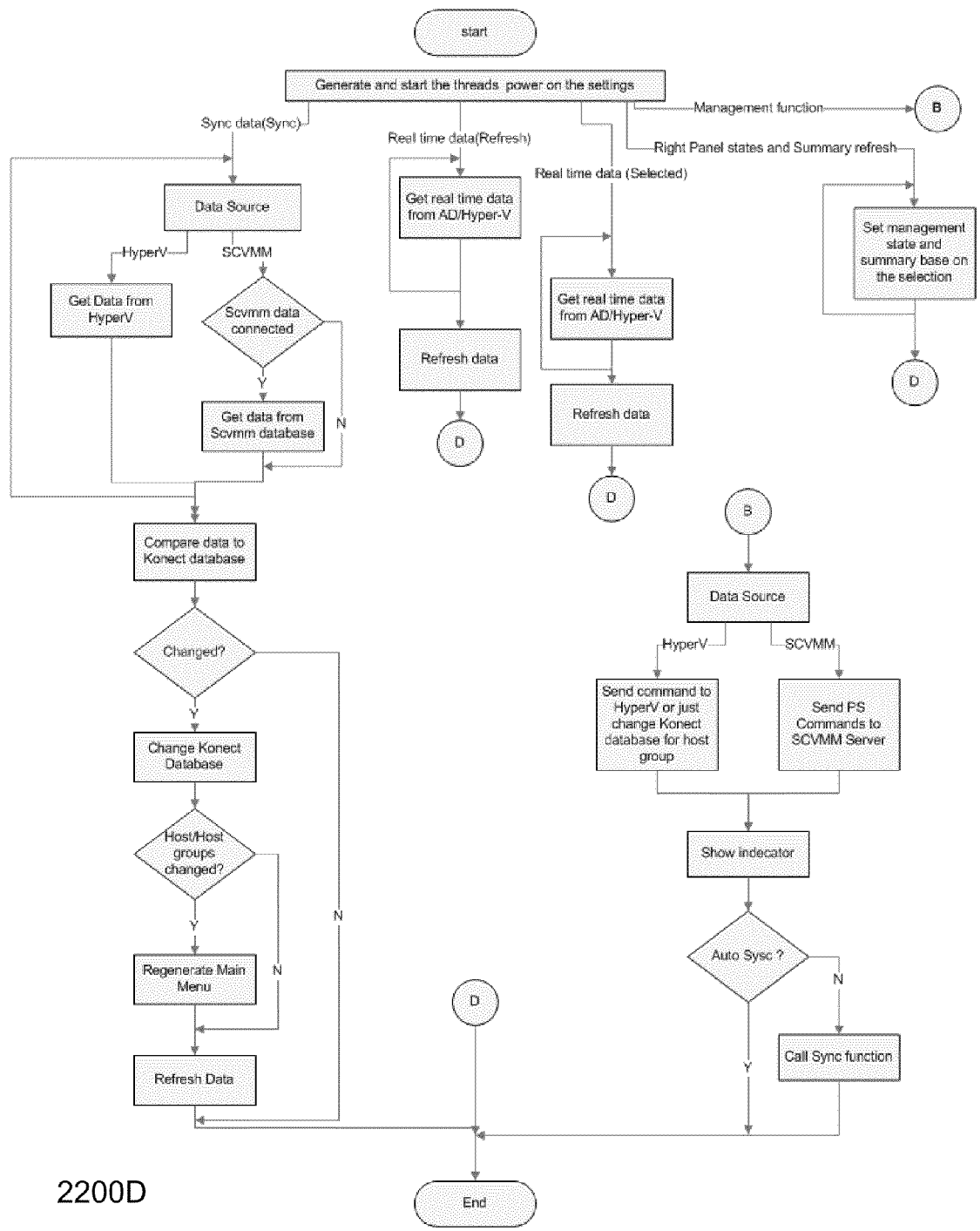
FIG. 22D provides flow diagrams of a synchronization algorithm for data objects for the network of FIGS. 1A and 9.

FIG. 22D shows functions executed by an embodiment to provide commands to data sources and/or to retrieve/write data at a data source in the network. Four main algorithms shown: management functions; GUI updates; data refreshes; and data synchronization.

For management functions, commands can be provided to a data source in an embodiment. As noted above, a data source can be any server in the network. Depending on whether the data source is either a Hyper-V or an SCVMM determines how management function commands are provided and executed by the data source. The data synchronization function may be called as a last function once the management function is completed. Management functions are actions to be executed that are determined by the virtual machine state of a machine. For example when a VM state is currently operating, certain management functions are made available for controlling VM. Exemplary management functions include: connect to VM, set settings of the VM, start VM, shutdown VM, save state of VM, pause operation of VM, resume operation, reset VM, get operating snapshot of VM, revert to state of VM, rename VM, delete VM, delete saved state of VM, generate new template VM and clone VM.

GUI update functions identify and set the management state for data devices and update any information on the GUI 2206.

Data refresh functions can be provided at defined intervals or can be selectively initiated.

Data synchronization processes dynamically synchronize data from either multiple hypervisors (Hyper-V) or database (SCVMM). In an embodiment, automatic data synchronization is provided through a C# process call using one or more WMI and .Net classes to read real time objects and data. Object classes, multiple threads, timer controls, functions and delegation algorithms are used to synchronize real time objects and data. Initially, process threads are created to start the monitoring of data and objects. Data synchronization is provided on periodic intervals. These intervals may be changed to tweak synchronization performance. The timer has user controls that allow users to adjust the synchronization and refresh rates of the data and objects.

Different processes are used to synchronize data based on the type of data to be synchronized, e.g. existing data, real time data and real time selected data. For existing data, the data source is determined. If the data source is from a Hyper-V machine, then the data is retrieved from the machine. If the data source is a SCVMM machine, then a connection is made to the SCVMM data source and the data is retrieved. Next the retrieved data is compared against the central database. If difference is detected, then it is presumed that the data in the central database out of date and the central database is updated. Once updates are completed the updated data may be refreshed to the GUI to show the revised value. For real time data, the data is periodically retrieved from the AD/Hyper-V source and then the data is refreshed to the GUI.

Real time data and object are synchronized using a Msvm-ComputerSystem class to retrieve virtual machine information. This class gets the data from the virtual database and the data is compared to against the main database and reflected in the GUI. A time synchronization value sets the time interval used to pull real time data and objects from the data source. The time synchronization control manages the frequency of synchronization of real time objects and data. Conditions that may affect the setting include hardware and software conditions of various components, such as CPUs, RAM and network traffic conditions. Control of time synchronization value allows data to be synchronized in an interval that minimizes data loss and message collisions. Synchronization and refresh times are managed using variables, such as Boolean variables to set priorities. If the Boolean variable is "true" then it can be accessed. If it is false it must wait before it can access data. In the case where data is being accessed or updated at the same time, this method applies. The ordering of priority of data can be set in various orders, as defined by a particular instance of an embodiment.

Now, further detail is provided on processes used to access data controlled by data sources in the network and how to provide commands to control aspects of the data sources themselves. Some fundamental processing elements are: a (programming) thread, a delegate, a method and a function. A thread is used to access data from data sources in the network and to provide commands to the data sources. A delegate can invoke a thread.

A delegate is class that provides logical construct that can be used to abstract and create data objects that can reference methods and that can be used to initiate a call to execute those methods. A delegate is a technical element in event handling in C# routines. A delegate declaration specifies a particular method signature and can invoke a thread. References to one or more methods can be added to an instance of a delegate. The delegate instance can then be "called" which calls the methods that have been added to the delegate instance. A delegate in C# is similar to in operation to a function pointer in C or C++. Using a delegate allows encapsulation of a reference to a method inside a delegate object. Methods include asynchronous calls that can invoke multiple threads simultaneously. Delegates allow creation of a thread to perform a function and when function is completed the thread can be stopped. The delegate object can then be passed to code which can call the referenced method, without having to know at compile time which method will be invoked. Named delegates are used to add multiple methods to events dynamically.

A thread can call a function and a method. Functions and methods are a processes that can execute a particular command, e.g. to retrieve a piece of data. A thread may be invoked when call is made to initiate a "synchronization start" to the Hyper-V or SCVMM data source. This call can create a new data object. The new data object can create one or more threads to call one or more functions to monitor real-time data on these newly created objects.

Threads can be created through delegates, through thread classes and through call invocations. As threads are used to implement commands and get data across the data sources in the network, execution of threads needs to be synchronized. As noted before, thread can provide a process from any virtual machine, operating system and/or function call. (Process) delegation methods are used to asynchronously reference a named method. A series of threads are processed sequentially and/or concurrently to build one or more commands from one or more objects. For example for a "save data" function for a given data source, the target data may need to be updated before it is saved. As such, a thread to update the data needs to be completed before a thread to save the data is initiated. As such, in order to provide proper sequencing of commands (e.g. data must be written to a location before it can be read), a certain sequencing of execution of threads is provided. One embodiment a prioritized list of functions and commands are prioritized for a list of virtual machines on a host server. As such, priorities can be assigned to commands and functions received from one or more machines, applications and/or operating system calls.

Threads are dynamically created and synchronized "on the fly" by calls that have been previously coded. For example, to facilitate synchronization, a delegate can be provided that initiates asynchronous calls to multiple threads, methods and functions. These calls can be event triggered to create threads. Dynamically created threads are used to retrieve data on properties of a virtual machine, for example virtual machine CPU percentage usage, state of operation, status of operation, RAM usage level, etc. A priority level can be assigned to a given thread. Threads can be sequenced and synchronized for execution based on their priority level. For example, for a request to obtain CPU usage, a delegate is provided that has processes to invoke threads that will make calls to determine the CPU usage of a device. When the CPU usage is desired, through the GUI, an administrator can invoke a request to obtain the usage. Upon invocation of the command, that CPU usage delegate is invoked. Upon invocation of the CPU usage delegate, its contained listed threads are invoked to identify the relevant CPU and obtain its usage level. Upon return of the data, the thread can be terminated, thereby stopping further execution of that thread on the relevant machines, thereby conserving execution bandwidth for other processes.

Once data for the thread is retrieved, the data can be synchronized to the source and the synchronized data can then be dynamically refreshed in the GUI. The refreshed data represents an accurate reflection of the synchronized data. A refresh interval can be set that is based on a synchronization time interval.

For example, to obtain real time data and objects of multiple virtual machines in a hypervisor or database requires the threads, timers and delegations to work together. A thread can get data about an object from a database using WMI Classes, .Net, C#, C++, PowerShell and VMM PowerShell processes. The thread can then monitor for changes periodically according to a data checking time value provided in a synchronization routine.

The embodiment generates and starts multiple threads in sequence in time intervals that are set by a synchronization timer to synchronize and get real time data and objects from related databases and third party data sources based on a hierarchy determined by underlying data. The priority of data is defined by a particular configuration for an embodiment. The synchronization, refresh, summary, and right action pane of the embodiment each have different priority level predefined by a variable in code to determine which data has higher priority.

Figure 22E:
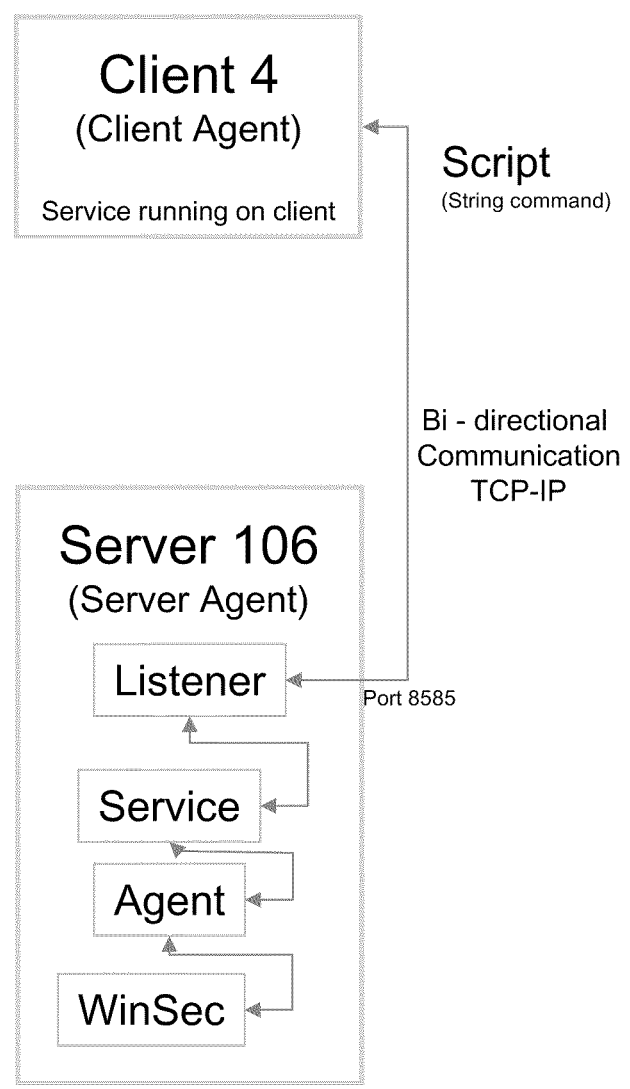
FIG. 22E is a block diagram of client/server communications for the network of FIGS. 1A and 9.

Referring to FIG. 22E, system 2200E shows a server and client agent that provides bi-directional communications between the server agent and client machines using the client agent in the network and physical and virtual machines. The client and server agents communicate through a web service that utilizes http/https commands to send client parameters and properties to a server agent module service. The server agent module uses C# process calls to call multiple functions and methods using WMI and .Net classes and scripts and PowerShell commands to modify, delete, add or configure client-to-server or server-to-client requests. Responses to commands can be provided.

(Process) jobs are used to control and associate objects, real time data, state and status actions commands. A job can be initiated using a RunSpace and pipeline to run a PowerShell script. An exemplary job may be to produce an audit trail for the object, real time data, action state and status command initiated. The job process is controlled by a server agent service that uses a creation thread that writes the data to a central data base. A GUI uses a get thread to read the data written to the central database. In the GUI this data is used to view all the jobs initiated by the server agent. Job requests are also handled by the server agent to send request to load balanced servers to monitor, modify, update, read, write, create and delete requests sent using the management GUI.

In a given communication dialogue, a client agent sends a string command to the server agent using TCP-IP. The server has a listener module set to default port 8585 to receive incoming requests. The listener then sends the request to the embodiment server service which then relays the request to the server agent. The server agent then sends the command to the WinSec.dll library to interpret the command within the parameters defined by WinSec.dll. The request may invoke a return value which is then propagated back to the client agent in the same logic flow.

The client and server agent service provides an interface to modify, update, read and write data between the server and client. Published resources can be configured, added and removed to an existing client device to enable secure access to user specifics published network resources. From the server module, a management GUI pane can be used to initiate commands and send parameters to specific servers and client machines. At the client agent, a monitoring module receives the parameters and executes requests.

It will be appreciated that when multiple virtual machines, virtual applications and virtual operating systems are being monitored through an administrator's terminal, each machine, application and/or operating system can create a separate GUI window providing reports on its local execution. However, an embodiment simplifies presentation of these reports by providing a GUI that links together all of the different entities. In one embodiment, a single GUI is provided to display results of threads. The GUI also provides an interface that enables a user to build commands for the virtual machine. For example physical and virtual applications and virtual machines can be threaded together and synchronized, with the resulting script stored in a database. The database can then be used to track inventories of the physical and virtual machines and their applications.

Referring to FIG. 23, a virtual machine library is used to retrieve, store, modify, edit and create virtual machines and hardware and guest operating system templates and their associated files. Flow chart 2300 shows processes to check properties of elements in the library. The library can track any element in the network, including data on the operating system, SCSI controller, network adapters, BIOS, processor, memory, communication (COM) ports, hard drives, image location, integration services, snapshots locations, data store locations, domain, password and time zone. Through a GUI management pane, shared folders can be added to the virtual machine library by running a server module interface.

The management pane provides an interface to add, remove, check credentials, refresh and explore user credentials. The pane can provide a tree view of all shares in library allowing them to explore contents of the shares and their folders. A share is a folder on a network that has share permissions enabled with specific permissions and security to enable only certain users and group's access to that folder share on the network. C# processes are used to call functions and method calls within a .Net class framework to enable shares to generate data for the GUI library. A GUI interface provides a list of credentials to use when adding and deleting shares within the GUI interface from servers with shares within a network domain. User credentials must have rights to add or delete these shares. A call using the DirectorySearcher class can authenticate users using AD objects to access shares with a network domain and to generate a GUI interface to these available shares. Using the Directory class, shares can be selected from GUI list and added into library tree view. User credentials can be encrypted. Shares can also be deleted from the library tree view.

Referring to FIG. 24, template creation of virtual machines from existing virtual machines on a host server within said network is provided. The virtual machine template allows creation of new virtual machines from a source virtual machines template. The virtual machine template can be pre-populated to include the required hardware and software configuration to create new virtual machines in addition to creating a new Security Identifier (SID), Media Access Control address (MAC ID) and Internet Protocol (IP) to a new virtual machine, thereby reducing errors and conflicts of computer names. The client agent can configure additional parameters such as add to domain, change computer name, enable remote desktop, enable remote procedure call (RPC), add users to the remote desktop users group, adds the remote desktop virtualization host server to the permissions list for the RDP-TCP monitoring process, enable a Windows firewall to allow an exception for remote desktop services, enable a Windows firewall to allow an exception for remote service management, restart the remote desktop services service or reboots the virtual machine, add a virtual machine to a specific organizational unit, install a desktop agent so a virtual machine user can dynamically authenticate and access network resources and dynamically apply user profile settings using group policy.

Flow chart 2400 shows a template creation process using C# to call specific methods and functions within the .Net classes to dynamically target virtual machines and create a template by running a server module interface. For example, a call multiple WMI classes to get all available virtual machines within target servers in domain network can be made. For the call, target servers that have been added to the database are retrieved. A Directory Searcher class is used to pass credentials from the central database to system network active directory credentials when creating a new virtual machine template. A source virtual machine can then be selected from a list of available virtual machines. When a virtual machine is selected, parameters to create a new virtual machine template are provided. Next, specific virtual machine hardware and software properties for the template are provided. The properties may include identifying properties including data relating to the guest operating system, SCSI controller, network adapter, BIOS, processor on the virtual machine, memory parameters, COM ports, drives, image locations for the drives, any integration services, snapshots locations, storage locations, domain, password and time zone. A selection can be made to identify a network location to store virtual machine files. A summary of all settings can be presented in the GUI. Software and hardware settings can be saved as templates in the database. These templates can be used to automatically fill setting parameters for new settings. Once a create command activated, an event handler calls multiple methods and functions within multiple class within multiple objects to begin creating the new virtual machine template. These commands both send and listen using port 8585 to the server's database. The MSVM_ImageManagementService Class can be used to invoke a mount method to copy settings into the virtual machine image when the target computer is turned off. The ChangeVMState function call can be invoked to cause the virtual machine to turn on. The virtual machine's virtual hard disk can then copied to the specified share location using the FileStream class read/write function for calculating the percentage for job status information of when the copy process is completed.

Once the copying is completed, the source virtual hard disk can be destroyed. This can be implemented using a MSVM_VirtualSystemManagement Service class to invoke a DestroyVirtualSystem method. This class is used to destroy virtual machine hard disks (VHD). Thereafter the template appears in the template library to use for creating new virtual machines. Preparation may be provided by a preparation module, such as Sysprep (trade-mark).

Referring to FIG. 25, details on provisioning of a virtual machine, needed to create a virtual machine are provided. Flow chart 2500 shows aspects of creating a virtual machine by an administrator. Available templates are retrieved from the database and a virtual machine template is selected from the results. Parameters are provided to needed create the new virtual machine. A selection is made for the type of virtual machine to be created. Two exemplary types include a new VHD and differencing disks. Next, the server is selected and the destination path of virtual machines is created. A logical location for the virtual machine can be identified, based on the "best" or most appropriate host server to create the new virtual machines. A storage location path for the new virtual machine files can be selected. Once completed the VHD files are copied to their storage location. Next, the number of virtual machines to be created is set. The administrator can also change machine hardware and software template properties for the virtual machine (described earlier). A command to start up the new virtual machines once they have been copied to their new location is available is provided on the GUI. A summary of all settings is then presented. A create button is provided in the GUI.

When the create action is activated, an event handler calls multiple methods and functions within multiple classes within multiple objects to create the new virtual machine template. A copy function using an I/O name space function within a read/write files class in the .Net framework to copy the file in blocks from source to destination folder. The file transfer is stored in a buffer to track file percentage transfer from source to destination. The file stream class read/write function copies the file and tracks the job process percentage until copy function is completed. To save on bandwidth traffic the VHD file is then copied from its destination location and multiple copies are created depending on virtual machine type. Two types of machines are provided: standard and rapid. For a standard type, the complete VHD is copied. The number of copies depends on the number of virtual machines being created. For a rapid type, the VHD is copied once and a snapshot VHD is created for each virtual machines created.

Once the virtual machines have been created, an automatic start function prepares the new virtual machine, using Sysprep calls. The GUI then initiates methods, functions and algorithms to automatically synchronize the new virtual machines.

A virtual machine can have either a server or desktop operating system installed. Virtual machines with desktops operating systems installed are referred to as personal or pooled desktops or virtual machines. Virtual machines and server and personal desktops can be used interchangeably for the purpose of virtualizing processes. The virtual machines that have desktop operating systems installed may be assigned to specific users and groups either as a personal or pooled desktop. Personal desktops include a user having an AD profile with personalization of the profile. Pooled desktops can be assigned to users and groups with some personalization of their features. Pooled virtual desktops consist of virtual machines available in a pooled group folder and allow the user minimal personalization to the virtual desktop. The pooled group folder name that contains the virtual desktops can be any name when created. Pooled virtual desktops consist of virtual machines available in a pooled group folder and allow the user minimal personalization to the virtual desktop.

Personal desktops allow customization of their desktops. When a user logs out of a personal desktop all his settings are retained. Pooled desktops generally do not allow personalization because it is used by multiple users. When a user logs out of a pooled desktop it reverts to a default state prior to the user logging in.

To assist in restoring of an environment, virtual machines allow data snapshots to be taken of a virtual machine's state. Snapshots capture hardware and software settings when the snapshot was taken. A snapshot can be applied to reset the machine to a previous state.

Figure 26:
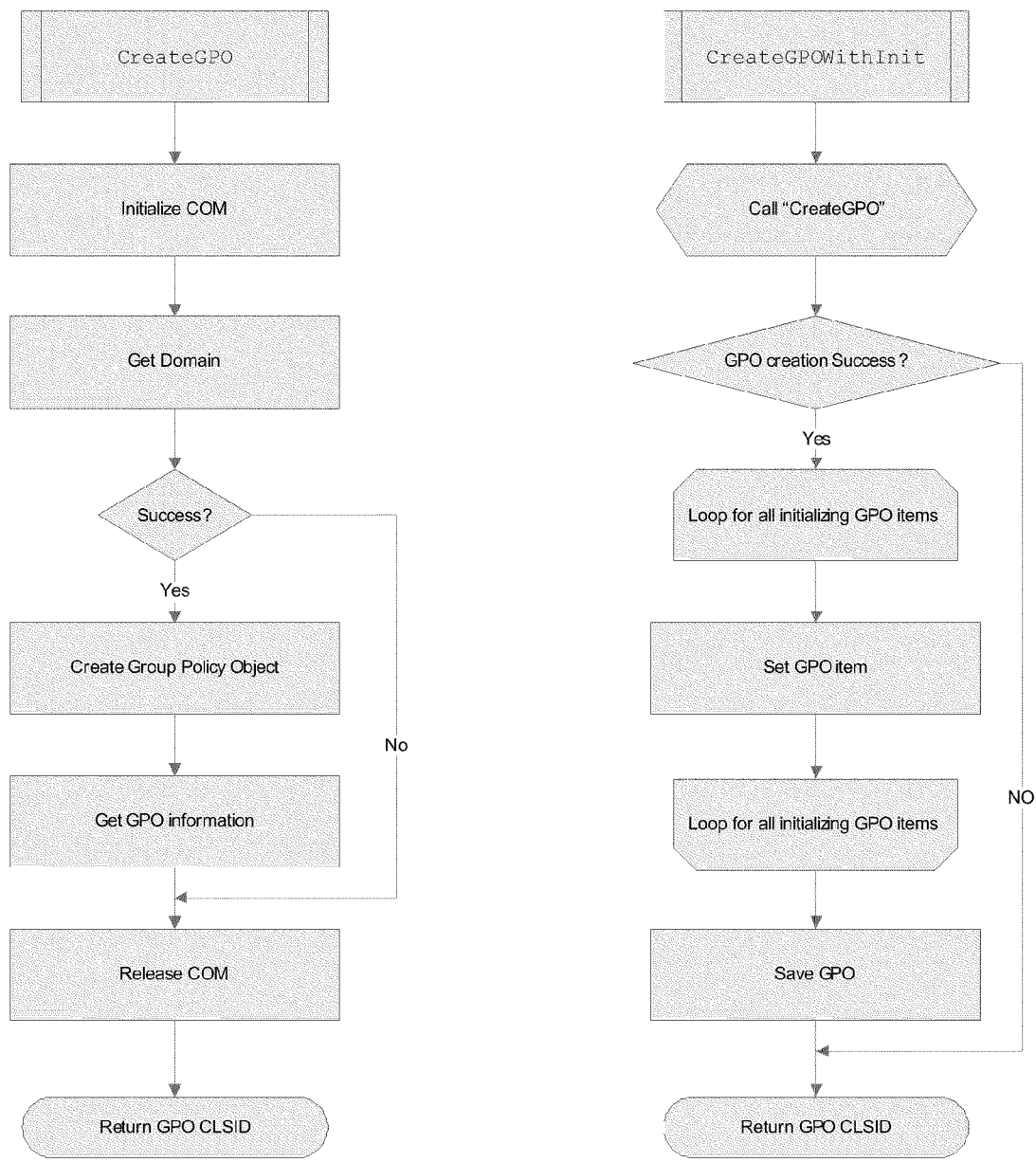
FIG. 26 contains flow diagrams of group policy creation algorithms used in the network of FIGS. 1A and 9.

Referring to FIG. 26, policy settings can be established for groups of virtual machines. In particular, group policy settings computer and user configurations to be set by an administrator with one or more physical or virtual machines within a domain. Group policy templates may be created to set user profiles when accessing network published resources, including user specific network published resources such as remote server applications, virtualized applications (e.g. App-V trade-mark), session desktops, virtual machines that are pooled and persistent and virtual machine servers.

Through a GUI an administrator can combine and create a specific virtual machine operating system, assign user specific published resources and group policy computer and user configuration setting for rapid deployment of user resources. The pane also provides facilities to manage AD users, groups, computers and their settings. The settings include parameters relating to OUs, group policy objects (GPOs) and their links, AD users, groups and computers.

Flow chart 2600 shows two processes, CreateGPO and CreateGPOWithInit, which are used to configure network computer and user configurations. One embodiment uses Microsoft Group Policy features.

The embodiment uses interfaces, objects and methods using C++. GPOs are created using the following sequence of interfaces, objects and methods: multiple interfaces, interface IGPM and IGPMDomain, IGPMGPO. IGPM method GetDomain( ) calls are used to get an IGPMDomain object. To create GPO, an IGPMDomain object's CreateGPO( ) method is called to create the GPO. To create a DLL file with multiple commands, a GPO interface DLL file provides GPO commands, including creating a GPO, reading a GPO item, setting a GPO item and deleting a GPO item. To create a GPO and return GPO class ID, a CreateGPO, a IGPMGPO interface and COM techniques are used to create a GPO, which will return the GPO Class ID if successful. A GPO can also be created using "CreateGPO" through CreateGPOWithInit. After successful creation, an embodiment sets properties of the GPO items according to contents of a request file. These commands are generated asynchronously to effect network settings using Microsoft Group Policy. The GUI provides interfaces to modify multiple GPO create settings. The embodiment processes the .Net framework and uses C# to invoke methods, functions and algorithms from a DLL to create GPO and links created using C++ so that multiple settings using multiple classes within multiple objects may be initiated in a single command button to initiate an event handler.

Referring to FIG. 27, flow chart 2700 shows processes to get, delete and set a GPO. A GPO can contain multiple computer and user configuration settings that affect the network using Microsoft group policy manager. User configuration settings affect users logging into the network based on their authentication credentials which can limit or grant specific users specific rights on the network. Hardware configuration settings using group policy object can grant or limit computers settings within a network. Item settings to effect network computer and user configurations using Microsoft Group Policy. The embodiment uses interfaces, objects and methods using C++ calls.

The following sequence of interfaces, objects and methods are used to get, delete and set GPOs. For an Interface IGroupPolicyObject, a Get GPO call is made to IGroupPolicyObject method IGroupPolicyObject( ) to get GPO Path. To get registry information, a call is made to IGroupPolicyObject method GetRegistryKey( ). Operations are made on the GPO registry to get, set and delete a GPO item. To get a GPO item, a call for a GetGPOItemSetting is invoked using IgroupPolicyObject interface and GPO registry. To delete a GPO item setting, a call is made to DeleteGPOItemSetting using IgroupPolicyObject interface and GPO registry. To set GPO item setting, a call is made to SetGPOItem using IgroupPolicyObject interface and GPO registry. Batch processing for GPO items allows multiple operations to be processed at one time. GPOItemsAction calls provide batch processing for GPO items, including Get, Set and Delete. These commands are generated asynchronously to affect both user and computer network configuration settings using Microsoft Group Policy.

A GUI provides an interface to modify multiple GPO get, delete and set settings. The GUI provides processes that use the .Net framework and C# to invoke methods, functions and algorithms from a DLL to get, delete and set a GPO created using C++ so that multiple settings using multiple classes within multiple objects may be initiated in a single command button to initiate an event handler.

Figure 28:
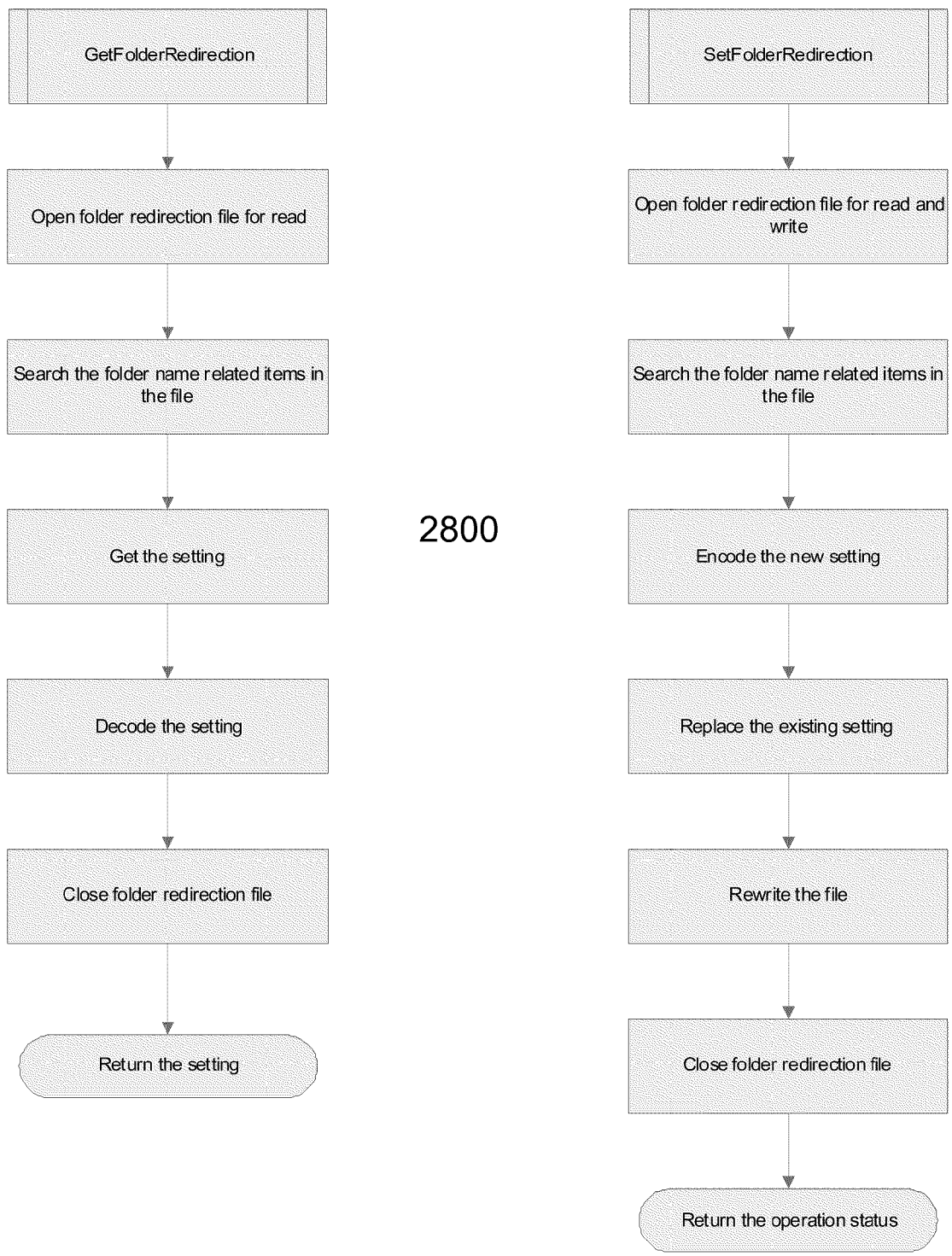
FIG. 28 contains flow diagrams of redirection management algorithms used in the network of FIGS. 1A and 9.

Referring to FIG. 28, flow chart 2800 shows features of folder redirections. Folder redirections can be set to implement network computer and user configurations using Microsoft Group Policy. Folder redirection can direct specific folders to different server locations. The new location can be a folder on the local computer or a directory on a network share. Users can work with documents on a server as if the documents were based on the local drive. For example, a user can redirect a "My Documents" folder (typically mapped to the computer's local hard disk) to a network location. Documents in the folder are available to the user from any computer on the network.

GPO interface DLL file provides GPO Object operation, including creating a GPO, reading a GPO item, setting a GPO item and deleting a GPO item. A command to GetFolderRedirection uses the file system to directly access the GPO folder redirection file and decode the folder redirection setting. A command to SetFolderRedirection encodes the folder redirection setting and puts it into the GPO folder redirection file. These commands are generated asynchronously to effect network settings using Microsoft Group Policy. An item has its own registry path. As such, setting a value to an item writes data to the corresponded registry data. A single save function can be provided to save computer GPO configuration settings and user GPO configuration settings respectively. Using the single save function, it would appear that the save function saves computer and user configuration settings together. However, in fact the two save functions use different GUIDs to implement separate saves. The Save( ) function as defined in IGroupPolicyObject is one example of a single save function. This is achieved using batch processing for GPO items settings that can be applied to network system settings asynchronously.

The GUI provides processes to modify multiple folder redirection GPO settings. The GUI uses the .Net framework and uses C# to invoke methods, functions and algorithms from a DLL to get and set a folder redirection created using C++ so that multiple settings using multiple classes within multiple objects may be initiated in a single command button to initiate an event handler.

Figure 29:
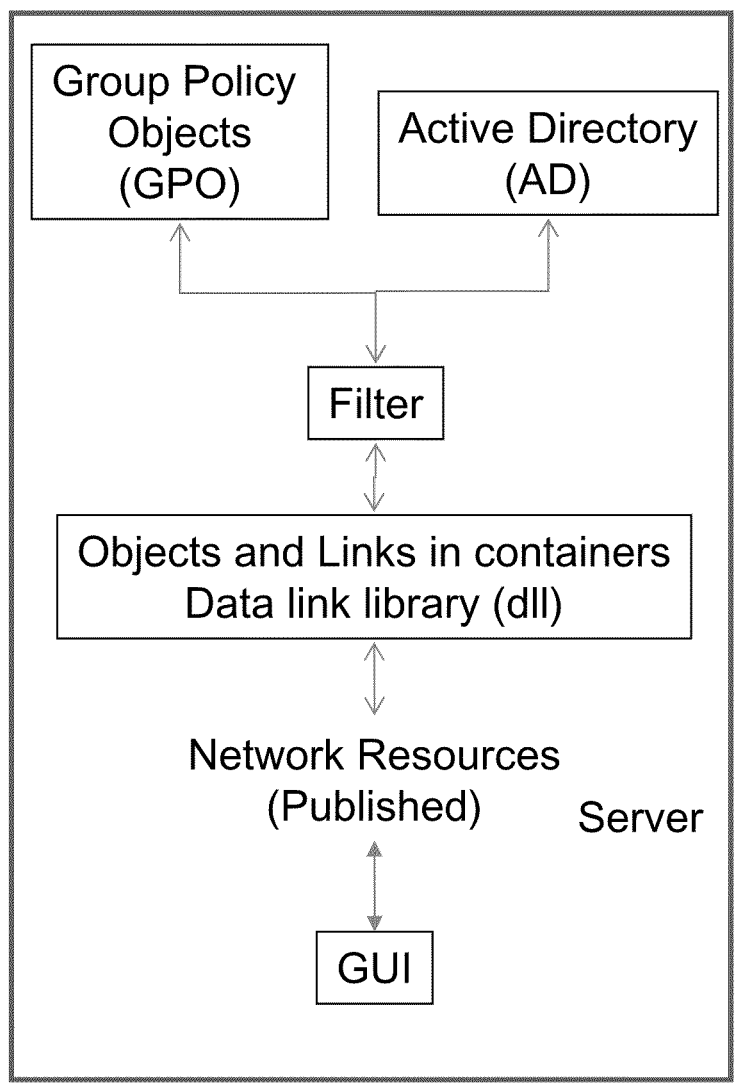
FIG. 29 contains flow diagrams of search filter algorithms used in the network of FIGS. 1A and 9.

Referring to FIG. 29, an embodiment provides a filter to dynamically search OUs and AD objects in relation to their published network resources on a server in the network. Per standardized definitions, AD objects are users, groups and/or computers. Each AD object can have settings associated with it. Status data is reflected in the value of the associated AD. In flow chart 2900, a set of filtering processes is provided allowing an administrator to dynamically search, select, view and manage unique OU and AD objects and their profile association to published links to said resources in said network. The GUI provides calls to .Net framework and uses C# to invoke a DLL created using C++ so that multiple commands affecting multiple OU settings may be initiated in a single command. The embodiment sends a C# command to call the functions, methods, properties, variables and contexts within the DLL that were created by C++ functions. The C++ functions provide methods and functions that are provided to the group policy manager and AD manager to retrieve/get object variables, context and properties in the network. These objects contain users, groups, computers, organizational units and Group policy objects and their links. These objects are then retrieved and returned to the GUI using C# to reconstruct the objects in an integrated view.

The embodiment framework is multi-layered and uses Microsoft Windows message operating system calls to communicate to the multiple layers to dynamic assembly the GUI interfaces using user controls. These user controls have algorithms, methods and functions when selected from GUI. The view allows an administrator to view and filter the object by calling a filter method to filter a specific user, group, computer and OU and their associated published resources in the network. The associations of the objects and their published network resources are made by using a function call to access the central database and to associate published resources to those objects. Through the GUI, an administrator has a global view of the objects and their associated published resources. The GUI also allows filtering of these objects to manage the objects and their associated published network resources. The GUI provides an interface to initiate commands to reconfigure those objects and network resources. Such commands can ultimately use C# processes to call or invoke multiple methods, functions and algorithms in multiple classes within multiple objects. The embodiment uses interfaces, objects, methods and function calls using C++ processes. To manage a user, group, or computer an embodiment identifies and gets a GPO path associated with the entity.

Figure 30A:
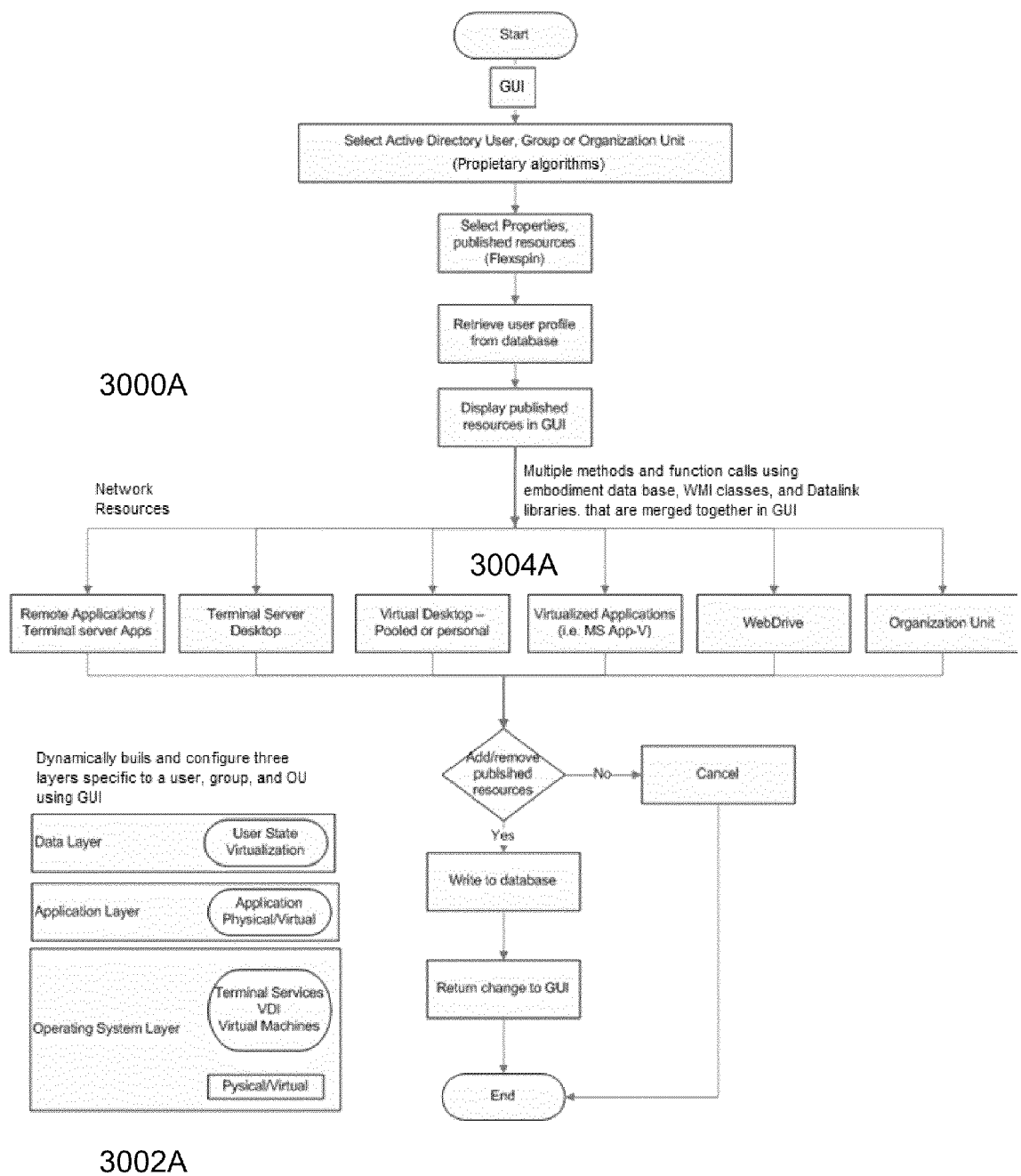
FIG. 30A contains flow diagrams for creation and assignment of resources for the network of FIGS. 1A and 9.
Figure 30B:
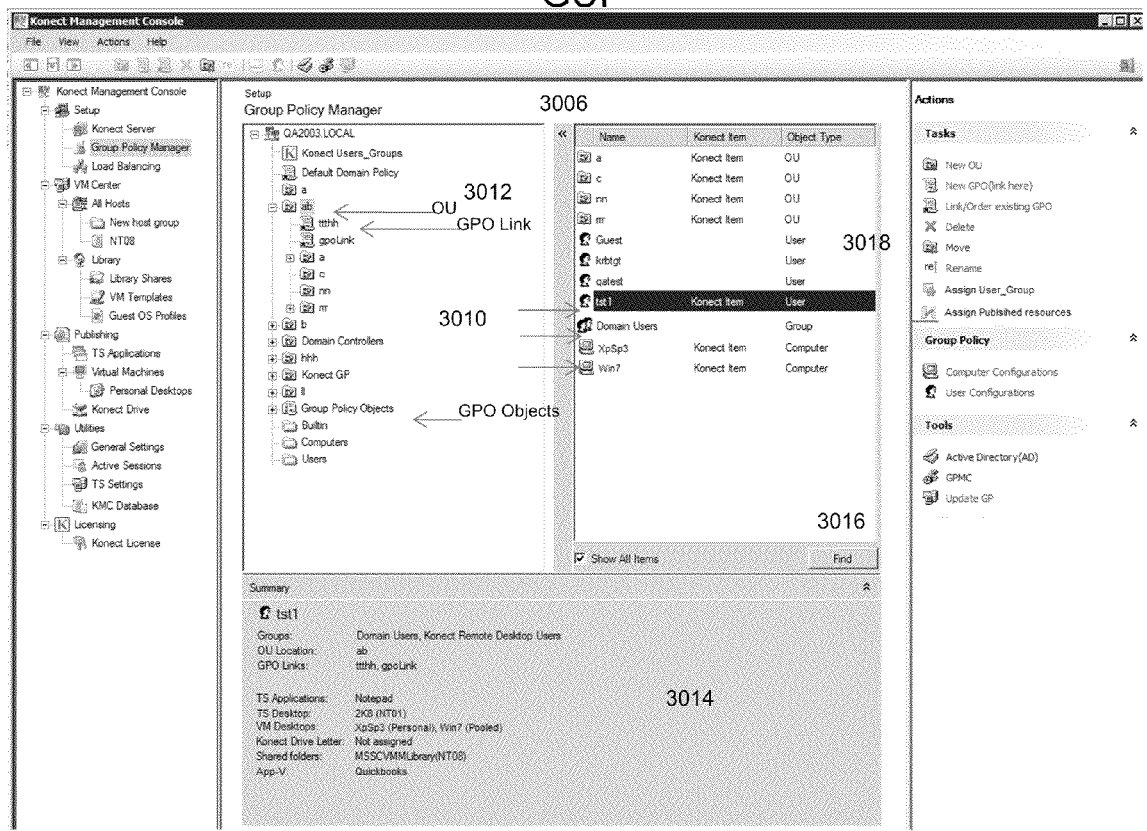
FIG. 30B contains flow diagrams for creation and assignment of resources for the network of FIGS. 1A and 9.

Referring to FIGS. 30A and 30B, flow chart 3000 shows processes to assign resources to a user through its server module. Management control is provided for combination of physical and virtual network resources to a specific user and group using standalone workgroup or AD credential. Exemplary resources that can be controlled include physical and virtual applications, desktops, terminal server desktops and applications, servers, virtual machines, virtual desktops, operating systems, OU settings, AD settings and user profile settings 3004.

A GUI interface 3006 is provided to assign resources to a user's profile for the VM. The GUI presents specific users and group's options to manage physical and virtual resources to physical and virtual machines relating to the machines' operating systems, applications and user profiles/states. In obtaining the information, the GUI interface makes C# calls to functions and methods within the group policy DLL and WMI classes to retrieve active directory objects, such as users, groups, computers and organizational units and their specific properties, variables and context. These objects are then cross referenced with the elements in the database, which are then merged to provide a view the data in the GUI. In FIG. 30B, GUI 3006 provides a view of available and published resources, settings and parameters respective to a specific user, group, computer OU and GPO links. The network resources include session based terminal server desktops and applications, virtual personal, pooled machines and servers, virtualized applications and a web drive 3008. The published resources can be dynamically applied to a specific user, group, and computer object 3010. The objects specified OU location and GPO objects and their links applied 3012 to that OU will affect objects group policy settings. A summary of the GPO or AD object resources and settings can be viewed in the summary 3014A when object is selected. These settings and assigned resources are dynamically added to a user's profile. In FIG. 30A, this allows dynamic building of combinations of the operating system layers, application layers and user state data layers 3002 of physical and virtual operating systems, applications and user profile settings using active directory and group policy. Modifications are then written to the database and the changes are reflected in the GUI.

In FIG. 30B, AD objects can be retrieved (shown by reference 3016) and moved (shown by reference 3018) using the DirectorySearcher class. GPOs and their links can be dynamically created, moved, renamed and their link orders can be reassigned that affect AD objects in specific OUs (shown at reference 3018). Network resources can dynamically assign a specific AD user or group a specific operating system (physical or virtual), applications (physical or virtual) and user profile settings (AD and Group Policy) that are then dynamically applied to that specific user or group. When a user logs in, the client the network resources are dynamically assembled in the client said device within the network. The user can access these resources both in the Local Area Network (LAN) and Wide Area Network (WAN) environment to said network.

The single GUI management console can filter OUs and AD objects in the OU. Active Directory objects can be users, groups and computers. The GUI uses the .Net framework and uses C# to invoke functions, methods, variables and algorithms within DLL, WMI classes, Hyper-V PowerShell and SCVMM PowerShell, scripts and C++ commands so that multiple users, groups and computer settings may be initiated in a single command.

Figure 30C:
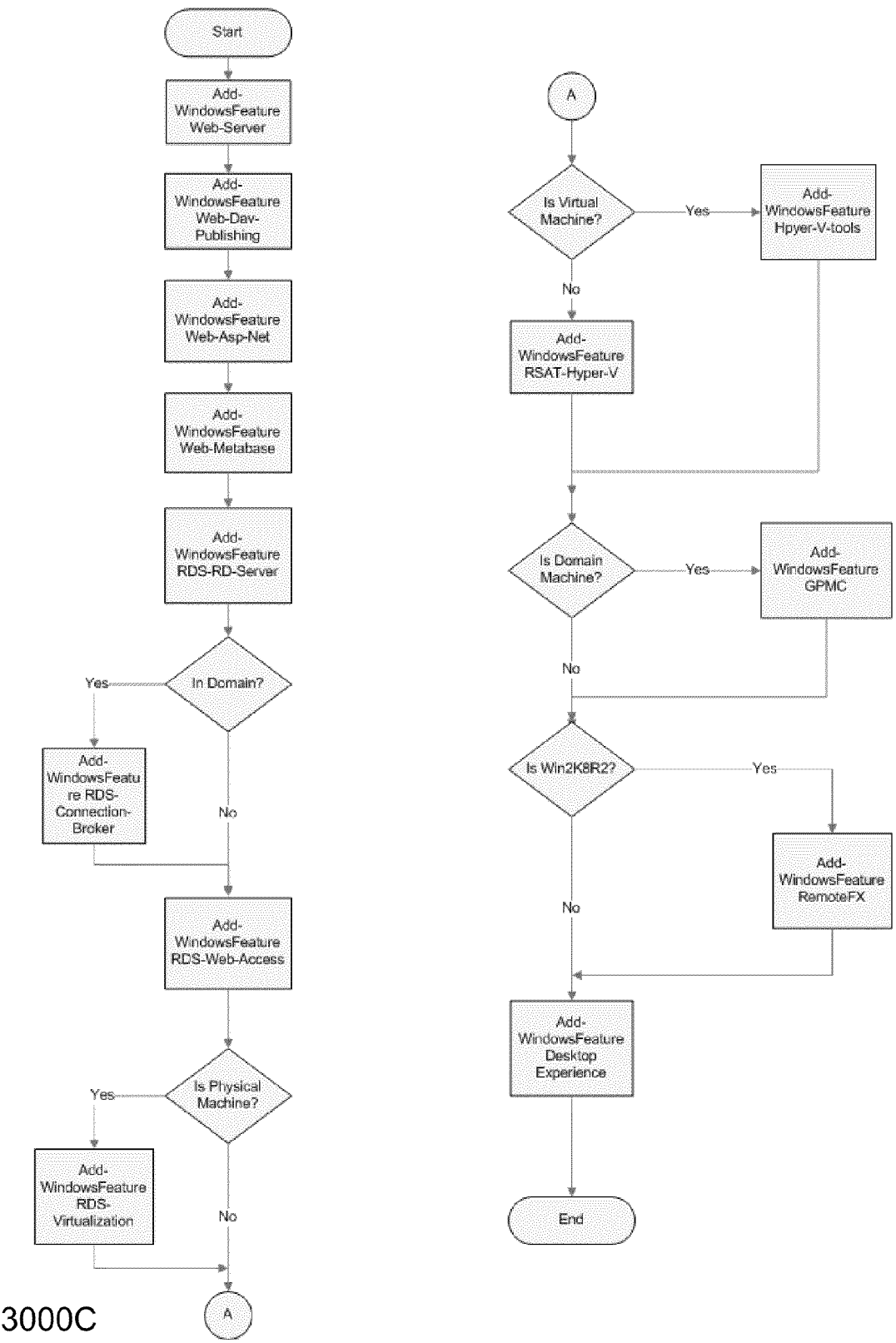
FIG. 30C contains flow diagrams for role management features the network of FIGS. 1A and 9.

Referring to FIG. 30C, an embodiment provisions for mixed server environments through a GUI "point and click" interface, used to configure a server's environment. Flow chart 3000 shows processes to add or remove roles and features, change registry settings, add file components and other functions. These roles and features can include Microsoft's remote desktop (RD) session manager, RD Virtualization Host Manager, RD gateway manager, RD Licensing manager, RD Connection Broker, RD Web Access, Group Policy Manager, AD Manager, SCVMM manager and Hyper-V Manager. Auto provisioning can be archived using C#, .Net and PowerShell commands to define and enable server roles and features and to enable their respective services in an appropriate sequence to automatically provision multiple managers, roles and features.

An embodiment maintains proper sequencing of execution of processes. Proper sequencing is important since some features and roles cannot be implemented without prerequisites and server reboots. The commands include the ability to add, remove and get specific server features and roles. As noted earlier, a "role" is a collection of software components that enables a server to provide a service to its network. A "feature" is a component/data/element that a server may need, but the feature is not necessarily the primary function for the server. The GUI uses C# to call a method using PowerShell commands and classes within the .Net framework. Window Server roles and features can be added to future releases via a server GUI. The sequence of prerequisites to install roles and features are determined by the operating system. Sequencing of the roles is done so that installation of these features meets an operating system's requirement. These commands are initiated in a synchronous method to sequentially step by step add, remove and get a specific role or feature.

To determine what roles, role services and features are installed on a server, a ServerManagerCmd.exe syntax-query [<query.xml>] [-logPath <log.txt>] command requests specific roles and features that are to be used. The installed roles and feature XML data list resides on the target server. The command will return data specifying roles and features are installed on the target server from this list.

The sequence of the roles, role services and features are determined by the server requirements and is encoded in tables in the database. Particular sequences of roles are defined so that installation of these features meets an operating system's requirements. For certain roles, a particular sequence of execution is individual roles is needed. For example, a role must exist (e.g. a role needs to be installed) before it can be removed. Roles are executed through a PowerShell string command. To provide sequencing of roles, a preset priority-PowerShell string is defined and implements a set sequence of execution for the roles.

If a sequence of execution is not correct (leading to a logical error), a notification window is generated on the GUI. One corrective action is to first restart server before additional role or feature can be installed. The process can first initiate a call to a method to ensure that the web server role is installed. If it is not, then this role is started. If it is installed then the process attempts to install the next role and feature.

To begin installation of specified roles, role services and features, machine generally first needs to have the webserver, web-DAV publishing, web-asp-net, web metabase and RDS-rd-server installed thereon. The embodiment then checks to see if the server is attached to a domain. If it is, then the method installs the RDS connection broker. If not, the method adds the rd-web-access. Then the method checks to see if the server is a physical or virtual server. If is it is a physical server, the method adds the RDS virtualization. If it is a virtual server, the method adds the Hyper-V tools. Then the method adds the RSAT-Hyper-V. The method then checks to see if the server belongs to a domain. If the server does belong to a domain, the method checks whether the server supports a remote function call (Remote FX) feature. If the server supports the feature, then it is installed. If not, a desktop experience is installed. The desktop experience is a feature that enables virtual machines and terminal server sessions the ability to support Microsoft's technology desktop features. Once the installation is completed, a server reboot is performed.

Operations that can be conducted on roles include adding a role, getting a role and removing a role. C# is to used call PowerShell cmdlets to get, install, restart and remove a role, role service or feature.

To add a specific role, role service, or feature run a PowerShell command, such as the command Add-Windows-Feature [-Name] <string[ ]> [-IncludeAllSubFeature] [-logPath <string>] [-WhatIf] [-Restart] [-Concurrent] [<CommonParameters>] or the command Add-WindowsFeature Application-Server,Hyper-V,WAS, can be invoked.

To get a specific role, role service, or feature run a PowerShell command, such as Get-WindowsFeature [[-Name] <string[ ]>] [-logPath <string>] [<CommonParameters>] can be invoked.

To remove a specific role, role service or feature run a PowerShell command, such as Remove-WindowsFeature [-Name] <string[ ]> [-logPath <string>] [-WhatIf] [-Restart] [-Concurrent] [<CommonParameters>], can be invoked.

As noted, a preset list of priority-PowerShell string commands can be provided to sequence execution of the add/get/remove roles. The elements are installed and then the roles are executed according to the sequence defined. These add/remove/get commands can be initiated in that order synchronously to sequentially step by step add, remove and get a specific role or feature define by Microsoft operating system requirements for a specific role or feature.

The noted features enable an administrator to manage multiple aspects of multiple managers, roles and features specific to deploying, managing and publishing physical and virtual machines, applications and user profile setting with a network. The single GUI management console uses the .Net framework and uses C# to call methods, functions and algorithms in WMI classes, Hyper-V PowerShell (trade-mark) and SCVMM PowerShell (trade-mark), scripts and C++ commands so that multiple roles and features settings may be initiated in a single command.

Referring to FIG. 31, load balancing is provided to support mixed server environments. Load balancing can include balancing a physical and virtual mixed Microsoft windows server and desktop environments. The load balancer utilizes load-balanced logic to create load balancing farms of servers to isolate specific server operating systems to a particular group and to apply a load balancing algorithm to determine how network resources, initiate, resume and redirect these resources within network server environment. These network resources include Remote Server Application, Remote Desktop Session Desktops and Virtual Machines.

Flow chart 3100 shows a process to dynamically create terminal server farms with a particular set of load balancing rules. Each load balancing farm has load balancing logic and algorithms to handle incoming client requests. Each server may have software, a server plug-in to execute the balancing. Alternatively, a communications server may be provided to implement a load balancing plug-in, e.g. the IWTSSPlugin. The communications server may be called by the session broker for passive notifications and may make requests to make load balancing decisions to initiate Remote Desktop Session (RDS). The session broker is responsible for launching and resuming sessions within the load balancing farm.

The client can make a connection request through the client agent, using any of the remote/local connection agents described herein. The client agent is responsible for communicating requests between the client and server. Using C# calls, the client system calls a server module service to get specific context, parameters and variables which are then returned back to the client system. This data is then sent to the server plug-in using http/https. The server plug-in is an installed and registered Component Object Model (COM) object that uses a specific set of algorithms and functions to determine what method it will use to reconnect the client to an existing RDP session or create a new RDP session. The RDP connection broker service stores the session ID's, user names and name of the session host server and farm it belongs to. The RDP client request to the server session broker will use this information in addition to this plug-in context, variables and parameters to determine if the session will reconnect or create a new session and on what server in what farm. A service on the server responds the RDS session broker server as the destination. The client device may launch a RDP connection to the RDS session broker server. RDS session broker may initiate queries against the server LBplugin to get the proper machine ID. The LBplug-in may initiate the load balancing algorithms and returns machine ID. Load balancing algorithms can utilize one or more of the following factors in determining how to balance their loads: past allocations (e.g. through round robin allocations), memory management issues, user count, virtual machine count, etc. The RDS session broker can redirect the clients RDP connection to the right destination server. Load balancing farm settings, adding, removing and joining servers use C# to call methods, functions and algorithms dynamically. Load balancing farm, parameters and algorithms can be set using Group policy settings using C# to call methods, functions and algorithms using a DLL created using C++.

Load balancing for the Windows 2008 operating system for terminal server farms relies on a COM based plug-in deployed on a session broker sever. The load balancing plug-in has operational logic to select and acquire an appropriate terminal server session server to replace the default algorithm implemented by session broker server. Load balancing plug-in implements ITsSbLoadBalancing, ITsSbResourceNotification and IWTSSBPlugin interfaces.

The following methods are derived from the interfaces and have all been implemented to provide a load balancing algorithm. The algorithm uses logic to determine how a user using a RDP session or VM connection using RDP is connected to a target server in the network. The methods utilize the following commands to initiate, terminate and get a most suitable target server, notify session changes, notify target changes and notify client connection state changes:

Initialize user session, STDMETHOD (Initialize) (_in ITsSbProvider *pProvider, _in ITsSbPluginNotifySink *NotifySink, _in ITsSbPluginPropertySet *PropertySet);

Terminate user session, STDMETHOD (Terminate) (_in HRESULT hr); Get most suitable target server, STDMETHOD GetMostSuitableTarget)(_in ITsSbClientConnection*pConnection, _in ITsSbLoadBalancingNotifySink* pLBSink); and Notify session changes, STDMETHOD (NotifySessionChange)(_in TSSESSION_STATE state, _in ITsSbSession*pSession){return E_NOTIMPL;} Notify target change, Notify client connection state change STDMETHOD (NotifyTargetChange)(_in DWORD pChangeType, _in ITsSbTarget* pTarget);STDMETHOD NotifyClientConnectionStateChange)(_in CONNECTION_CHANGE_NOTIFICATION ChangeType,_insSbClientConnection *pConnection) {return E_NOTIMPL.

When a session broker service is started, the COM plug-in is loaded and the method Initial is called. For this method, load balancing configuration rules are read from either a XML file or a web service call and an active load balancing rule is established as the current active session to determine which rules to pick up for the correct session host server. When a RDP client launches a connection request, method GetMostSuitableTarget is called. In this method, based on parameters including the connect request, application ID and other parameters, a suitable target session host server is selected based on the active load balancing rule. The farm ID and machine ID are returned. When the session broker service is stopped, a "terminate" method is called to clean up the cached load balancing rules and the session host server's status.

Although the disclosure has been described with reference to certain specific embodiments, various modifications thereof will be apparent to those skilled in the art without departing from the scope of the disclosure as outlined in the claims appended hereto.

The invention claimed is:

1. An access system for a client connected to a server in a computer network to a resource stored in said network, said system comprising:
a microprocessor;
a memory component for storing instructions for execution on said microprocessor;
a file stored in said client and said server;
an operating system that accesses said file, said operating system being able to be executed on said client and said server;
an icon logic module providing instructions to said microprocessor
to generate a first icon on a display associated with said client, said first icon providing a graphic representation of a source of an instance of said resource reflecting whether said resource is located at said client or at said server; and
to monitor for activation of said first icon at said client;
a resource launching module providing instructions to said microprocessor
to launch said resource from either said client or said server for said client depending on whether said resource is to be launched from said client first or said server first and to cause an application to access said file through either said client or said server depending on whether said file is to be accessed on either said client first or said server first; and
to update a registry containing activation information on said resource, said registry being accessible by other processes operating on devices in said network;
an access module providing instructions to said microprocessor to access file through said server using load balancing algorithms using Remote Desktop Protocol (RDP) commands;
an authentication module providing instructions to said microprocessor to access a directory structure accessed by said server using Group Policy Objects (CFOs) and Active Directory (AD) objects to authenticate said client with said server;
a library accessible by said server to store virtual machine templates on said server in said network; and
a virtual machine module to access said library and create virtual machine templates for said library and to create virtual machines from said virtual machine templates, said virtual machine module providing to a host machine in said network access to a plurality of machines, user profile settings and instances of an application in said network and to multiple operating systems,
wherein
said resource is an application that can execute on said client or said server.

2. The access system as claimed in claim 1, wherein said host machine has a hypervisor installed thereon to implement supervisory roles and functions for said virtual machine module.

3. The access system as claimed in claim 2, wherein said host machine comprises:
a synchronization module in said server to synchronize data and objects from a plurality of hypervisors in said network.

4. The access system as claimed in claim 3, wherein said synchronization module:
synchronizes processes threads received from any of a virtual machine, operating system or function call generated in said network.

5. The access system as claimed in claim 4, wherein said synchronization module:
utilizes process delegates to asynchronously create said threads by accessing and synchronizing a prioritized list of functions and commands.

6. The access system as claimed in claim 1, wherein said authentication module manages user profiles and permissions using GPOs in said network.

7. The access system as claimed in claim 1, further comprising a folder redirection module in said server to change a target location of folders in a user profile within said network.

8. The access system as claimed in claim 1, further comprising a filter module to filter AD objects and their assigned network resources to specific users, groups and computers in said network.

9. The access system as claimed in claim 1, further comprising an object management module to retrieve a user's profile and to select, view, assign and manage objects and their links to network resources in said network.

10. The access system as claimed in claim 1, wherein said virtual machine module further comprises a synchronization module to synchronize operation of said plurality of machines, said instances of said application and said multiple operating systems and to provide control of said operation though a graphical user interface (GUI).

11. The access system as claimed in claim 10, wherein said synchronization module:
generates process threads to synchronize data based on the type of data to be synchronized;
determines a data source when existing data is being synchronized;
establishes a connection to a virtual machine manager (VMM) data source when the data source is a VMM, and then retrieves data from the SCVMM machine;
compares the data is compared against a central database; and
updates the central database if a difference is detected.

12. The access system as claimed in claim 1, further comprising a load balancing module in said server to distribute components of a task to a plurality of servers in said network.

13. The access system as claimed in claim 1, wherein:
when said file is stored on said server, said first icon is provided with visual attributes indicating that said file is located on said server; and
when said file resides on said client, said first icon indicates that said file resides on said client.

14. The access system as claimed in claim 1, further comprising:
a resource execution module that provides further instructions to said microprocessor to initiate an access of said resource on said client after attempting to access said resource on said server, if said server is not accessible.

15. The access system as claimed in claim 1, wherein said server further comprises a configuration management interface accessing user profile data defining logical data interfaces relating to said file, said application and a relationship between said file and said application, said user data providing privilege and sharing rights for said file and said application.

16. The access system as claimed in claim 15, further comprising a virtual drive map of files relating to said file on said client, said drive map utilizing said user profile data and providing access to said file from said server to said client and from said client to said server.

17. The access system as claimed in claim 1, further comprising:
a second module in said client providing instructions to said microprocessor to provide access to a directory structure stored on a second server in said network using Active Directory (AD) protocols to authenticate said client with said server; and
a third module in said client providing instructions to said microprocessor to provide said client with communication access to said server and to provide secure access using a secure gateway tunnel to said application that uses said file through Remote Desktop Protocol (RDP) commands.

18. A method of providing access for a client connected to a server in a computer network to a resource stored in said network, said network having an instance of a file in at least one of said server and said client and said network having an instance of an application that uses file in at least one of said server and said client, said network providing said client with access to said server using Active Directory (AD) services, said network providing secure access to said application for said client using a Remote Desktop Protocol (RDP), said method comprising:
accessing a library accessible containing virtual machine templates;
creating a virtual machine for a server in said network, said virtual machine having access said library and providing to a host machine in said network access to multiple machines in said network, user profile settings and multiple instances of an application in said network and multiple operating systems;
generating a first icon associated with said file and a second icon associated with said application in a graphical user interface (GUI) on said client said first icon providing a graphic representation of a source of an instance of said resource reflecting whether said resource is located at said client or at said server;
monitoring for activation of said first icon at said client;
launching said resource from either on said client or said server for said client depending on whether said resource is to be launched from said client first or said server first and to cause said application to access a file used by said resource through either said client or said server depending on whether said file is to be launched from either said client first or said server first;
updating a registry containing activation information on said resource, said registry being accessible by other processes operating on devices in said network;
accessing the file through said server using load balancing algorithms using Remote Desktop Protocol (RDP) commands; and
authenticating said client with said server using Group Policy Objects (GPOs) and Active Directory (AD) objects,
wherein
said resource is an application that can execute on said client or said server.

19. The method of providing access for a client connected to a server as claimed in claim 18, further comprising:
initiating an access of said resource on said client after attempting to access said resource on said server, if said server is not accessible.

* * * * *